United States Patent
Matsuura

(10) Patent No.: US 8,228,341 B2
(45) Date of Patent: Jul. 24, 2012

(54) IMAGE PROCESSING APPARATUS AND IMAGE PROCESSING METHOD, AND PROGRAM

(75) Inventor: Koji Matsuura, Tokyo (JP)

(73) Assignee: Sony Corporation (JP)

( * ) Notice: Subject to any disclaimer, the term of this patent is extended or adjusted under 35 U.S.C. 154(b) by 721 days.

(21) Appl. No.: 12/378,647

(22) Filed: Feb. 18, 2009

(65) Prior Publication Data

US 2009/0207183 A1 Aug. 20, 2009

(30) Foreign Application Priority Data

Feb. 19, 2008 (JP) ................................ P2008-037221

(51) Int. Cl.
- G09G 5/00 (2006.01)
- H04N 11/02 (2006.01)
- H04N 9/76 (2006.01)
- H04N 5/228 (2006.01)
- H04N 5/445 (2006.01)
- G06K 9/36 (2006.01)
- G06K 9/40 (2006.01)

(52) U.S. Cl. ........ 345/606; 345/611; 345/629; 345/630; 348/208.13; 348/413; 348/563; 348/598; 382/235; 382/236; 382/254; 382/300

(58) Field of Classification Search .................. 345/606, 345/611–614, 618, 629–630, 695; 348/208.13, 348/410, 413, 430–431, 563–569, 699–700, 348/384–385, 402, 438, 553, 584, 598, 715; 382/235–236, 254, 274, 276, 282, 284, 300; 386/264, 271

See application file for complete search history.

(56) References Cited

U.S. PATENT DOCUMENTS

| 4,819,192 A * | 4/1989 | Kuragano et al. ............. 345/421 |
| 2005/0254649 A1* | 11/2005 | Demos .......................... 380/205 |
| 2007/0040935 A1 | 2/2007 | Lee et al. |
| 2010/0193258 A1* | 8/2010 | Simmons et al. .......... 178/18.06 |

FOREIGN PATENT DOCUMENTS

| EP | 1404130 A1 | 3/2004 |
| EP | 1592251 A1 | 11/2005 |
| JP | 11177940 A | 7/1999 |
| JP | 2007129504 A | 5/2007 |
| WO | 2007040045 A1 | 4/2007 |

OTHER PUBLICATIONS

Office Action from Japanese Application No. 2008-037221, dated Feb. 9, 2010.
European Search Report EP 09153136, dated Apr. 27, 2010.

* cited by examiner

Primary Examiner — Wesner Sajous
(74) Attorney, Agent, or Firm — Lerner, David, Littenberg, Krumholz & Mentlik, LLP

(57) ABSTRACT

A plurality of input image signals are synthesized to generate a synthesis signal on the basis of synthesis information indicating an area where input image signals which are image signals of an image composed of at least one of input moving images and still images are respectively synthesized, a motion vector of the synthesis signal is detected, a synthesis interpolation exclusion area is decided where the interpolation in the synthesis signal is not performed on the basis of the synthesis information and interpolation control information indicating an input interpolation exclusion area where the interpolation in the respective input image signals is not performed, and a synthesis signal in-between signal is interpolated and output which is an image signal at an arbitrary time between the synthesis signal and a previous synthesis signal on the basis of the motion vector in an area other than the synthesis interpolation exclusion area.

7 Claims, 31 Drawing Sheets

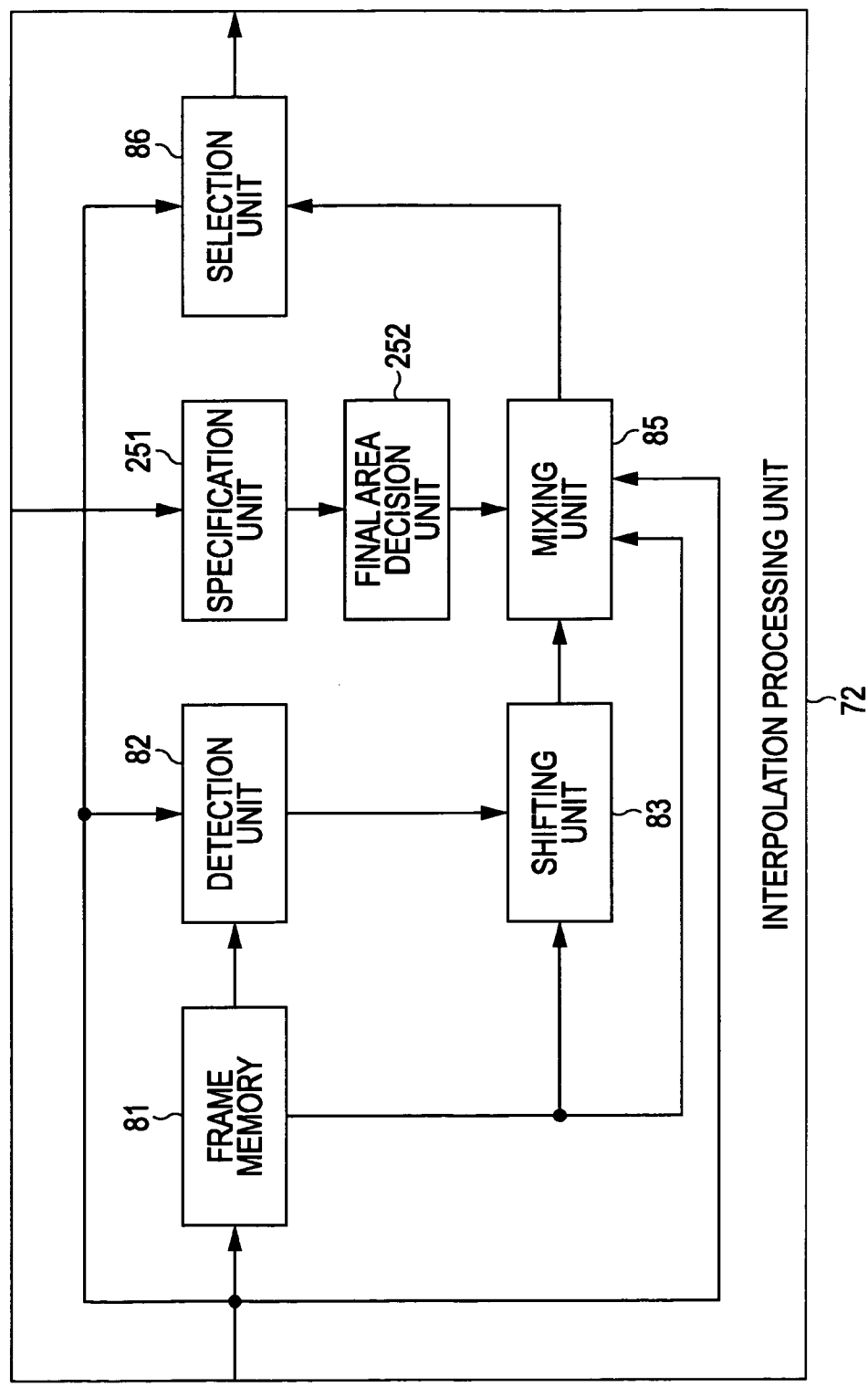

IMAGE BEFORE INTERPOLATION

IMAGE AFTER INTERPOLATION

ERROR TENDS TO BE OBVIOUS

ERROR IS NOT OBVIOUS

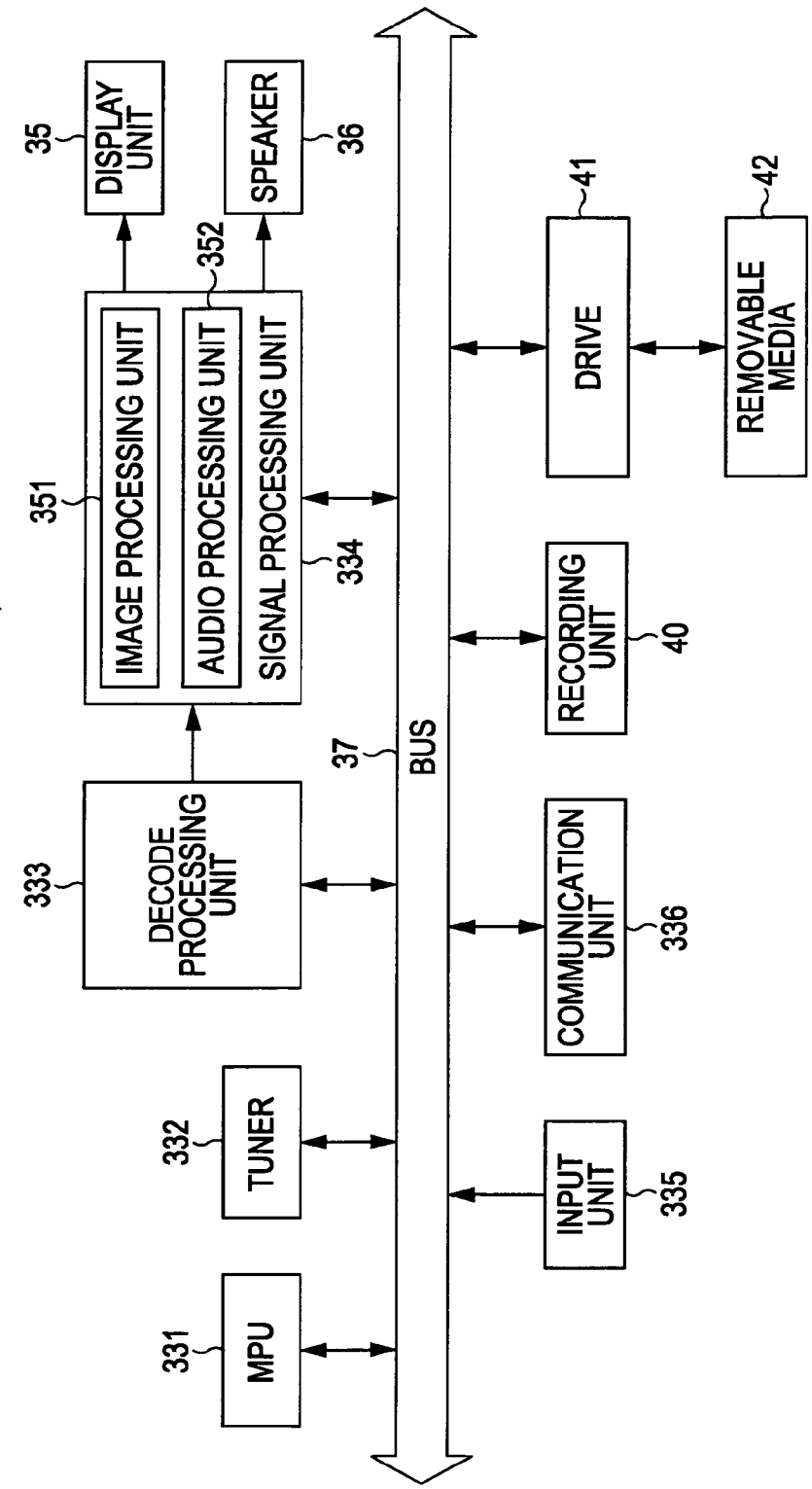

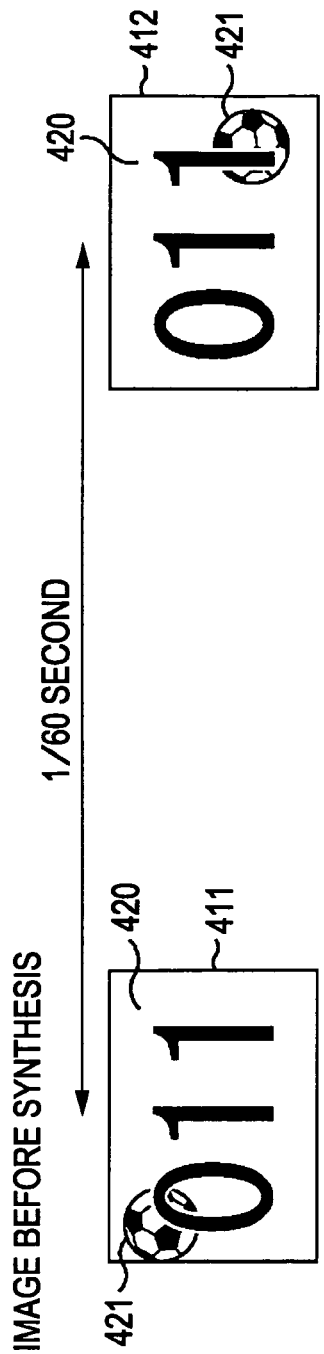
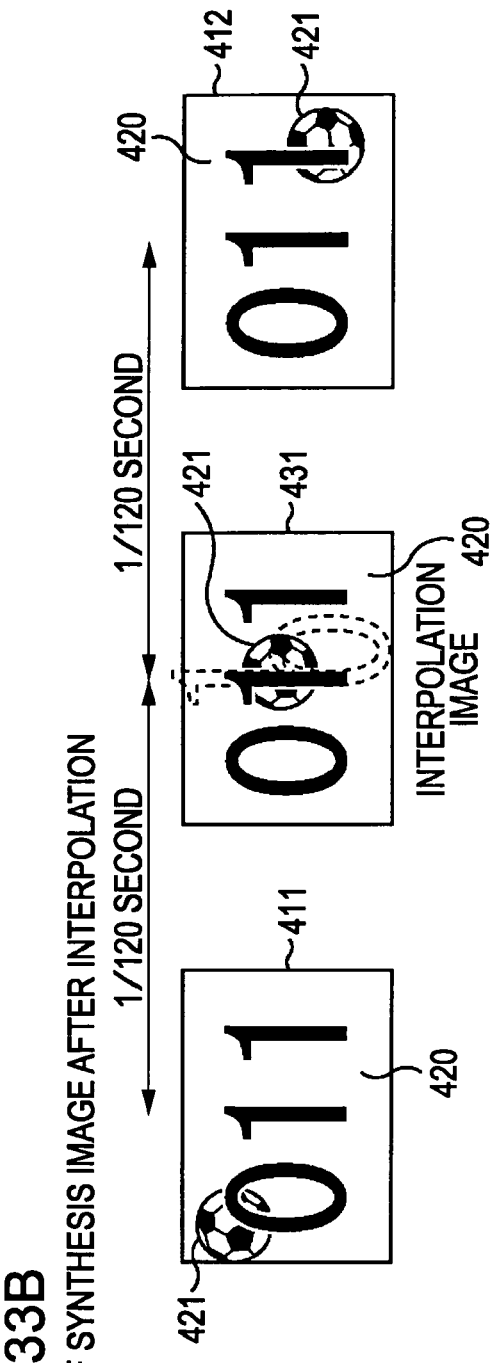
FIG. 33A
PART OF IMAGE BEFORE SYNTHESIS
FIG. 33B
PART OF SYNTHESIS IMAGE AFTER INTERPOLATION

IMAGE PROCESSING APPARATUS AND IMAGE PROCESSING METHOD, AND PROGRAM

CROSS REFERENCES TO RELATED APPLICATIONS

The present application claims priority from Japanese Patent Application No. JP 2008-037221, filed in the Japanese Patent Office on Feb. 19, 2008, the entire content of which is incorporated herein by reference.

BACKGROUND OF THE INVENTION

1. Field of the Invention

The present invention relates to an image processing apparatus and an image processing method, and a program. In particular, the invention relates to an image processing apparatus and an image processing method, and a program in which in a case where a synthesis signal composed by synthesizing a plurality of input image signals is interpolated, an image quality of the synthesis signal after the interpolation can be improved.

2. Description of the Related Art

In general, in order for a human being to feel that a moving image is smoothly displayed, it is argued that a sufficient frame rate of the moving image is 24 frames/second. However, a liquid crystal television receiver provided with a liquid crystal panel performs hold-type light emission where light emitting elements emit light on a regular basis, and as the case is different from a television receiver provided with a cathode-ray tube or a plasma display where an impulse-type light emission is performed, it is difficult for the human being to feel that the moving image is sufficiently smoothly displayed with a frame rate of 60 frames/second.

In view of the above, in recent years, in a mainstream liquid crystal television receiver, a high frame rate processing, so called double speed drive, is performed (hereinafter, which will be referred to as HFR processing). It should be noted that the HFR processing refers to a processing of increasing the frame rate by converting a moving image with a frame rate of 60 frames/second into a moving image with a frame rate of 120 frames/second, for example.

For the HFR processing, for example, an interpolation processing for interpolating an image signal between frames is used. For the interpolation processing, such a processing is devised that motion vectors contained in an input image signal in time series are obtained, and an image signal at an arbitrary time between the image signals in time series is interpolated by using the motion vector (for example, see Japanese Unexamined Patent Application Publication No. 2001-42831).

However, for example, in a case where the interpolation processing is performed on an image signal of an overlapping image where a translucent GUI (Graphical User Interface) image or an OSD (On Screen Display) image is overlapped on the moving image (hereinafter, which will be referred to as overlapping image signal), the motion of the moving image in the overlapping image affects a motion vector of the GUI image or the OSD image that is a still image, and in the overlapping image after the interpolation processing, the GUI image or the OSD image may be disturbed.

In view of the above, it is considered that the interpolation using the motion vector is not performed on the overlapping image signal of the overlapping image where the still image such as the GUI image or the OSD image is overlapped. However, in this case, the interpolation using the motion vector is stopped on an image signal of a moving image of a background other than the GUI image or the OSD image too. Thus, an image quality of the overlapping image signal after the interpolation processing is not satisfactory.

Also, for example, when ON and OFF of the overlap of the image signal of the GUI image or the OSD image are switched over in an image signal of a moving image which becomes a target of the interpolation processing, in the interpolation processing, the interpolation using the motion vector is not performed in some cases when the target image signal is erroneously recognized as an image signal generated at a scene change. In this case, the interpolation using the motion vector is not only performed on the image signal at the moment when ON and OFF of the overlap are switched over. An image where the interpolation using the motion vector is performed and an image where the interpolation using the motion vector is not performed are continuously output in terms of time as the image after the interpolation processing, and the image after the interpolation processing is disturbed. In view of the above, it is considered that the interpolation using the motion vector is not performed during a certain period of time immediately after ON and OFF of the overlap are switched over.

On the other hand, in recent years, with the television receiver, it is becoming possible to view not only television broadcasting but also contents of the internet, and the like. Therefore, in the interpolation processing, it is preferable to consider that a synthesis signal composed by synthesizing a plurality of input image signals such as image signals of the television broadcasting, image signals of the contents of the internet, and the like is set as the target.

SUMMARY OF THE INVENTION

However, in the interpolation processing, it is not considered that a synthesis signal composed by synthesizing a plurality of input image signals is set as the target, and the image quality of the synthesis signal after the interpolation processing is improved.

The present invention has been made in view of the above-mentioned circumstances, and in a case where a synthesis signal composed by synthesizing a plurality of input image signals is interpolated, it is desired to improve an image quality of the synthesis signal after the interpolation.

According to an embodiment of the present invention, there is provided an image processing apparatus arranged to perform an image processing on input image signals which are image signals of an image composed of at least one of a plurality of input moving images and still images, the image processing apparatus including: synthesis means configured to synthesize a plurality of the input image signals to generate a synthesis signal on the basis of synthesis information indicating an area where a plurality of the input image signals are respectively synthesized; detection means configured to detect a motion vector of the synthesis signal; decision means configured to decide, on the basis of the synthesis information and interpolation control information indicating an input interpolation exclusion area where an interpolation in the respective input image signals is not performed, a synthesis interpolation exclusion area where the interpolation in the synthesis signal is not performed; and interpolation means configured to interpolate and output a synthesis signal in-between signal which is an image signal at an arbitrary time between the synthesis signal and a previous synthesis signal functioning as a synthesis signal preceding the synthesis signal by one on the basis of the motion vector in an area other than the synthesis interpolation exclusion area.

The image processing apparatus according to the embodiment of the present invention can further include generation means configured to the interpolation control information by using information which is input in response to the input image signal and which indicates a content of the input image signal.

In the image processing apparatus according to the embodiment of the present invention, in a case where the number of the synthesis interpolation exclusion areas is larger than a predetermined number or where a shape of the synthesis interpolation exclusion area is a shape other than a predetermined shape, the decision means can select the input interpolation exclusion area and use the selected input interpolation exclusion area to decide the synthesis interpolation exclusion area again, and in a case where the number of the synthesis interpolation exclusion areas decided by the decision means is equal to or smaller than the predetermined number and also the shape of the synthesis interpolation exclusion area is the predetermined shape, on the basis of the synthesis interpolation exclusion area, the interpolation means can interpolate and output the synthesis signal in-between signal in an area other than the synthesis interpolation exclusion area.

In the image processing apparatus according to the embodiment of the present invention, in a case where the number of the synthesis interpolation exclusion areas is larger than a predetermined number or where a shape of the synthesis interpolation exclusion area is a shape other than a predetermined shape, the decision means can decide one area of the predetermined shape containing all the input interpolation exclusion areas as the synthesis interpolation exclusion area again, and in a case where the number of the synthesis interpolation exclusion areas decided by the decision means is equal to or smaller than the predetermined number and also the shape of the synthesis interpolation exclusion area is the predetermined shape, on the basis of the synthesis interpolation exclusion area, the interpolation means can interpolate and output the synthesis signal in-between signal in an area other than the synthesis interpolation exclusion area.

In the image processing apparatus according to the embodiment of the present invention, in a case where the number of the synthesis interpolation exclusion areas is larger than a predetermined number or where a shape of the synthesis interpolation exclusion area is a shape other than a predetermined shape, the decision means can decide all areas of the synthesis signal as the synthesis interpolation exclusion area again, and in a case where the number of the synthesis interpolation exclusion areas decided by the decision means is equal to or smaller than the predetermined number and also the shape of the synthesis interpolation exclusion area is the predetermined shape, on the basis of the synthesis interpolation exclusion area, the interpolation means can interpolate and output the synthesis signal in-between signal in an area other than the synthesis interpolation exclusion area.

According to an embodiment of the present invention, there is provided an image processing method for an image processing apparatus arranged to perform an image processing on input image signals which are image signals of an image composed of at least one of a plurality of input moving images and still images, the image processing method including the steps of: synthesizing a plurality of the input image signals to generate a synthesis signal on the basis of synthesis information indicating an area where a plurality of the input image signals are respectively synthesized; detecting a motion vector of the synthesis signal; deciding, on the basis of the synthesis information and interpolation control information indicating an input interpolation exclusion area where an interpolation in the respective input image signals is not performed, a synthesis interpolation exclusion area where the interpolation in the synthesis signal is not performed; and interpolating and outputting a synthesis signal in-between signal which is an image signal at an arbitrary time between the synthesis signal and a previous synthesis signal functioning as a synthesis signal preceding the synthesis signal by one on the basis of the motion vector in an area other than the synthesis interpolation exclusion area.

According to an embodiment of the present invention, there is provided a program for instructing a computer to perform an image processing on input image signals which are image signals of an image composed of at least one of a plurality of input moving images and still images, the image processing including the steps of: synthesizing a plurality of the input image signals to generate a synthesis signal on the basis of synthesis information indicating an area where a plurality of the input image signals are respectively synthesized; detecting a motion vector of the synthesis signal; deciding, on the basis of the synthesis information and interpolation control information indicating an input interpolation exclusion area where an interpolation in the respective input image signals is not performed, a synthesis interpolation exclusion area where the interpolation in the synthesis signal is not performed; and interpolating and outputting a synthesis signal in-between signal which is an image signal at an arbitrary time between the synthesis signal and a previous synthesis signal functioning as a synthesis signal preceding the synthesis signal by one on the basis of the motion vector in an area other than the synthesis interpolation exclusion area.

According to the embodiment of the present invention, the plurality of input image signals are synthesized to generate the synthesis signal on the basis of the synthesis information indicating the area where the plurality of input image signals which are the image signals of the image composed of at least one of the plurality of input moving images and still images are respectively synthesized, the motion vector of the synthesis signal is detected, the synthesis interpolation exclusion area is decided where the interpolation in the synthesis signal is not performed on the basis of the synthesis information and the interpolation control information indicating the input interpolation exclusion area where the interpolation in the respective input image signals is not performed, and the synthesis signal in-between signal is interpolated and output which is the image signal at an arbitrary time between the synthesis signal and the previous synthesis signal functioning as the synthesis signal preceding the synthesis signal by one on the basis of the motion vector in an area other than the synthesis interpolation exclusion area.

As described above, according to the embodiment of the present invention, in a case where the synthesis signal composed by synthesizing the plurality of input image signals is interpolated, it is possible to improve the image quality of the synthesis signal which has been subjected to the interpolation.

BRIEF DESCRIPTION OF THE DRAWINGS

FIG. 14 is a block diagram showing still another detailed configuration example of the interpolation processing unit of FIG. 2;

FIG. 17 is a block diagram of a configuration example of the reception apparatus to which an embodiment of the present invention is applied;

FIGS. 33A and 33B are explanatory diagrams for describing a priority with respect to an input HFR exclusion area.

DESCRIPTION OF THE PREFERRED EMBODIMENTS

Figure 1:
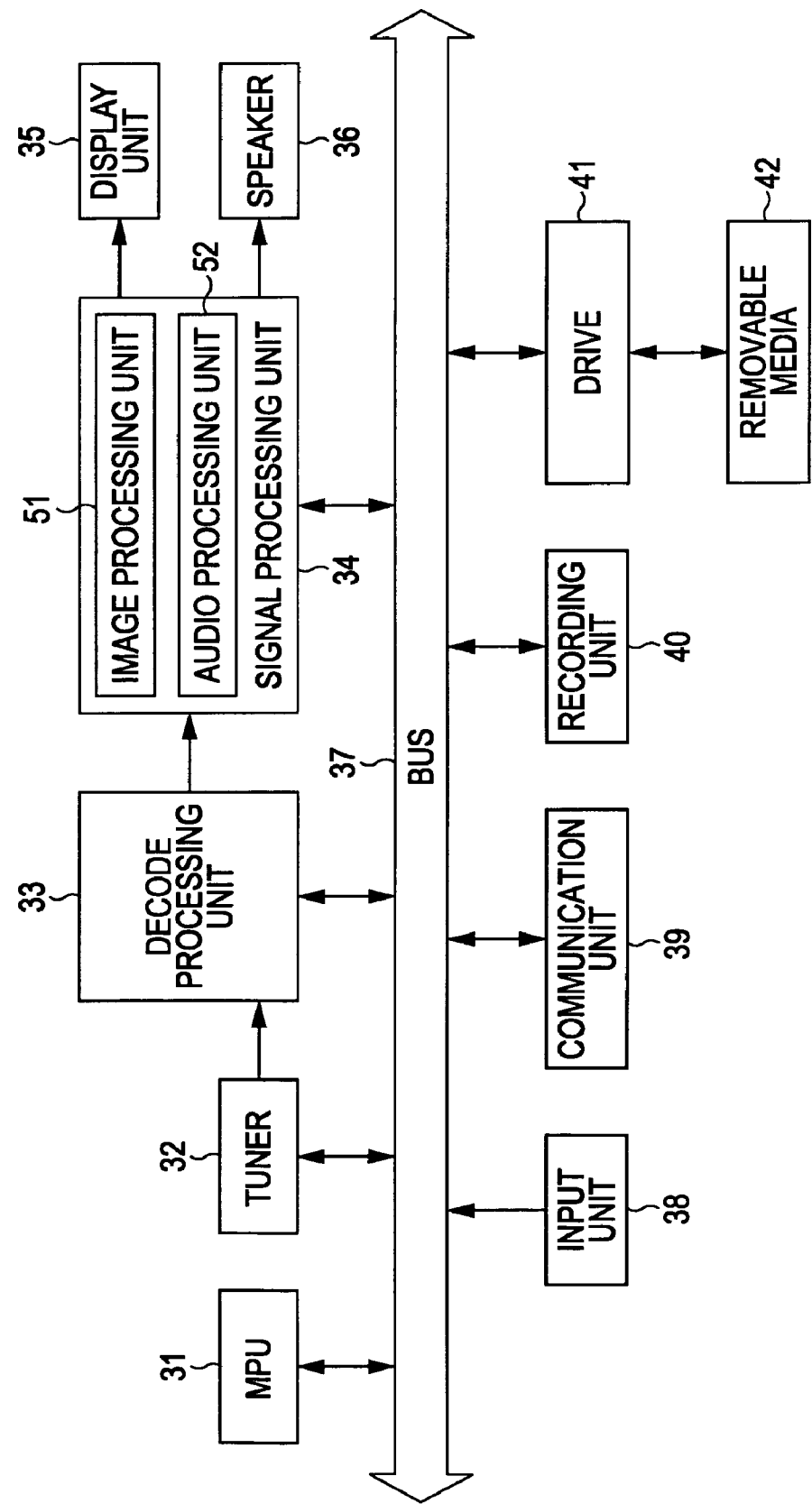
FIG. 1 is a block diagram of a configuration example of a reception apparatus which displays an image of a television broadcasting program at a high frame rate.

FIG. 1 illustrates a configuration example of a reception apparatus which displays an image of a television broadcasting program at a high frame rate.

In a reception apparatus 11 of FIG. 1, an MPU (Micro Processing Unit) 31, a tuner 32, a decode processing unit 33, a signal processing unit 34 to which a display unit 35 and a speaker 36 are connected, an input unit 38, a communication unit 39, a recording unit 40, and a drive 41 are mutually connected via a bus 37. The reception apparatus 11 receives radio waves of digital signals of images and audio in units of frames in time series of a television broadcasting program (hereinafter, referred to as program signal), and outputs the image and audio of the program.

The MPU 31 executes various processings, for example, by executing the program installed to the recording unit 40 in response to an instruction or the like input from the input unit 38. For example, in response to an instruction for displaying a program of a channel desired by the user which is input from the input unit 38, the MPU 31 controls the tuner 32, the decode processing unit 33, and the signal processing unit 34 to display the image corresponding to the program signal of the channel on the display unit 35 which is composed of the liquid crystal panel or the like, and also outputs the audio from the speaker 36.

Also, on the basis of at least one of an OSD display instruction which is an instruction for starting display of an OSD image which is input from the input unit 38 and OSD information which is information related to a display position in the program image of the OSD image, the MPU 31 controls the signal processing unit 34 to overlap the image signal among the program signal with an OSD image signal. It should be noted that the OSD information refers, for example, to information on a display starting position, a size, a shape, and the like of the OSD image.

Furthermore, the MPU 31 installs a program downloaded by the communication unit 39 or a program recorded on removal media 42 such as a magnetic disk, an optical disk, an opto-optical disk, a semiconductor disk, or the like, which is mounted to the drive 41 into the recording unit 40 as occasion demands.

The tuner 32 receives the radio wave of the program signal emitted from a broadcasting station (not shown) for demodulation under the control of the MPU 31. The tuner 32 supplies a program signal obtained as the result of the demodulation to the decode processing unit 33.

The decode processing unit 33 decodes the program signal supplied from the tuner 32 (the encoded program signal) through a predetermined method such as MPEG2 (Moving Picture Experts Group phase 2) under the control of the MPU 31, and supplies the program signal obtained as the result to the signal processing unit 34.

The signal processing unit 34 is composed of the image processing unit 51 and the audio processing unit 52. The image processing unit 51 performs a processing such as an overlap of the OSD image signal, an interpolation of an image signal at an intermediate time between continuous image signals, or a D/A (Digital/Analog) conversion on the image signal among the program signal supplied from the decode processing unit 33. The image processing unit 51 supplies an image signal which is an analog signal obtained as the result to the display unit 35 to display the image on the display unit 35.

The audio processing unit 52 performs the D/A conversion or the like on the audio signal among the program signal supplied from the decode processing unit 33 to supply an audio signal which is an analog signal obtained as the result to the speaker 36 and output the audio to the outside.

The input unit 38 is composed, for example, of a reception unit configured to receive an instruction sent from a remote controller (not shown), a button, a keyboard, a mouse, a switch, and the like and accepts an instruction from the user. The input unit 38 supplies various instructions via the bus 37 to the MPU 31 in response to the instruction from the user.

For example, in response to the instruction for displaying the program of the desired channel from the user, the input unit 38 supplies the instruction for displaying the program of the channel desired by the user to the MPU 31. Also, in response to the instruction for starting the display of the OSD image from the user, the input unit 38 supplies the OSD information and the OSD display instruction of the OSD image to the MPU 31.

The communication unit 39 performs sending and reception of various pieces of data via a network such as the internet (not shown). For example, the communication unit 39 downloads a predetermined program from a server (not shown) via the network and supplies the program to the MPU 31. The recording unit 40 records, as occasion demands, a program to be executed by the MPU 31 and various pieces of data.

The removal media 42 is mounted to the drive 41 as occasion demands. The drive 41 drives the removal media 42 to read out the program, the data, and the like recorded thereon to be supplied via the bus 37 to the MPU 31.

Next, with reference to FIG. 2, the interpolation in the reception apparatus 11 of FIG. 1 will be described.

Figure 2:
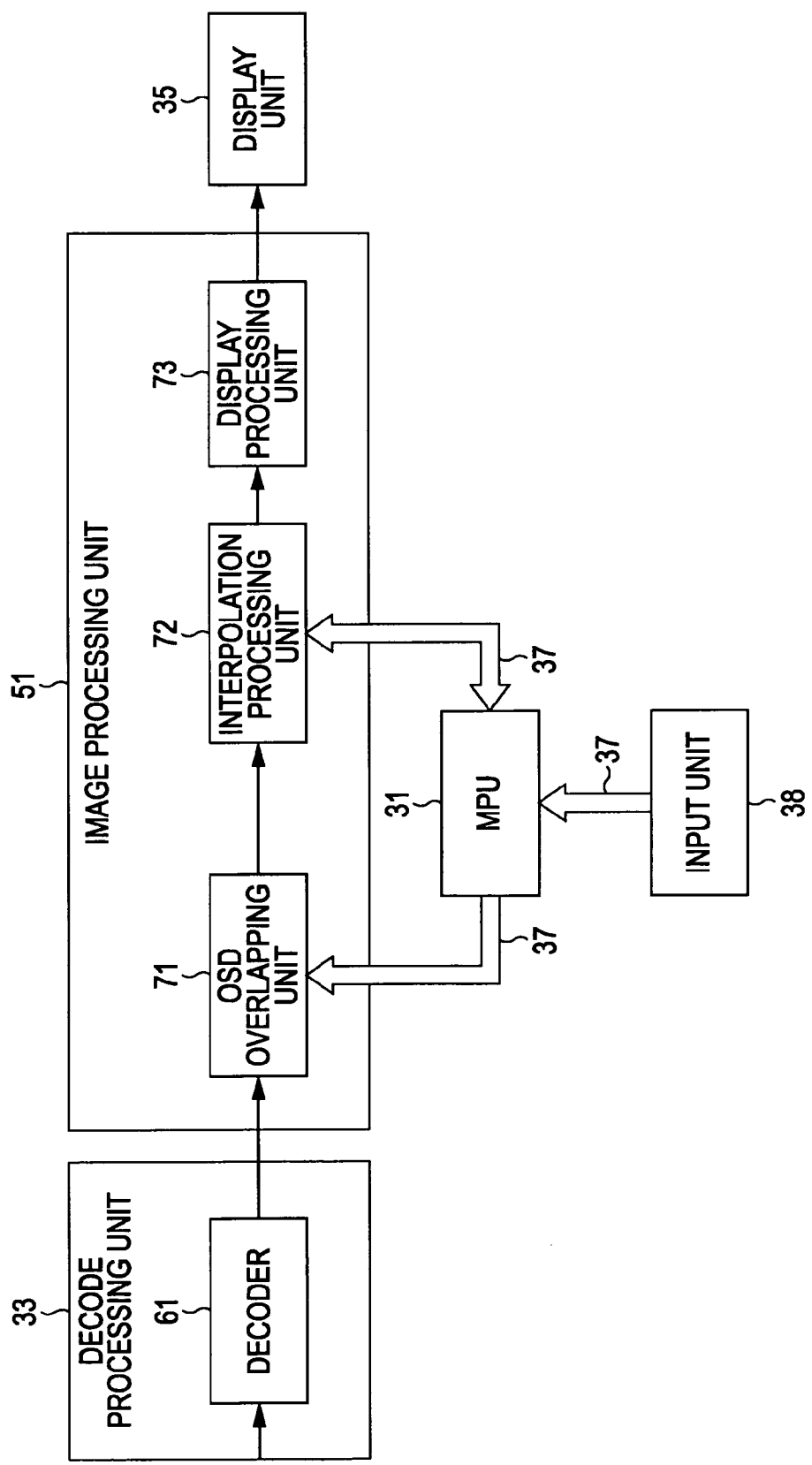
FIG. 2 is a block diagram for describing an interpolation in the reception apparatus of FIG. 1.

As illustrated in FIG. 2, when the input unit 38 accepts the instruction for starting or ending of the display of the OSD image from the user, the input unit 38 supplies the OSD display instruction and the OSD information, or an OSD ending instruction which is an instruction for ending the display of the OSD image via the bus 37 to the MPU 31.

The MPU 31 performs a communication such as an I2C (Inter-Integrated Circuit) communication or a UART (Universal Asynchronous Receiver Transmitter) communication with the image processing unit 51 via the bus 37. For example, in response to the OSD display instruction and the OSD information supplied from the input unit 38, the MPU 31 sends the OSD information and an interpolation stopping instruction which is an instruction for stopping the instruction to the image processing unit 51, and after that, sends an overlap starting instruction which is an instruction for starting the overlap of the OSD image signal to the image processing unit 51.

Also, in response to the OSD ending instruction supplied from the input unit 38, the MPU 31 sends an interpolation resuming instruction which is an instruction for resuming the instruction to the image processing unit 51, and after that, sends an overlap stopping instruction which is an instruction for stopping the overlap of the OSD image signal to the image processing unit 51.

As illustrated in FIG. 2, the decode processing unit 33 is composed of a decoder 61. The decoder 61 decodes the program signal input from the tuner 32 of FIG. 1 and supplies an image signal obtained as the result (hereinafter, referred to as input image signal) to the image processing unit 51. It should be noted that the audio signal after the decode obtained at this point is supplied to the audio processing unit 52 of FIG. 1.

The image processing unit 51 is composed of the OSD overlapping unit 71, an interpolation processing unit 72, and a display processing unit 73. In response to the overlap starting instruction supplied from the MPU 31 via the bus 37, the OSD overlapping unit 71 overlaps a previously stored OSD image signal at a position based on the OSD information supplied from the MPU 31 of the input image signal supplied from the decoder 61. Then, the OSD overlapping unit 71 supplies the input image signal after the overlap to the interpolation processing unit 72. Also, in response to the overlap stopping instruction supplied from the MPU 31 via the bus 37, the OSD overlapping unit 71 ends the overlap of the OSD image signal with respect to the input image signal supplied from the decoder 61, and supplies the input image signal supplied from the decoder 61 to the interpolation processing unit 72 as it is.

In response to the interpolation stopping instruction supplied from the MPU 31 via the bus 37, the interpolation processing unit 72 uses the input image signal supplied from the OSD overlapping unit 71 to perform the interpolation based on the motion vector in an area other than the area corresponding to the OSD information supplied from the MPU 31. Also, in response to the interpolation resuming instruction supplied from the MPU 31 via the bus 37, the interpolation processing unit 72 uses the input image signal supplied from the OSD overlapping unit 71 to perform the interpolation based on the motion vector in the entire area. The interpolation processing unit 72 supplies the image signal after the interpolation to the display processing unit 73.

The display processing unit 73 performs the D/A conversion on the image signal after the interpolation supplied from the interpolation processing unit 72 and supplies an image signal which is an analog signal obtained as the result to the display unit 35 so that the image is displayed on the display unit 35.

Figure 3:
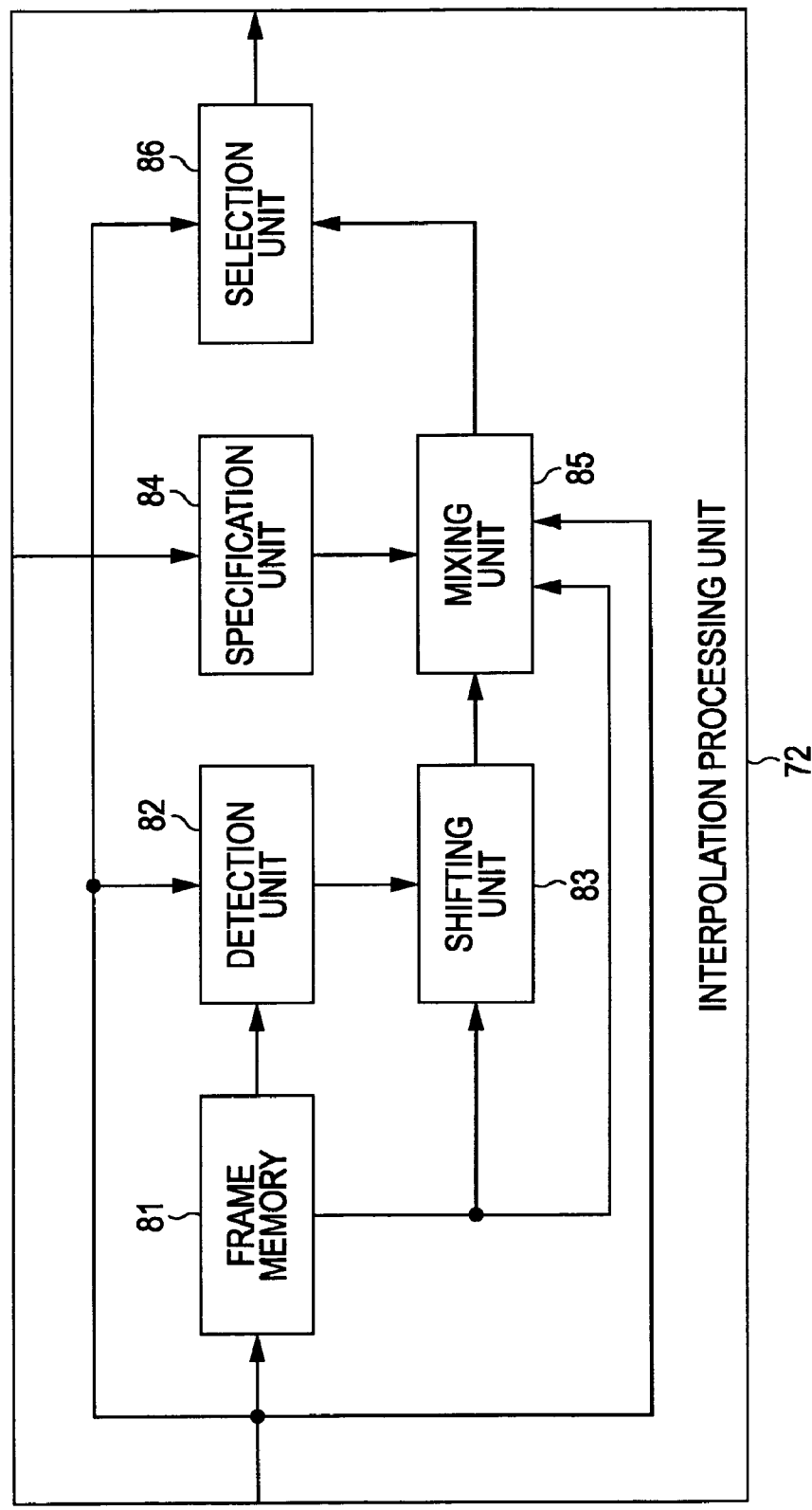
FIG. 3 is a block diagram showing a detailed configuration example of an interpolation processing unit of FIG. 2.

FIG. 3 illustrates a detailed configuration example of the interpolation processing unit 72 of FIG. 2.

The interpolation processing unit 72 is composed of a frame memory 81, a detection unit 82, a shifting unit 83, a specification unit 84, a mixing unit 85, and a selection unit 86.

The input image signal supplied from the OSD overlapping unit 71 of FIG. 2 is input to the frame memory 81, the detection unit 82, the mixing unit 85, and the selection unit 86. Also, the interpolation stopping instruction and the OSD information, or the interpolation resuming instruction supplied from the MPU 31 via the bus 37 is supplied to the specification unit 84.

The frame memory 81 stores the input image signal input from the OSD overlapping unit 71 in units of frames. The frame memory 81 reads out the input image signal stored last time, that is, the input image signal in one frame before the input image signal input from the OSD overlapping unit 71 (hereinafter, referred to as previous input image signal) to be supplied to the detection unit 82, the shifting unit 83, and the mixing unit 85.

The detection unit 82 sets the input image signal input from the OSD overlapping unit 71 as an input image signal of a detection target (hereinafter, referred to as target input image signal), and detects the motion vector of the target input image signal on the basis of the target input image signal and the previous input image signal in one frame before the target input image signal supplied from the frame memory 81.

For example, while following a block matching method, the detection unit 82 detects the motion vector in units of frames by performing matching between a standard block set in the target input image signal and a reference block which has the same size as the standard block and which is set in the previous input image signal. The detection unit 82 supplies the detected motion vector in units of blocks to the shifting unit 83.

The shifting unit 83 uses the motion vector in units of blocks supplied from the detection unit 82 to shift the previous input image signal supplied from the frame memory 81 in units of blocks to supply the previous input image signal after the shift to the mixing unit 85.

The specification unit 84 specifies at least one interpolation stopping area which is an area where the interpolation based on the motion vector is not performed in the interpolation signal which will be described below, on the basis of the interpolation stopping instruction and the OSD information supplied from the MPU 31. Also, in response to the interpolation resuming instruction supplied from the MPU 31, the specification unit 84 specifies zero representing no areas existing as the interpolation stopping areas. The specification unit 84 supplies the interpolation stopping area to the mixing unit 85.

The mixing unit 85 mixes the target input image signal supplied from the OSD overlapping unit 71 with the previous input image signal supplied from the shifting unit 83 on the basis of the interpolation stopping area supplied from the specification unit 84 to generate an interpolation signal for interpolating the image signal at an intermediate time between the target input image signal and the previous input image signal.

To be more specific, the mixing unit 85 mixes the target input image signal supplied from the OSD overlapping unit 71 with the previous input image signal supplied from the shifting unit 83 in an area other then the interpolation stopping area in the interpolation signal and uses the previous input image signal as it is in the interpolation stopping area to generate the interpolation signal. That is, the mixing unit 85 performs the interpolation through the mixing of the target input image signal and the previous input image signal shifted by using the motion vector by the shifting unit 83 in an area other then the interpolation stopping area. In the interpolation stopping area, the interpolation is not performed.

As a result, in an area other then the interpolation stopping area, the interpolation signal is the image signal obtained by mixing the target input image signal with the previous input image signal in an area other then the interpolation stopping area. In the interpolation stopping area, the interpolation signal is the previous input image signal itself. Then, the mixing unit 85 supplies the interpolation signal to the selection unit 86.

The selection unit 86 selects one of the target input image signal input from the OSD overlapping unit 71 and the interpolation signal supplied from the mixing unit 85, and at a predetermined timing, outputs the selected signal as the image signal after the interpolation. To be more specific, the selection unit 86 outputs the interpolation signal generated by using the target input image signal and the next target input image signal between those signals as the image signal after the interpolation. As a result, the frame rate of the image signal after the interpolation output from the selection unit 86 is two time larger than the frame rate of the input image signal.

Next, with reference to FIG. 4, the OSD overlap processing in the reception apparatus 11 of FIG. 1 will be described.

In step S11, the MPU 31 obtains supplied from the input unit 38 the OSD display instruction and at least one piece of the OSD information of the OSD image, and sends one piece of the OSD information via the bus 37 to the interpolation processing unit 72 of the image processing unit 51. In step S21, the interpolation processing unit 72 receives the OSD information sent from the MPU 31, and in step S22, sends the notification on the communication completion of the OSD information to the MPU 31.

In step S12, the MPU 31 receives the notification on the communication completion sent from the interpolation processing unit 72. While following the similar manner in the subsequent stages, by the number of pieces of the OSD information supplied from the input unit 38 to the MPU 31, the processing in steps S11 and S12 and the processing in steps S21 and S22 are repeatedly performed.

After that, in step S13, the MPU 31 sends the interpolation stopping instruction to the interpolation processing unit 72, and in step S23, the interpolation processing unit 72 receives the interpolation stopping instruction. Then, in response to this interpolation stopping instruction, the interpolation processing unit 72 starts to stop the interpolation using the motion vector in the interpolation stopping area.

In step S24, the interpolation processing unit 72 sends the notification on the communication completion of the interpolation stopping instruction to the MPU 31, and in step S14, the MPU 31 receives the notification. In step S15, the MPU 31 sends the interpolation starting instruction and all the pieces of the OSD information obtained from the input unit 38 via the bus 37 to the OSD overlapping unit 71 of the image processing unit 51.

In step S31, the OSD overlapping unit 71 receives the overlap starting instruction and the OSD information sent from the MPU 31, and in response to the overlap starting instruction, starts the overlap of the OSD image signal with respect to the position based on the OSD information of the input image signal supplied from the decoder 61. As a result, the display unit 35 displays the OSD image. While following the similar manner in the subsequent stages, until the MPU 31 is supplied with the OSD ending instruction from the input unit 38, each time the OSD display instruction is supplied from the input unit 38 to the MPU 31, the processing in steps S11 to S15, the processing in steps S21 to S24, and the processing in step S31 are repeatedly performed.

In step S16, the MPU 31 obtains the OSD ending instruction supplied via the bus 37 from the input unit 38, and in response to the OSD ending instruction, sends the overlap stopping instruction to the OSD overlapping unit 71. In step S32, the OSD overlapping unit 71 receives the overlap stopping instruction sent from the MPU 31, and in response to the overlap stopping instruction, ends the overlap of the OSD image signal with respect to the input image signal. As a result, the display unit 35 displays the OSD image from a time when the processing in step S31 is performed by the OSD overlapping unit 71 until a time when the processing in step S32 is performed.

In step S17, the MPU 31 sends the interpolation resuming instruction to the interpolation processing unit 72, and in step S25, the interpolation processing unit 72 receives the interpolation resuming instruction. Then, in response to this interpolation resuming instruction, the interpolation processing unit 72 ends stopping the interpolation using the motion vector in the interpolation stopping area. That is, the interpolation processing unit 72 starts the interpolation using the motion vector in the entire area. Therefore, during a period from a time when the processing in step S23 is performed until a time when the processing in step S25 is performed, the interpolation using the motion vector in the interpolation stopping area is stopped.

It should be noted that the period during which the interpolation using the motion vector in the interpolation stopping area is stopped varies depending on processing speeds of the OSD overlapping unit 71 and the interpolation processing unit 72, a communication speed between the MPU 31 and the interpolation processing unit 72, and the like.

In step S26, the interpolation processing unit 72 sends the notification on the communication completion of the interpolation resuming instruction to the MPU 31, and in step S18, the MPU 31 receives the notification.

As described above, the MPU 31 sends the OSD information and the interpolation stopping instruction before the interpolation starting instruction, and stops the interpolation using the motion vector in the interpolation stopping area based on the OSD information. Therefore, it is possible to improve the quality of the image signal after the interpolation. That is, before the motion vector is detected, in a case where the OSD image signal is overlapped, in an area where the OSD image signal is overlapped, there is a possibility that an abnormal motion vector is detected. Therefore, before the interpolation starting instruction, that is, before the overlap of the OSD image signal, the reception apparatus 11 stops the interpolation using the motion vector in the interpolation stopping area based on the OSD information, so that the disturbance in the image is prevented which is generated by the interpolation using the abnormal motion vector and detected in the area where the OSD image signal is overlapped. As a result, it is possible to improve the quality of the image signal after the interpolation.

Also, the interpolation using the motion vector is performed in an area other then the interpolation stopping area. Thus, as compared with the case where the interpolation in the entire area is stopped, it is possible to improve the quality of the image signal after the interpolation. Furthermore, after respectively checking the OSD information, the interpolation stopping instruction, and the communication completion of the interpolation resuming instruction, the MPU 31 performs the next processing. Thus, it is possible to control the interpolation processing with certainty.

Figure 4:
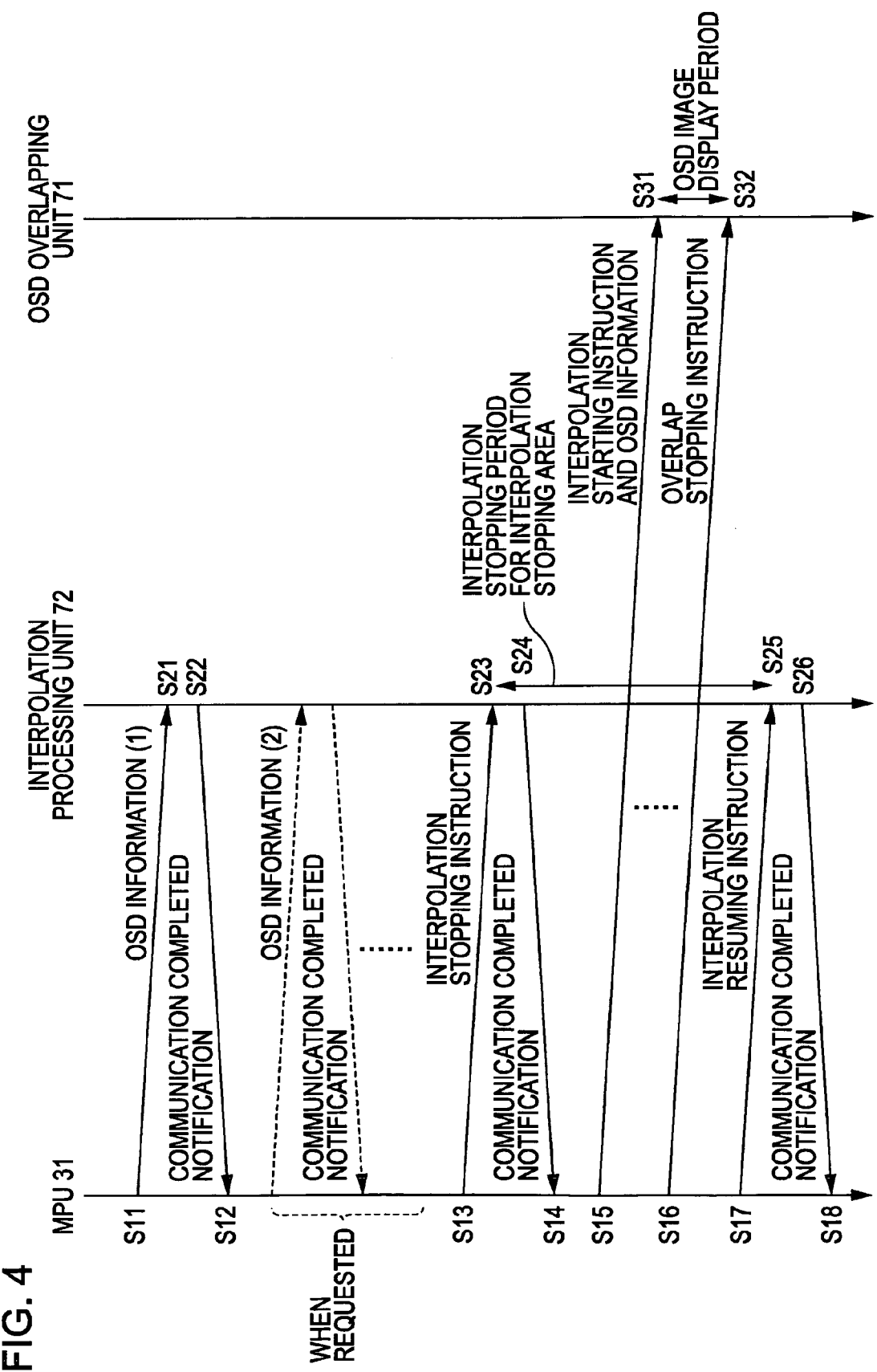
FIG. 4 is a flowchart for describing an OSD overlap processing in the reception apparatus of FIG. 1.

It should be noted that in FIG. 4, after the MPU 31 sends the OSD information and the interpolation stopping instruction to the interpolation processing unit 72, the overlap starting instruction and the OSD information is sent to the OSD overlapping unit 71. However, before the OSD overlapping unit 71 starts the overlap in response to the overlap starting instruction, if the OSD information and the interpolation stopping instruction can be sent to the interpolation processing unit 72, as illustrated in FIG. 5, before the OSD information and the interpolation stopping instruction is sent to the interpolation processing unit 72, the overlap starting instruction and the OSD information may be sent to the OSD overlapping unit 71.

Figure 5:
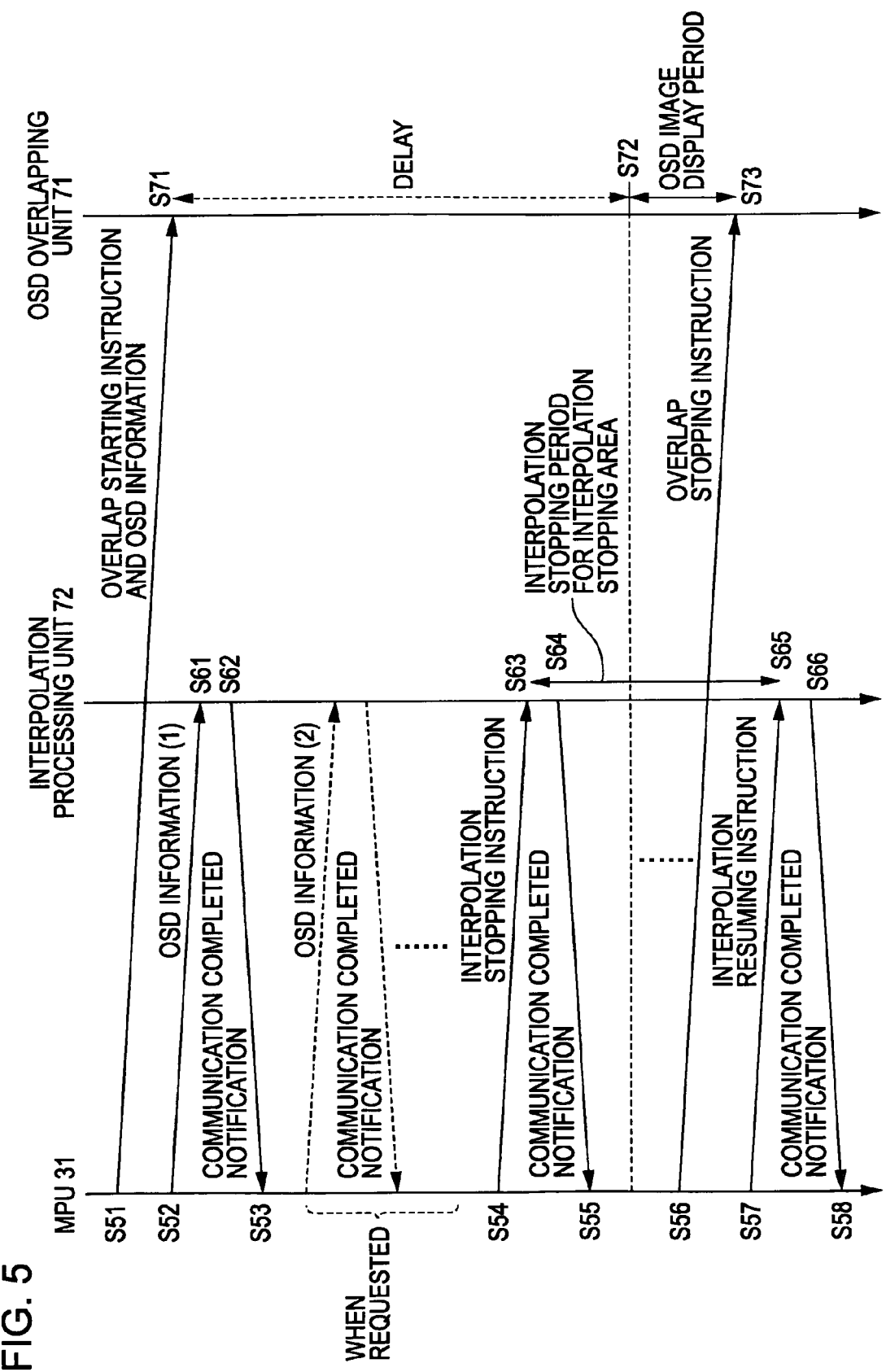
FIG. 5 is a flowchart for describing another OSD overlap processing in the reception apparatus of FIG. 1.

That is, in FIG. 5, in step S51, the MPU 31 obtains the OSD display instruction and at least one piece of the OSD information of the OSD image supplied from the input unit 38 via the bus 37, and sends the overlap starting instruction and the OSD information to the OSD overlapping unit 71 via the bus 37. In step S71, the OSD overlapping unit 71 receives the overlap starting instruction and the OSD information sent from the MPU 31 and delays the start of the overlap until a predetermined period of time elapses.

The processing in steps S52 to S55 is similar to the processing in steps S11 to S14 of FIG. 4, and the processing in steps S61 to S64 is similar to the processing in steps S21 to S24 of FIG. 4, so that a description thereof will be omitted.

Then, after the MPU 31 receives the notification on the communication completion of the interpolation stopping instruction in step S55, the above-mentioned predetermined period of time elapses, and in step S72, the OSD overlapping unit 71 starts the overlap of the OSD image signal with respect to the position based on the OSD information of the input image signal supplied from the decoder 61 which is received from the MPU 31 in step S71.

While following the similar manner in the subsequent stages, until the MPU 31 is supplied with the OSD ending instruction from the input unit 38, each time the OSD display instruction is supplied from the input unit 38 to the MPU 31, the processing in steps S51 to S55, the processing in steps S61 to S64, and the processing in steps S71 and S72 are repeatedly performed. Then, when the OSD ending instruction is supplied from the input unit 38 to the MPU 31, the processing is advanced to step S56.

It should be noted that the processing in steps S56 to S58 is similar to the processing in steps S16 to S18 of FIG. 4, the processing in steps S65 and S66 is similar to the processing in steps S25 and S26, and the processing in step S73 is similar to the processing in step S32, and the description thereof will be omitted to avoid the repetition.

Figure 6:
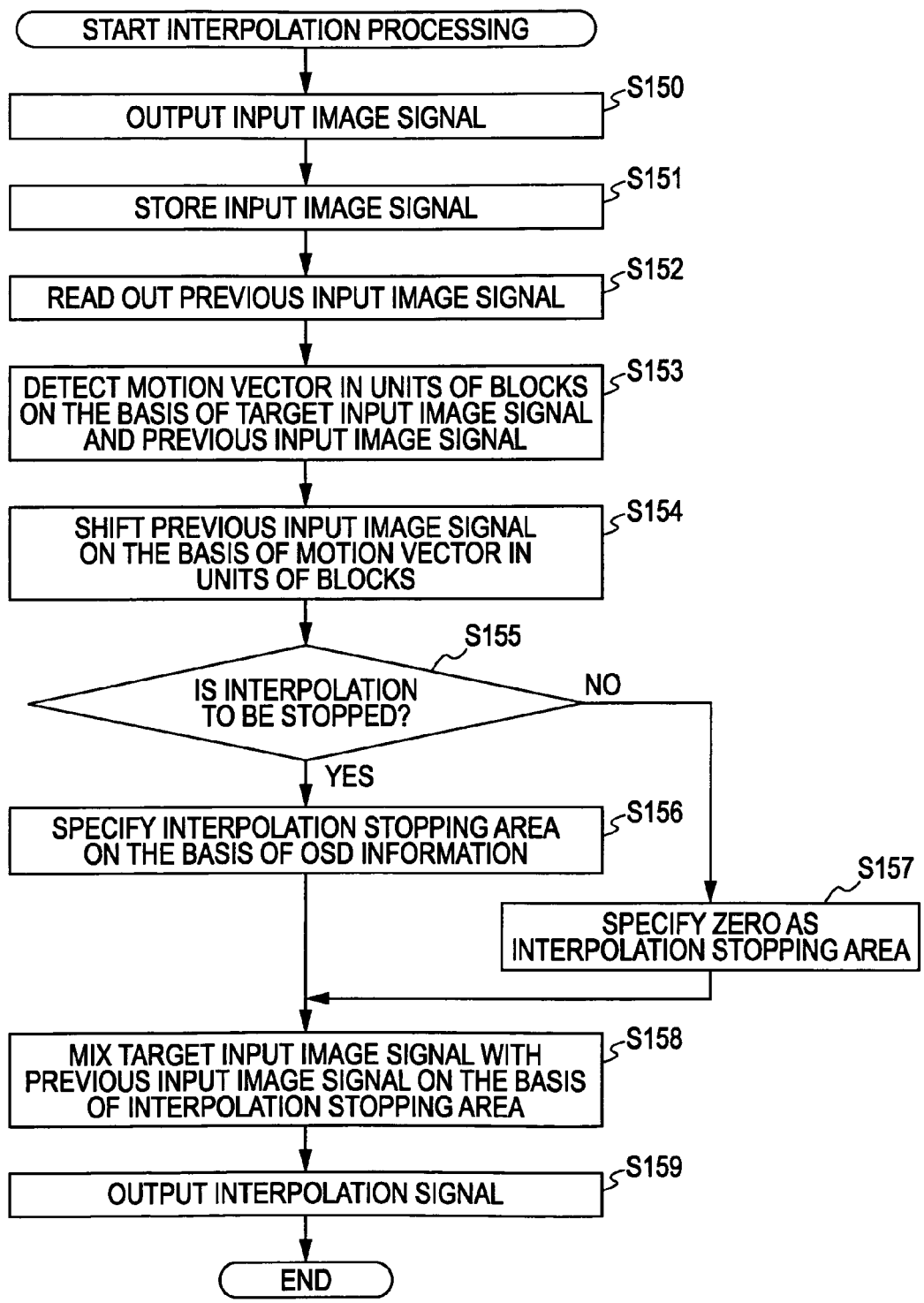
FIG. 6 is a flowchart for describing an interpolation processing in the interpolation processing unit of FIG. 3.

Next, with reference to FIG. 6, the interpolation processing in the interpolation processing unit 72 of FIG. 3 will be described. This interpolation processing is started when, for example, the input image signal is input to the interpolation processing unit 72.

In step S150, the selection unit 86 of the interpolation processing unit 72 outputs the input image signal supplied from the OSD overlapping unit 71 as the image signal after the interpolation. In step S151, the frame memory 81 stores the input image signal supplied from the OSD overlapping unit 71. In step S152, the frame memory 81 reads out the already stored previous input image signal to supplied to the detection unit 82, the shifting unit 83, and the mixing unit 85.

In step S153, the detection unit 82 sets the input image signal supplied from the OSD overlapping unit 71 as the target input image signal, and on the basis of the target input image signal and the previous input image signal supplied from the frame memory 81, the detection unit 82 detects the motion vector in units of blocks of the target input image signal. Then, the detection unit 82 supplies the motion vector to the shifting unit 83.

In step S154, on the basis of the motion vector in units of blocks supplied from the detection unit 82, the shifting unit 83 shifts the previous input image signal supplied from the frame memory 81 in units of blocks, and supplies the previous input image signal after the shift to the mixing unit 85. In step S155, the specification unit 84 determines whether the interpolation is stopped, that is, this moment is in the period from the time when the interpolation stopping instruction is sent from the MPU 31 until the time when the interpolation resuming instruction is sent.

In step S155, in a case where it is determined that the interpolation is stopped, in step S156, the specification unit 84 specifies an interpolation stopping area on the basis of the OSD information supplied from the MPU 31 and supplies the interpolation stopping area to the mixing unit 85.

On the other hand, in step S155, in a case where it is determined that the interpolation is not stopped, that is, no interpolation stopping instruction is sent from the MPU 31 yet or this moment is in the period from the time when the interpolation resuming instruction is sent from the MPU 31 until the time when the interpolation stopping instruction is sent, in step S157, the specification unit 84 specifies zero representing no areas existing as the interpolation stopping areas. Then, the specification unit 84 supplies the interpolation stopping area to the mixing unit 85.

In step S158, on the basis of the interpolation stopping area supplied from the specification unit 84, by mixing the target input image signal supplied from the OSD overlapping unit 71 with the previous input image signal after the shift supplied from the shifting unit 83, the mixing unit 85 generates the interpolation signal. Then, the mixing unit 85 supplies the interpolation signal to the selection unit 86. In step S159, the selection unit 86 outputs the interpolation signal supplied from the mixing unit 85 as the image signal after the interpolation, and the processing is ended.

It should be noted that in the reception apparatus 11 of FIG. 1, the interpolation processing unit 72 specifies the interpolation stopping area on the basis of the OSD information, but not only the interpolation stopping area, but also a detection stopping area which is an area of a block where the detection of the motion vector based on the detection unit 82 is not performed in the input image signal may be specified.

Figure 7:
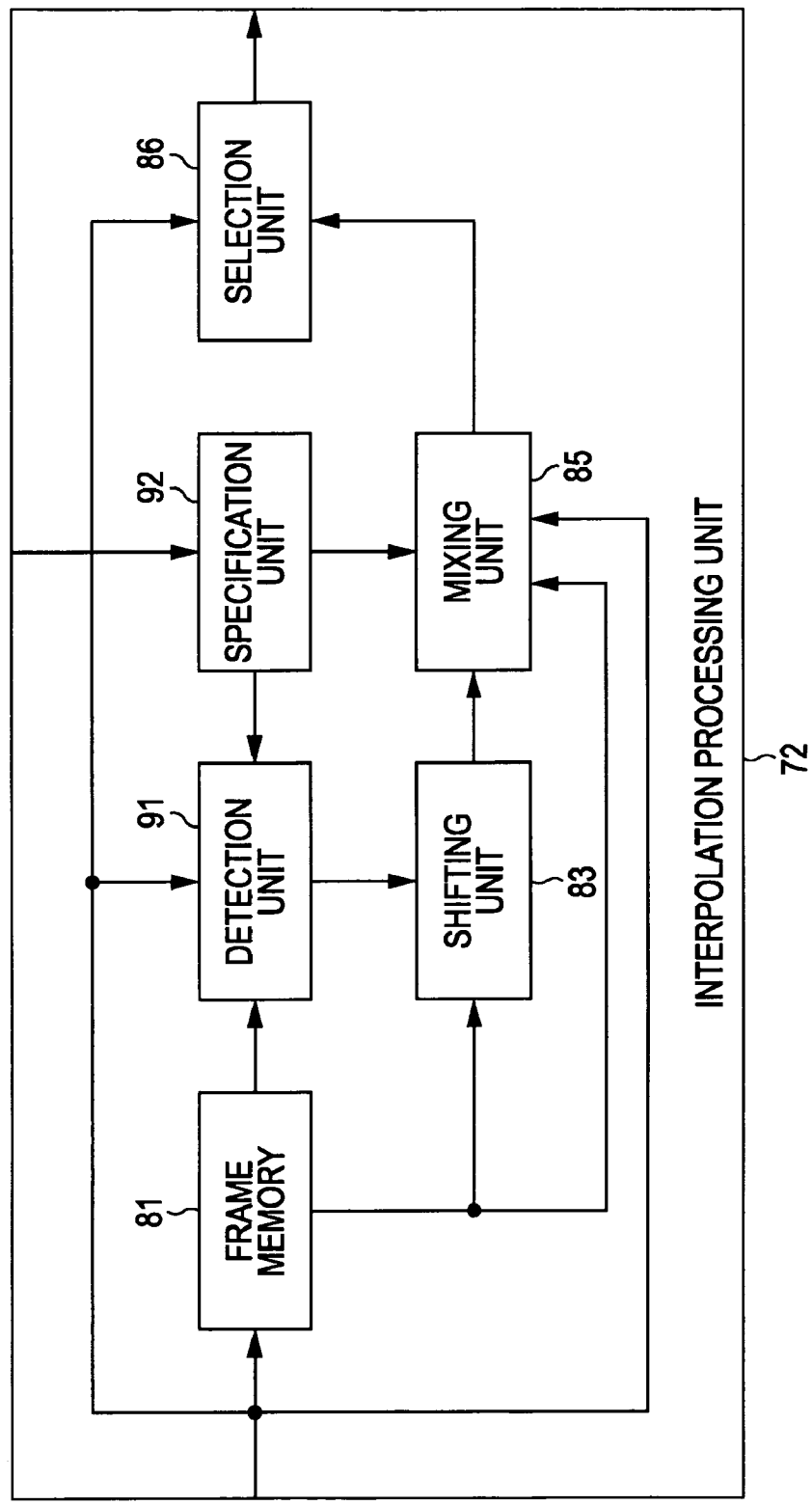
FIG. 7 is a block diagram showing another detailed configuration example of the interpolation processing unit of FIG. 2.

In this case, the interpolation processing unit 72 of FIG. 2 is composed as illustrated in FIG. 7. The interpolation processing unit 72 of FIG. 7 is composed of the frame memory 81, the shifting unit 83, the mixing unit 85, the selection unit 86, a detection unit 91, and a specification unit 92. It should be noted that the same components as those in FIG. 3 are denoted by the same reference numerals, and the description thereof will be omitted to avoid the repetition.

The detection unit 91 sets the input image signal input from the OSD overlapping unit 71 as the target input image signal, and on the basis of the target input image signal and the previous input image signal in one frame before the target input image signal supplied from the frame memory 81, detects the motion vector in units of blocks of the target input image signal in an area other than the detection stopping area supplied from the specification unit 92. Then, the detection unit 91 supplies the detected motion vector to the shifting unit 83.

The specification unit 92 specifies at least one of the interpolation stopping area and the detection stopping area on the basis of the interpolation stopping instruction and the OSD information supplied from the MPU 31. Also, in response to the interpolation resuming instruction supplied from the MPU 31, the specification unit 84 specifies zero representing no areas existing as the interpolation stopping area and the detection stopping area, respectively. The specification unit 84 supplies the interpolation stopping area to the mixing unit 85, and supplies the detection stopping area to the detection unit 91.

As described above, in the interpolation processing unit 72 of FIG. 7, the motion vector in units of blocks of the target input image signal in an area other than the detection stopping area based on the OSD information is detected on the basis of the target input image signal and the previous input image signal. Thus, it is possible to further improve the quality of the image signal after the interpolation.

That is, at the time of outputting and removing the OSD image, when the target input image signal and the previous input image signal where the OSD image signal is overlapped on one of the signals and the OSD image signal is not overlapped on the other of the signals are used to detect the motion vector, in general, a motion vector with a large motion is undesirably detected also irrespective of a background image other than the OSD image. Therefore, as the interpolation processing unit 72 of FIG. 7 detects the motion vector in units of blocks only in an area other than the detection stopping area based on the OSD information, at the time of outputting and removing the OSD image, in the block where the OSD image signal is overlapped, the detection of the abnormal motion vector is prevented. As a result, it is possible to improve the quality of the image signal after the interpolation which is generated by using the motion vector.

Figure 8:
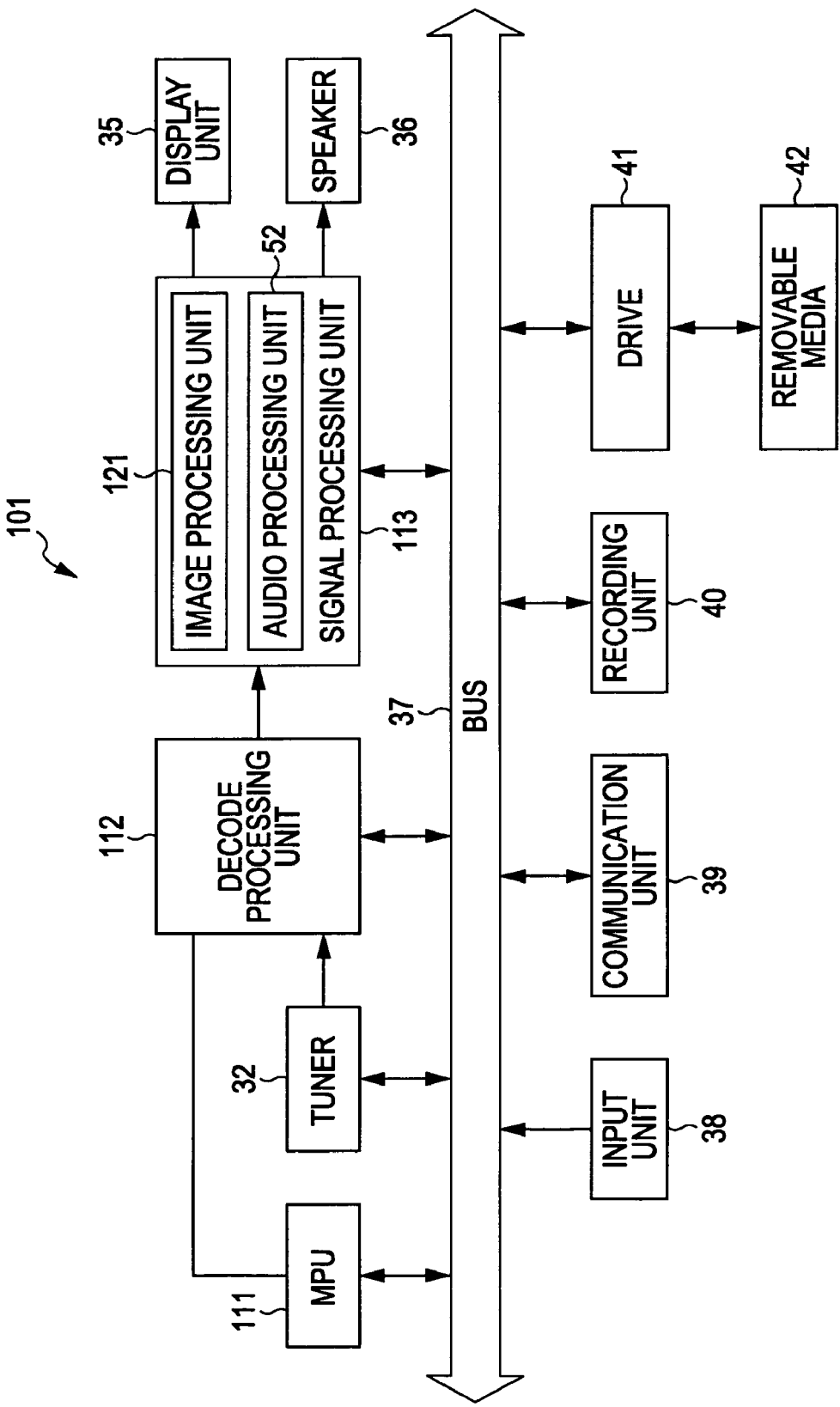
FIG. 8 is a block diagram of another configuration example of the reception apparatus which displays an image of a television broadcasting program at a high frame rate.

FIG. 8 illustrates another configuration example of the reception apparatus which displays an image of a television broadcasting program at a high frame rate.

In a reception apparatus 101 of FIG. 8, the tuner 32, the input unit 38, the communication unit 39, the recording unit 40, the drive 41, an MPU 111, a decode processing unit 112, a signal processing unit 113 to which the display unit 35 and the speaker 36 are connected are mutually connected via the bus 37, and the decode processing unit 112 performs the overlapping. It should be noted that the same components as those in FIG. 1 are denoted by the same reference numerals, and the description thereof will be omitted to avoid the repetition.

A port of the MPU 111 is connected to a port of the decode processing unit 112. By controlling the port, the MPU 111 performs a communication with the decode processing unit 112. The MPU 111 executes various processings, for example, by executing the program installed to the recording unit 40 in response to an instruction or the like input from the input unit 38. For example, in accordance with a state of the port of the decode processing unit 112, the MPU 111 supplies the OSD information and the interpolation stopping instruction, or the interpolation resuming instruction via the bus 37 to an image processing unit 121 of the signal processing unit 113.

Furthermore, similarly to the MPU 31 of FIG. 1, in response to an instruction for displaying a program of a channel desired by the user which is input from the input unit 38, the MPU 111 controls the tuner 32, the decode processing unit 112, and the signal processing unit 113 to display the image corresponding to the program signal of the channel on the display unit 35 and also output the audio from the speaker 36.

Also, similarly to the MPU 31, the MPU 111 installs the program downloaded by the communication unit 39 or the program recorded on the removal media 42 which is mounted to the drive 41 into the recording unit 40 as occasion demands.

The decode processing unit 112 decodes the program signal supplied from the tuner 32 through a predetermined method such as MPEG2 similarly to the decode processing unit 33 of FIG. 1 under the control of the MPU 111. Also, in response to the OSD display instruction and the OSD information or the OSD ending instruction supplied from the input unit 38, the decode processing unit 112 controls the port to change the state of the port to a state representing the OSD information and the state representing the interpolation stopping instruction or a state representing the interpolation resuming instruction. After that, the decode processing unit 112 overlaps the previously stored OSD image signal at the position of the input image signal which is the image signal among the program signal after the decode based on the OSD information and supplies the signal to the image processing unit 121.

As described above, the decode processing unit 112 changes the state of the port to send the OSD information and the interpolation stopping instruction, or the interpolation resuming instruction, and therefore the sending completion is not checked. Therefore, as compared with the case where the sending via the bus 37 is performed which requests the checking of the sending completion, after sending the OSD information and the interpolation stopping instruction, the decode processing unit 112 can immediately start the overlap of the OSD image signal. As a result, a response speed to the OSD image display can be increased.

The signal processing unit 113 is composed of the audio processing unit 52 and the image processing unit 121. The image processing unit 121 performs a processing such as an overlap of the OSD image signal, an interpolation of an image signal at an intermediate time between continuous input image signals, or a D/A conversion on the input image signal supplied from the decode processing unit 112. The image processing unit 121 supplies an image signal which is an analog signal obtained as the result to the display unit 35 to display the image on the display unit 35.

Next, with reference to FIG. 9, the interpolation in the reception apparatus 101 of FIG. 8 will be described.

Figure 9:
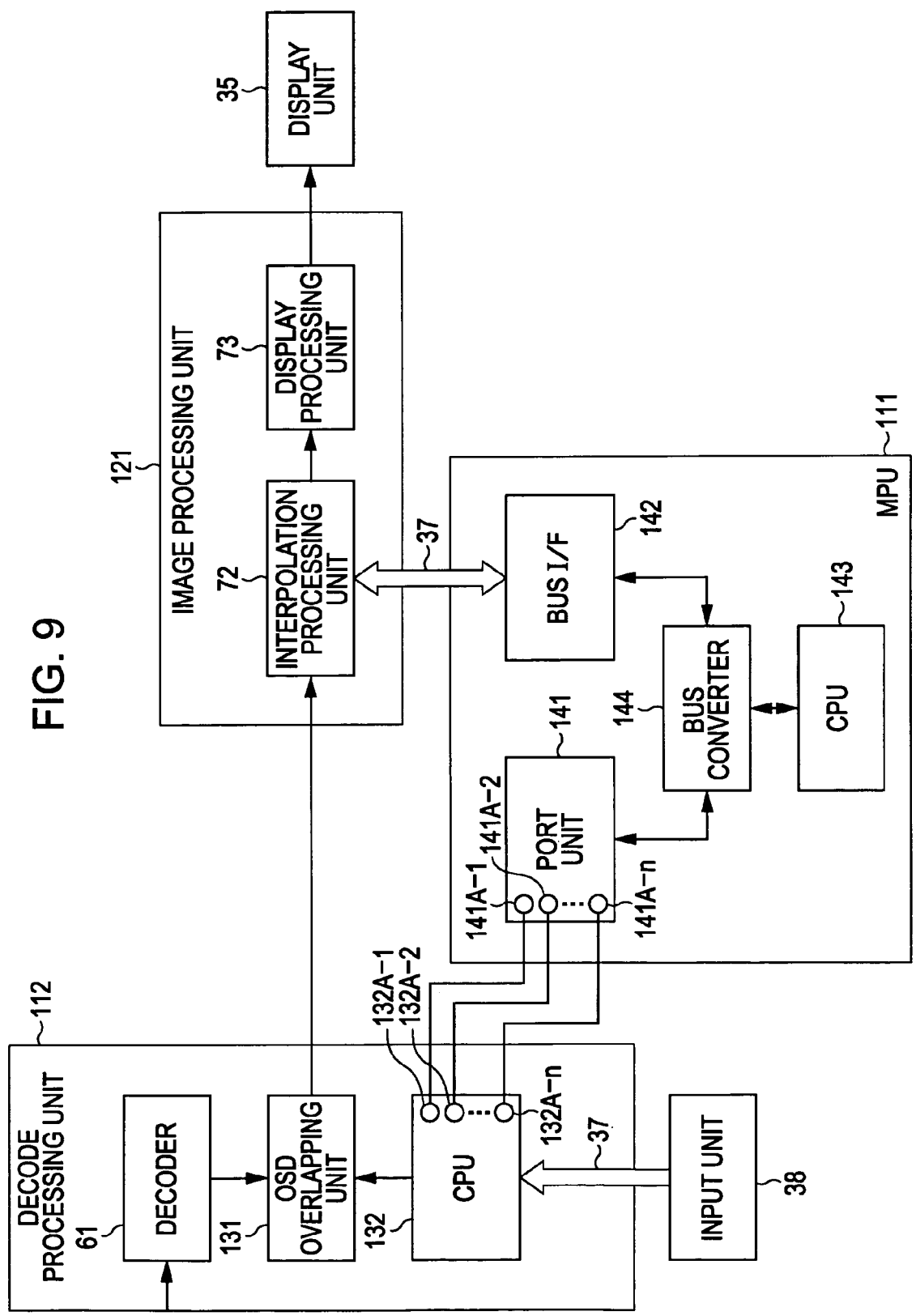
FIG. 9 is a block diagram for describing an interpolation in the reception apparatus of FIG. 8.

It should be noted that in FIG. 9, the same components as those in FIG. 2 are denoted by the same reference numerals, and the description thereof will be omitted appropriately to avoid the repetition.

As illustrated in FIG. 9, when the input unit 38 accepts the instruction for starting or ending of the display of the OSD image from the user, the input unit 38 supplies the OSD display instruction and the OSD information, or the OSD ending instruction via the bus 37 to the decode processing unit 112.

The decode processing unit 112 of FIG. 9 is composed of the decoder 61, an OSD overlapping unit 131, and a CPU (Central Processing Unit) 132. The OSD overlapping unit 131 stores the OSD image signal. The OSD overlapping unit 131 overlaps the previously stored OSD image signal on the input image signal supplied from the decoder 61 on the basis of the overlap starting instruction and the OSD information supplied from the CPU 132, and supplies the input image signal after the overlap to the interpolation processing unit 72 of the image processing unit 121. Also, in response to the overlap stopping instruction supplied from the CPU 132, the OSD overlapping unit 131 ends the overlap of the OSD image signal with respect to the input image signal supplied from the decoder 61 and supplies the input image signal supplied from the decoder 61 to the interpolation processing unit 72 as it is.

The CPU 132 includes n ports 132A-1 to 132A-n (n is an integer equal to or larger than 1) which are respectively connected to n ports 141A-1 to 141A-n (which will be described below) of the MPU 111. The port 132A-1 is a port for sending the interpolation stopping instruction, the port 132A-2 is a port for sending the interpolation resuming instruction, and the ports 132A-3 to 132A-n are ports for sending the OSD.

In accordance with the OSD display instruction and the OSD information supplied from the input unit 38 via the bus 37, the CPU 132 controls the ports 132A-1 to 132A-n to set the state of the port 132A-1 as the state representing the interpolation stopping instruction and set the states of the ports 132A-3 to 132A-n as the state representing the OSD information. Then, the CPU 132 supplies the overlap starting instruction and the OSD information to the OSD overlapping unit 131. Also, in accordance with the OSD ending instruction supplied from the input unit 38, the CPU 132 controls the port 132A-2 to set the state of the port 132A-2 as the state representing the interpolation resuming instruction, and after that, supplies the overlap stopping instruction to the OSD overlapping unit 131.

In the MPU 111 of FIG. 9, a port unit 141 including the ports 141A-1 to 141A-n, a bus I/F (Interface) 142, and a CPU 143 are connected via a bus converter 144. The port unit 141 checks states of the ports 141A-1 to 141A-n respectively connected to the ports 132A-1 to 132A-n of the CPU 132 under the control of the CPU 143. The port unit 141 sets the signals representing the states of the ports 141A-1 to 141A-n as state signals representing the states of the ports 132A-1 to 132A-n and supplies the signals via the bus converter 144 to the CPU 143.

The bus I/F 142 performs a communication via the bus 37 with the image processing unit 121. For example, the bus I/F 142 sends the interpolation stopping instruction and the OSD information, or the interpolation resuming instruction supplied from the CPU 143 via the bus converter 144 to the interpolation processing unit 72 of the image processing unit 121 via the bus 37.

While following a predetermined program, the CPU 143 controls both the port unit 141 and the bus I/F 142. For example, at a predetermined interval, the CPU 143 sends control signals for checking the states of the ports 141A-1 to 141A-n of the port unit 141 to the port unit 141 via the bus converter 144 to perform polling. Also, as a result of the polling, in accordance with the state signals sent from the port unit 141 via the bus converter 144, the CPU 143 supplies the interpolation stopping instruction and the OSD information, or the interpolation resuming instruction via the bus converter 144 to the bus I/F 142.

The bus converter 144 is connected to the port unit 141, the bus I/F 142, and the CPU 143 via the bus, and controls a communication between those components via the bus.

The image processing unit 121 is composed of the interpolation processing unit 72 and the display processing unit 73. In response to the interpolation stopping instruction and the OSD information or the interpolation resuming instruction supplied from the bus I/F 142 of the MPU 111 via the bus 37, The interpolation processing unit 72 performs the interpolation on the input image signal supplied from the OSD overlapping unit 131 of the decode processing unit 112. The interpolation processing unit 72 supplies the image signal after the interpolation to the display processing unit 73. The display processing unit 73 displays the image on the display unit 35 on the basis of the image signal after the interpolation supplied from the interpolation processing unit 72 similarly to the case in FIG. 2.

Next, with reference to FIGS. 10A and 10B, notification timings for the interpolation stopping instruction and the interpolation resuming instruction will be described. It should be noted that in FIGS. 10A and 10B, the horizontal axis represents time.

Figure 10:
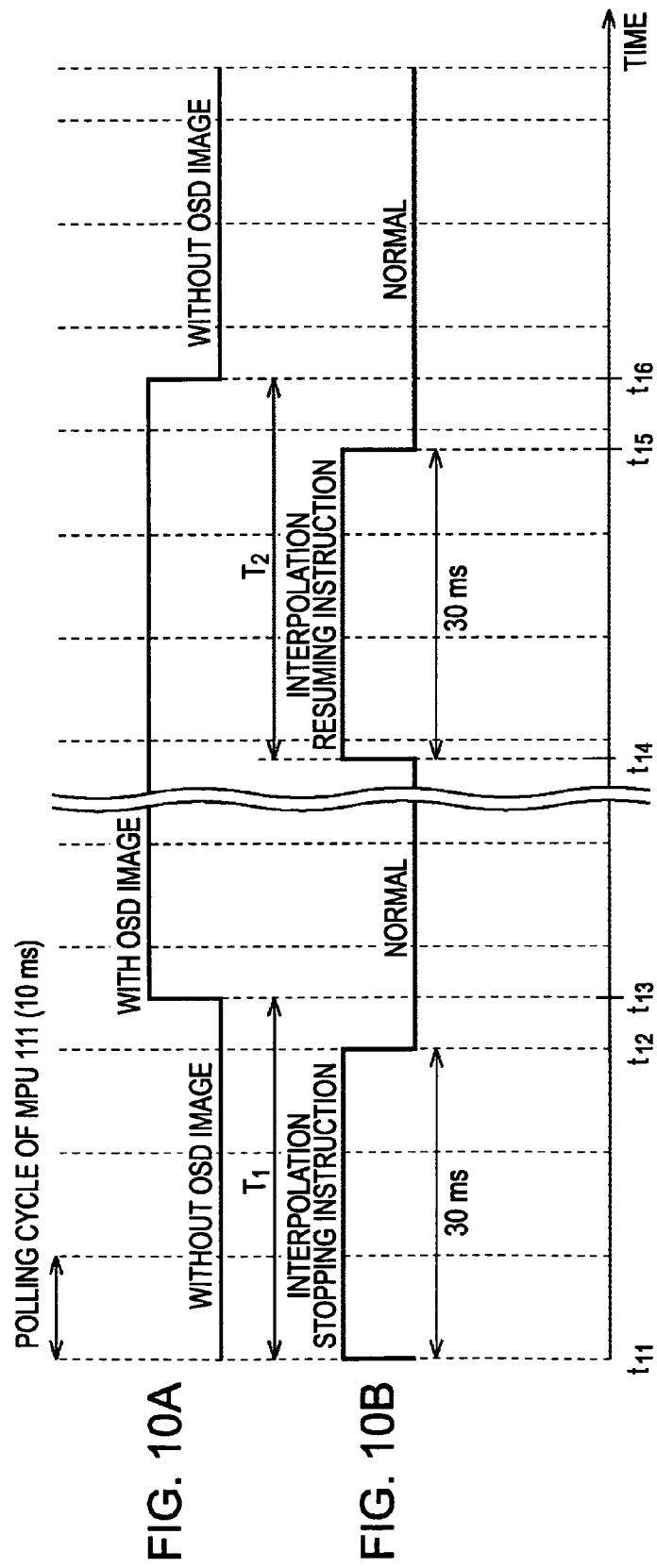
FIGS. 10A and 10B are timing charts for describing notification timings for an interpolation stopping instruction and an interpolation resuming instruction.

Also, in the example of FIGS. 10A and 10B, an interval of polling performed by the CPU 143 of the MPU 111 is set as 10 ms. In this case, in order for the port unit 141 to check the states of the ports 132A-1 to 132A-n, the states of the ports 132A-1 to 132A-n are to be maintained for at least 20 ms. In view of the above, in the example of FIGS. 10A and 10B, by allowing for an interrupt processing and the like, the CPU 132 maintains the states of the ports 132A-1 to 132A-n for 30 ms, but a period of time during which the states are maintained is not limited to 30 ms as far as the states of the ports 132A-1 to 132A-n can be checked by the port unit 141 (in the example of FIGS. 10A and 10B, equal to or longer than 20 ms).

At a time $t_{11}$ in FIGS. 10A and 10B, when the CPU 132 is supplied with the OSD display instruction and the OSD information from the input unit 38, as illustrated in FIG. 10B, until a time $t_{12}$ which is 30 ms after the time $t_{11}$, the CPU 132 sets the state of the port 132A-1 as the state representing the interpolation stopping instruction. Also, during this period, the CPU 132 sets the states of the ports 132A-3 to 132A-n as the states representing the OSD information. Then, by performing the polling at an interval of 10 ms, the MPU 111 recognizes the interpolation stopping instruction and the OSD information to be supplied to the interpolation processing unit 72. As a result, the interpolation based on the motion vector is stopped in the interpolation stopping area specified on the basis of the OSD information.

After that, at a time $t_{13}$, the CPU 132 supplies the interpolation starting instruction to the OSD overlapping unit 131, and as illustrated in FIG. 10A, the OSD overlapping unit 131 starts the overlap of the OSD image signal in response to the instruction. As a result, the OSD image is displayed on the display unit 35. It should be noted that a time period $T_1$ from the time $t_{11}$ to the time $t_{13}$ is equal to or longer than a time period from when the MPU 111 recognizes the interpolation stopping instruction by performing the polling and until the interpolation stopping instruction is supplied to the interpolation processing unit 72.

As described above, in the reception apparatus 101, up to the time $t_{13}$ when the overlap is started, with use of the MPU 111, the interpolation processing unit 72 is supplied with the interpolation stopping instruction. Thus, in response to the interpolation stopping instruction, the interpolation processing unit 72 stops the interpolation based on the motion vector in the interpolation stopping area, and it is therefore possible to improve the quality of the image signal after the interpolation.

Next, at a time $t_{14}$, when the CPU 132 is supplied with the OSD ending instruction from the input unit 38, as illustrated in FIG. 10B, until time $t_{15}$ which is 30 ms after the time $t_{14}$, the CPU 132 sets the state of the port 132A-2 as the state representing the interpolation resuming instruction. Then, by performing the polling at an interval of 10 ms, the MPU 111 recognizes this interpolation resuming instruction to be the interpolation processing unit 72. As a result, the interpolation based on the motion vector in the entire area is started.

After that, at a time $t_{16}$, the CPU 132 supplies the overlap stopping instruction to the OSD overlapping unit 131, and as illustrated in FIG. 10A, the OSD overlapping unit 131 stops the overlap of the OSD image signal in response to the instruction. As a result, the OSD image is not displayed on the display unit 35. It should be noted that a time period T2 from the time $t_{14}$ to the time $t_{16}$ is equal to or longer than a time period from when the MPU 111 recognizes the interpolation resuming instruction by performing the polling and until the interpolation resuming instruction is supplied to the interpolation processing unit 72.

It should be noted that in the example of FIGS. 10A and 10B, the overlap of the OSD image signal is stopped after the interpolation stopping instruction is supplied to the interpolation processing unit 72, but after the overlap of the OSD image signal is stopped, the interpolation stopping instruction may be supplied to the interpolation processing unit 72.

Figure 11:
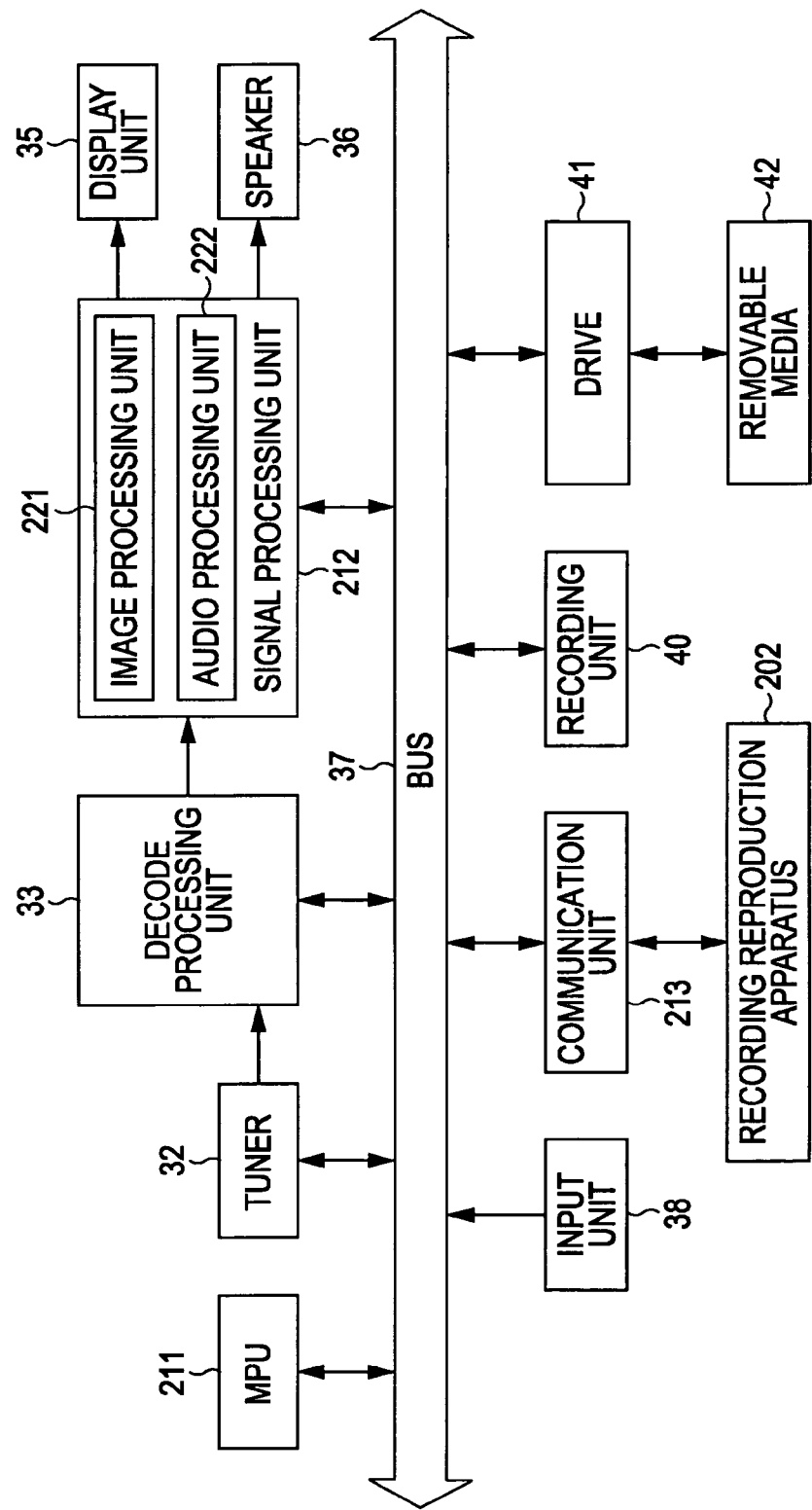
FIG. 11 is a block diagram of still another configuration example of the reception apparatus which displays an image of a television broadcasting program at a high frame rate.

FIG. 11 illustrates still another configuration example of the reception apparatus which displays an image of a television broadcasting program at a high frame rate.

In the reception apparatus 201 of FIG. 11, the tuner 32, the decode processing unit 33, the input unit 38, the recording unit 40, the drive 41, an MPU 211, a signal processing unit 212 to which the display unit 35 and the speaker 36 are connected, and a communication unit 213 are mutually connected via the bus 37. An external recording reproduction apparatus 202 connected to the reception apparatus 201 via a connection cable (not shown) performs the overlapping. It should be noted that the same components as those in FIGS. 1 and 8 are denoted by the same reference numerals, and the description thereof will be omitted to avoid the repetition.

The MPU 211 executes various processings, for example, by executing the program installed to the recording unit 40 in response to an instruction or the like input from the input unit 38. For example, similarly to the MPU 31 of FIG. 1, in response to the instruction for displaying the program of the channel desired by the user, the MPU 211 controls the tuner 32, the decode processing unit 33, and the signal processing unit 212 to display the image corresponding to the program signal of the channel on the display unit 35 and also output the audio from the speaker 36.

Also, on the basis of the OSD display instruction and the OSD information supplied from the communication unit 213, the MPU 211 supplies the interpolation stopping instruction and the OSD information to an image processing unit 221. Furthermore, in response to the OSD ending instruction supplied from the communication unit 213, the MPU 211 supplies the interpolation resuming instruction to the image processing unit 221. Also, similarly to the MPU 31 of FIG. 1, the MPU 211 installs the program downloaded by the communication unit 213 and the program recorded on the removal media 42 which is mounted to the drive 41 into the recording unit 40 as occasion demands.

The signal processing unit 212 is composed of the image processing unit 221 and an audio processing unit 222. The image processing unit 221 performs a processing such as an interpolation of an image signal at an intermediate time between continuous input image signals or the reception image signals or a D/A (Digital/Analog) conversion, on an image signal among an input image signal supplied from the decode processing unit 33 or an image signal among the program signal supplied from the communication unit 213 (hereinafter, referred to as reception image signal). The image processing unit 221 supplies an image signal which is an analog signal obtained as the result to the display unit 35 to display the image on the display unit 35.

The audio processing unit 222 performs the conversion or the like on the audio signal among the program signal supplied from the decode processing unit 33 or the communication unit 213 to supply an audio signal which is an analog signal obtained as the result to the speaker 36 and output the audio to the outside.

The communication unit 213 is connected to the external recording reproduction apparatus 202 via a connection cable (not shown) to perform a communication with the recording reproduction apparatus 202. For example, the communication unit 213 receives the OSD display instruction and the OSD information, or the OSD ending instruction from the recording reproduction apparatus 202, and supplies the OSD display instruction and the OSD information, or the OSD ending instruction via the bus 37 to the MPU 211. Also, the communication unit 213 receives the program signal from the recording reproduction apparatus 202 and supplies the program signal to the signal processing unit 212. Furthermore, the communication unit 213 performs sending and reception of various pieces of data via a network such as the internet (not shown) similarly to the communication unit 39 of FIG. 1 or 8. For example, the communication unit 213 downloads a predetermined program from a server (not shown) via the network and supplies the program to the MPU 211.

The recording reproduction apparatus 202 is composed, for example, of a DVD (Digital Versatile Disc) recorder, a hard disk recorder, or the like. The recording reproduction apparatus 202 receives radio waves of the program signal of the program desired by the user and records the program signal on the recording medium such as the DVD or the hard disk. The recording reproduction apparatus 202 reproduces the recorded program signal in response to a reproduction instruction from the user, and sends program signal to the communication unit 213.

Also, in response to the OSD display instruction or the OSD ending instruction from the user, the recording reproduction apparatus 202 sends the OSD display instruction and the OSD information, or the OSD ending instruction to the communication unit 213. After the sending of the OSD display instruction, the recording reproduction apparatus 202 overlaps the previously stored OSD image signal at a position based on the OSD information of the image signal among the reproduced program signal, and sends the program signal obtained as the result to the communication unit 213.

Next, with reference to FIG. 12, an interpolation of the reception image signal in the reception apparatus 201 of FIG. 11 will be described.

Figure 12:
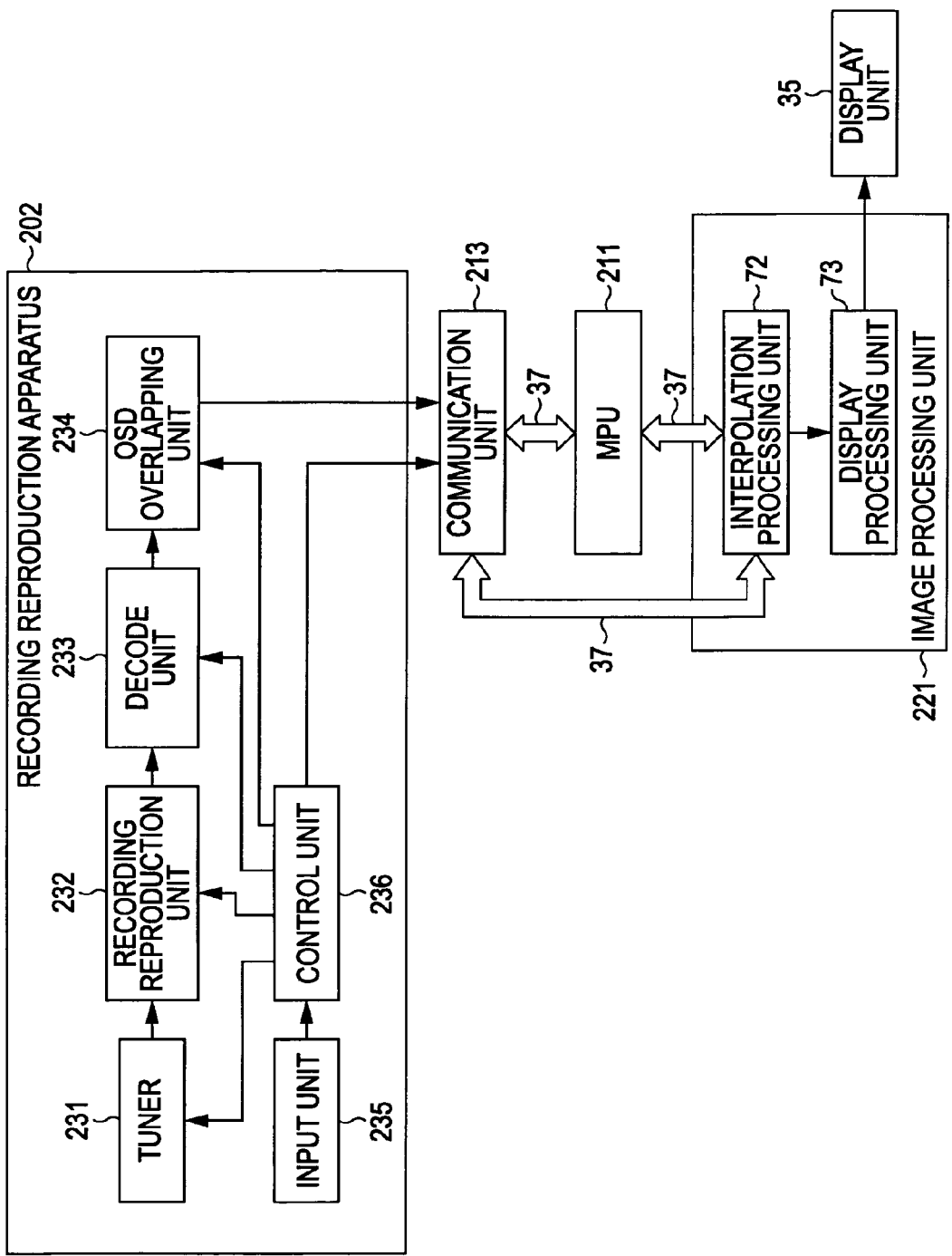
FIG. 12 is a block diagram for describing an interpolation of a reception image signal in the reception apparatus of FIG. 11.

It should be noted that in FIG. 12, the same components as those in FIGS. 2 and 9 are denoted by the same reference numerals, and the description thereof will be omitted appropriately to avoid the repetition.

The recording reproduction apparatus 202 of FIG. 12 is composed of a tuner 231, a recording reproduction unit 232, a decode unit 233, an OSD overlapping unit 234, an input unit 235, and a control unit 236.

Under the control of the control unit 236, the tuner 231 receives the radio wave of the program signal emitted from a broadcasting station (not shown) for demodulation. The tuner 231 supplies a program signal obtained as the result of the demodulation to the recording reproduction unit 232 for recording.

The recording reproduction unit 232 records the program signal supplied from the tuner 231 on the recording medium (not shown) such as the removal media such as the DVD mounted thereto or a built-in hard disk. The recording reproduction unit 232 reads out the recorded program signal under the control of the control unit 236, and supplies the program signal to the decode unit 233.

The decode unit 233 decodes the program signal supplied from the recording reproduction unit 232 through a predetermined method under the control of the control unit 236, and supplies the program signal obtained as the result to the OSD overlapping unit 234.

In response to the overlap starting instruction supplied from the control unit 236, the OSD overlapping unit 234 overlaps the previously stored OSD image signal at a potion based on the OSD information supplied from the control unit 236 of the image signal among the program signal supplied from the decode unit 233. Then, the OSD overlapping unit 234 sends the program signal obtained as the result to the communication unit 213 of the reception apparatus 201 through a communication via a SCART terminal, an HDMI (High-Definition Multimedia Interface) communication, or the like. Also, in response to the overlap stopping instruction supplied from the control unit 236, the OSD overlapping unit 234 sends the program signal supplied from the decode unit 233 to the communication unit 213 as it is.

The input unit 235 is composed, for example, of a reception unit configured to receive an instruction sent from a remote controller (not shown), a button, a keyboard, a mouse, a switch, and the like and accepts an instruction from the user. The input unit 235 supplies various instructions to the control unit 236 in response to the instruction from the user.

For example, in response to a recording or reproducing instruction of the program of the desired channel from the user, the input unit 235 supplies the instruction for recording or reproducing the program to the control unit 236. Also, in response to the OSD display instruction or the OSD ending instruction from the user, the input unit 235 supplies the OSD display instruction and the OSD information, or the OSD ending instruction to the control unit 236.

The control unit 236 performs various processings in response to an instruction or the like input from the input unit 235. For example, the control unit 236 controls the tuner 231 in response to the instruction for recording the program of the channel desired by the user input from the input unit 235, and records the program signal of the program in the recording reproduction unit 232. Also, the control unit 236 controls the recording reproduction unit 232 and the decode unit 233 in response to the instruction for reproducing the program of the channel desired by the user input from the input unit 235, and reproduces the program signal of the program from the recording reproduction unit 232.

Furthermore, in response to the OSD display instruction and the OSD information input from the input unit 235, the control unit 236 sends the OSD display instruction and the OSD information to the communication unit 213 through a CEC line (Consumer Electronics Control Line) of HDMI communication, an AV link (AV Link) specified as EN-50157 in CENELEC (European Committee for Electro technical Standardization, or the like. After that, the control unit 236 supplies the overlap starting instruction and the OSD information to the OSD overlapping unit 234. Also, in response to the OSD ending instruction, the control unit 236 supplies the overlap stopping instruction to the OSD overlapping unit 234, and after that, sends the OSD ending instruction to the communication unit 213 through the CEC line of HDMI communication, the AV link, or the like.

The communication unit 213 receives the OSD display instruction and the OSD information or the OSD ending instruction sent from the control unit 236 to be supplied via the bus 37 to the MPU 211. Also, the communication unit 213 receives the program signal sent from the OSD overlapping unit 234, and supplies the reception image signal among the program signal to the interpolation processing unit 72 of the image processing unit 221. It should be noted that the audio signal is supplied to the audio processing unit 222 (FIG. 11). In response to the OSD display instruction and the OSD information, the MPU 211 supplies the interpolation stopping instruction and the OSD information via the bus 37 to the interpolation processing unit 72. Also, in response to the OSD ending instruction, the MPU 211 supplies the interpolation resuming instruction to the interpolation processing unit 72.

As described above, before the interpolation starting instruction, the control unit 236 of the external recording reproduction apparatus 202 in the reception apparatus 201 sends the OSD information and the OSD display instruction to the reception apparatus 201 to stop the interpolation using the motion vector in the interpolation stopping area based on the OSD information. Thus, even in a case where the OSD image signal is overlapped by the external recording reproduction apparatus 202, the reception apparatus 201 can improve the quality of the image signal after the interpolation.

Figure 13:
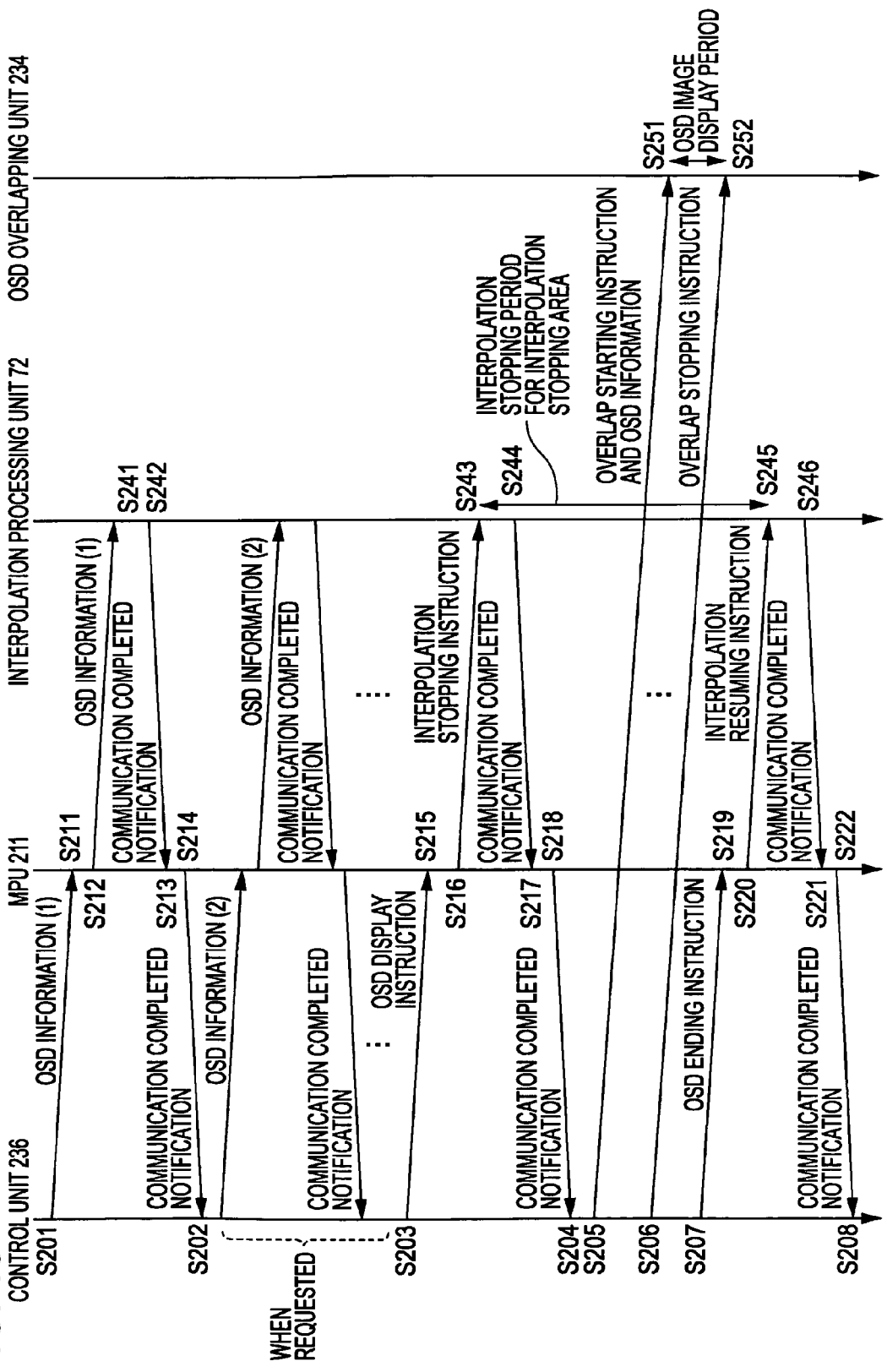
FIG. 13 is a flowchart for describing an OSD overlap processing in the reception apparatus of FIG. 11.

Next, with reference to FIG. 13, the OSD overlap processing in the reception apparatus 201 of FIG. 11 and the recording reproduction apparatus 202 will be described.

In step S201, the control unit 236 obtains the OSD display instruction and at least one piece of the OSD information of the OSD image supplied from the input unit 235, and sends one piece of the OSD information via the communication unit 213 of the reception apparatus 201 to the MPU 211.

In step S211, the MPU 211 receives the OSD information sent from the control unit 236, and in step S212, and sends the OSD information via the bus 37 to the interpolation processing unit 72. In step S241, the interpolation processing unit 72 receives the OSD information sent from the MPU 211, and in step S242, sends the notification on the communication completion of the OSD information to the MPU 211.

In step S213, the MPU 211 receives the notification on the communication completion sent from the interpolation processing unit 72, and in step S214, sends the notification on the communication completion of the OSD information to the control unit 236. In step S202, the control unit 236 receives the notification on the communication completion sent from the MPU 211.

While following the similar manner in the subsequent stages, by the number of pieces of the OSD information supplied from the input unit 235 to the control unit 236, the processing in steps S201 and S202, the processing in steps S211 to S214, and the processing in steps S241 and S242 are repeatedly performed.

After that, in step S203, the control unit 236 sends the OSD display instruction to the MPU 211, and in step S215, the MPU 211 receives the OSD display instruction. In step S216, in response to the OSD display instruction received in step S215, the MPU 211 sends the interpolation stopping instruction to the interpolation processing unit 72, and in step S243, the interpolation processing unit 72 receives the interpolation stopping instruction. Then, in response to this interpolation stopping instruction, the interpolation processing unit 72 starts to stop the interpolation using the motion vector in the interpolation stopping area. In step S244, the interpolation processing unit 72 sends the notification on the communication completion of the interpolation stopping instruction to the MPU 211, and in step S217, the MPU 211 receives the notification.

In step S218, the MPU 211 sends the notification on the communication completion of the OSD display instruction to the control unit 236, and in step S204, the control unit 236 receives the notification. In step S205, the control unit 236 sends the interpolation starting instruction and all the pieces of the OSD information obtained from the input unit 235 to the OSD overlapping unit 234. In step S251, the OSD overlapping unit 234 receives the overlap starting instruction and the OSD information sent from the control unit 236, and in response to the overlap starting instruction, starts the overlap of the OSD image signal with respect to the position based on the OSD information of the input image signal supplied from the decode unit 233. As a result, the display unit 35 displays the OSD image.

While following the similar manner in the subsequent stages, until the OSD ending instruction is supplied from the input unit 235 to the control unit 236, each time the OSD display instruction is supplied from the input unit 235 to the control unit 236, the processing in steps S201 to S205, the processing in steps S211 to S218, the processing in steps S241 to S244, and the processing in step S251 are repeatedly performed.

In step S206, the control unit 236 obtains the OSD ending instruction supplied from the input unit 235, and sends the OSD ending instruction to the OSD overlapping unit 234 in response to the OSD ending instruction. In step S252, the OSD overlapping unit 234 receives the overlap stopping instruction sent from the control unit 236, and ends the overlap of the OSD image signal with respect to the input image signal in response to the overlap stopping instruction. As a result, from the time when the OSD overlapping unit 234 performs the processing in step S251, until the processing in step S252 is performed, the OSD image is displayed on the display unit 35.

In step S207, the control unit 236 sends the OSD ending instruction to the MPU 211, and in step S219, the MPU 211 receives the OSD ending instruction. In step S220, in response to the OSD ending instruction received in step S219, the MPU 211 sends the interpolation resuming instruction to the interpolation processing unit 72, and in step S245, the interpolation processing unit 72 receives the interpolation resuming instruction. Then, the interpolation processing unit 72 starts the interpolation using the motion vector in the entire area in response to this interpolation resuming instruction. Therefore, from the time when the processing in step S243 is performed, until the processing in step S245 is performed, the interpolation using the motion vector in the interpolation stopping area is stopped.

In step S246, the interpolation processing unit 72 sends the notification on the communication completion of the interpolation resuming instruction to the MPU 211, and in step S221, the MPU 211 receives the notification. In step S222, the MPU 211 sends the notification on the communication completion of the OSD ending instruction to the control unit 236, and in step S208, the control unit 236 receives the notification.

It should be noted that the processing amount of the reception apparatus 11 (101, 201) has a limit due to restriction in terms of hardware. For example, in a case where the number of the interpolation stopping areas is large, it is difficult to set the configuration so as not to perform the interpolation in all the interpolation stopping areas. In view of the above, in such a case, the reception apparatus 11 (101, 201) selects a predetermined number of the interpolation stopping areas among all the interpolation stopping areas, and the interpolation only in the selected interpolation stopping areas may be stopped.

The configuration of the interpolation processing unit 72 in this case will be described with reference to FIG. 14. It should be noted that in this case, the OSD information also includes information indicating a type of the OSD image.

In FIG. 14, the interpolation processing unit 72 is composed of the frame memory 81, the detection unit 82, the shifting unit 83, the mixing unit 85, the selection unit 86, a specification unit 251, and a final area decision unit 252. It should be noted that the same components as those in FIG. 3 are denoted by the same reference numerals, and the description thereof will be omitted to avoid the repetition.

The specification unit 251 specifies at least one interpolation stopping area on the basis of the input interpolation stopping instruction and the OSD information similarly to the specification unit 84 of FIG. 3. Then, the specification unit 251 supplies the interpolation stopping area to the final area decision unit 252 together with the corresponding OSD information.

Also, similarly to the specification unit 84, in response to the input interpolation resuming instruction, as the interpolation stopping area, the specification unit 251 specifies zero representing no relevant areas existing. The specification unit 251 supplies the interpolation stopping area to the final area decision unit 252.

In a case where the number of the interpolation stopping areas other than zero supplied from the specification unit 251 is larger than a predetermined number previously set, on the basis of the OSD information supplied together with the interpolation stopping area, the final area decision unit 252 selects the predetermined number of the interpolation stopping areas. Then, the final area decision unit 252 supplies the selected interpolation stopping areas to the mixing unit 85.

On the other hand, in a case where the number of the interpolation stopping areas other than zero supplied from the specification unit 251 the final area decision unit 252 is equal to or smaller than the predetermined number previously set, the final area decision unit 252 supplies the interpolation stopping areas to the mixing unit 85 as they are. Furthermore, the final area decision unit 252 supplies the interpolation stopping areas representing zero supplied from the specification unit 251, to the mixing unit 85 as they are.

Next, with reference to FIGS. 15A and 15B and FIGS. 16A and 16B, a selection performed by the final area decision unit 252 will be described.

Figure 15A:
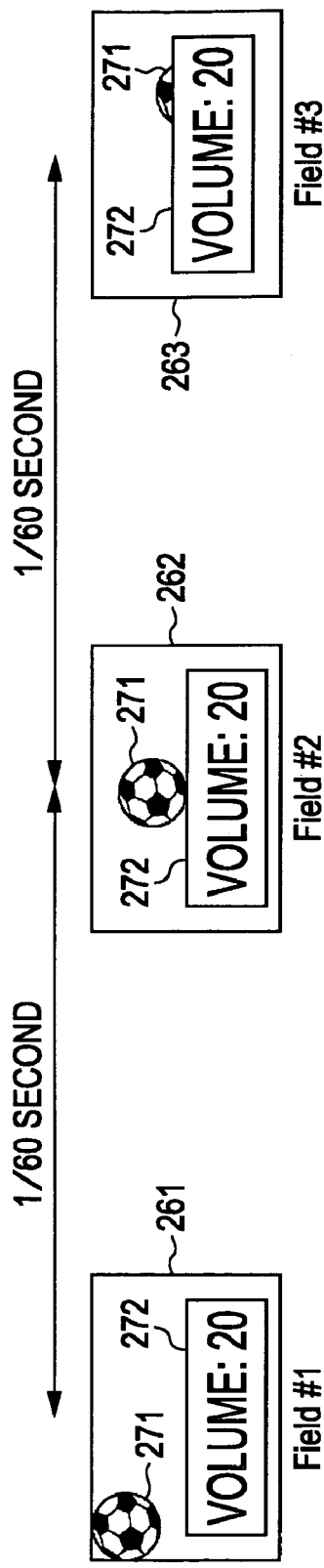
FIGS. 15A and 15B are explanatory diagrams for describing a selection by a final area decision unit.
Figure 15B:
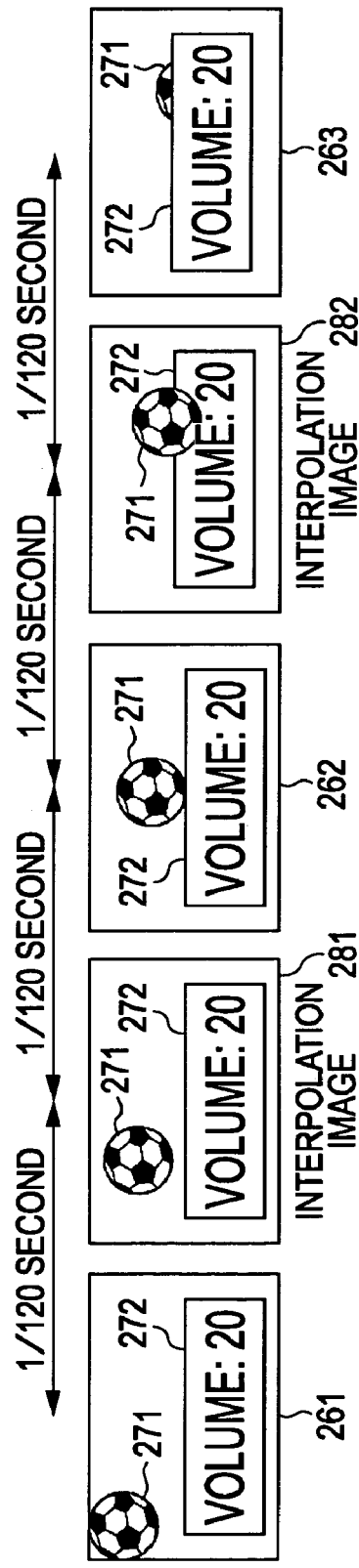

As illustrated in FIG. 15A, in a case where images 261 to 263 before interpolation in time series are images in units of fields of a soccer ball 271 shifting from the upper left to the lower right of the screen where an OSD image 272 representing an audio level is overlapped, when the interpolation is performed on the images 261 to 263, the images after the interpolation in time series are as illustrated in FIG. 15B.

That is, the mixing unit 85 generates an image signal of an interpolation image 281 where the position of the soccer ball 271 is at an intermediate position between the position in the image 261 and the position in the image 262 as an interpolation signal for interpolating an image signal at an intermediate time of the input image signals of the image 261 and the image 262, on the basis of the motion vector of the image 262.

Similarly, the mixing unit 85 generates an image signal of an interpolation image 282 as an interpolation signal for interpolating an image signal at an intermediate time of the input image signals of the image 262 and the image 263, on the basis of the motion vector of the image 263.

However, as illustrated in FIGS. 15A and 15B, in the image 263, a part of the area of the soccer ball 271 is overlapped with a part of the area of the OSD image 272, and a part of the area of the soccer ball 271 is covered by the OSD image 272, and it is therefore difficult to generate the interpolation image 282 with precision. Therefore, for example, in the interpolation image 282, as illustrated in FIG. 15B, such an interpolation error is generated that a part of the soccer ball 271 blurs into the OSD image 272.

Figure 16B:
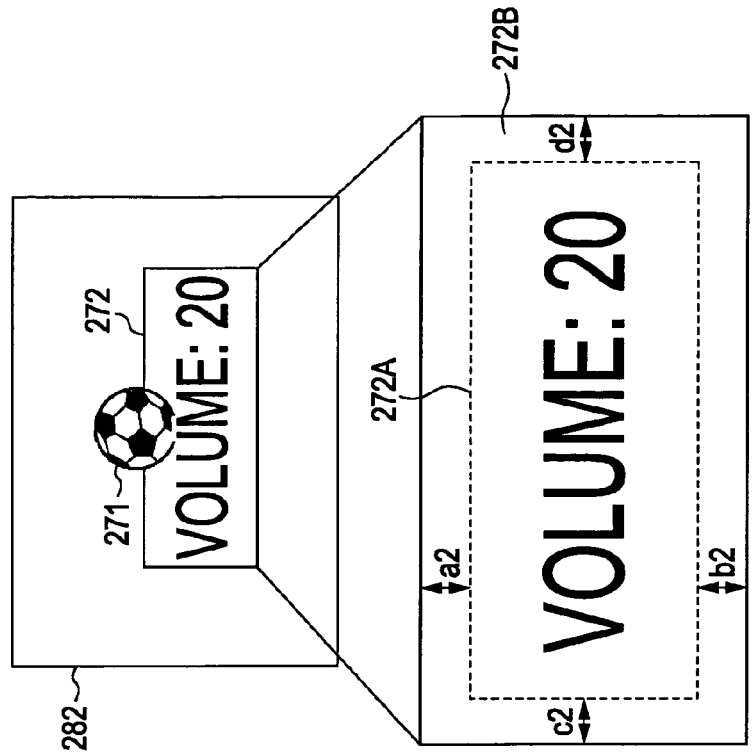
FIGS. 16A and 16B are explanatory diagrams for describing the selection by the final area decision unit.
Figure 16A:
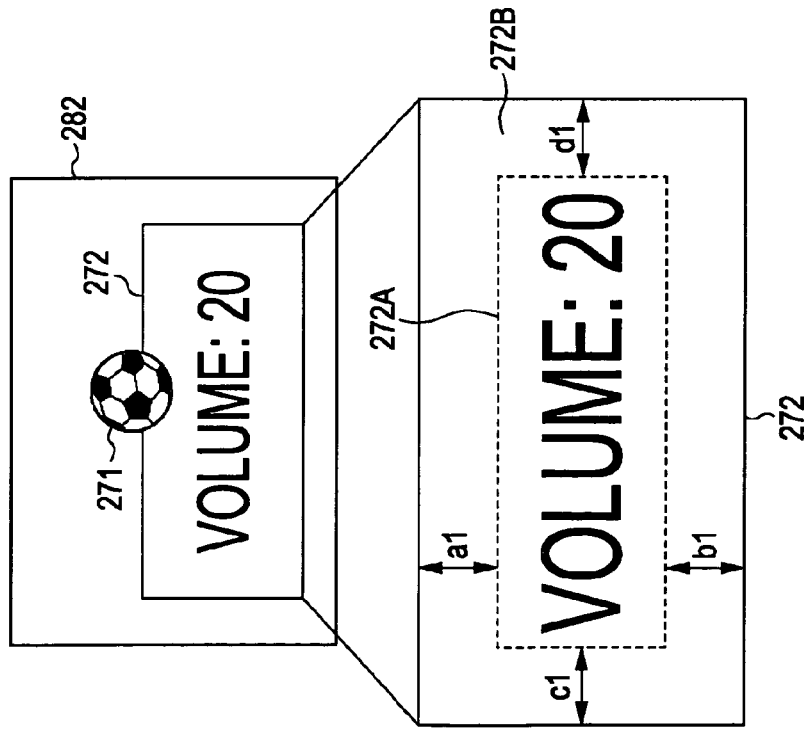

In this case, as illustrated in FIG. 16A, when widths a1 to d1 in up, down, left, and right directions of a non-display area 272B in the vicinity of a display area 272A in the OSD image 272 are large, characters displayed in the display area 272A are not overlapped by a part of the blurring soccer ball 271, and therefore the interpolation error is not obvious.

In contrast to the above, as illustrated in FIG. 16B, when widths a2 to d2 in up, down, left, and right directions of the non-display area 272B in the vicinity of the display area 272A in the OSD image 272 are small, the characters displayed in the display area 272A are overlapped by a part of the blurring soccer ball 271, and therefore the interpolation error tends to be obvious.

As described above, in general, the interpolation error is often generated at a border between the moving image functioning as the image of the program and the still image functioning as the OSD image. Thus, in a case where the OSD image in which sufficient widths of the non-display area in the vicinity of the display area are ensured is overlapped, the interpolation error tends to be obvious.

Therefore, for example, on the basis of the information indicating a type of the OSD image contained in the OSD information, the final area decision unit 252 selects with priority the interpolation stopping area which is an area of the OSD image of such a type that the sufficient widths of the non-display area in the vicinity of the display area are not ensured.

It should be noted that the selection method used by the final area decision unit 252 is not limited to the method described in FIGS. 15A and 15B and FIGS. 16A and 16B. The final area decision unit 252 may select, for example, the interpolation stopping areas in descending order of the size.

Also, in the above description, the interpolation stopping area is selected, but one area having a predetermined shape containing all the interpolation stopping areas may be set as the interpolation stopping area.

Furthermore, in a case where a sum of the areas occupied by all the interpolation stopping areas is equal to or larger than half of the area occupied by all the areas of the image after the interpolation, all the areas of the image after the interpolation may be set as the interpolation stopping area. In a case where the sum of the areas occupied by all the interpolation stopping areas is smaller than half of the area occupied by all the areas of the image after the interpolation, the interpolation stopping area representing zero may be set as the final interpolation stopping area. In this manner, in a case where the interpolation stopping area representing zero is set as the final interpolation stopping area, it is difficult to smoothly display the moving image, but it is possible to prevent the disturbance in the image caused by the interpolation error.

Moreover, in the above description, the input unit 38 (235) sends the OSD information, but in a case where the OSD information of the OSD image signal which can be overlapped is previously decided, the OSD overlapping unit 71 (131, 234) is arranged to previously store the OSD information, and the input unit 38 (235) may send the information for identifying the OSD information (for example, numbers). In this case, as the amount of information to be sent is reduced as compared with the case where the OSD information is sent, it is possible to promptly perform the sending, and as a result, it is possible to increase the responsiveness.

Also, in the above description, the overlap of all the OSD images is stopped at once, but the overlap of the OSD images may be individually stopped. In this case, together with the overlap stopping instruction and the interpolation resuming instruction, the OSD information of the OSD image which is a stopping target is sent from the input unit 38 (235). Then, the interpolation stopping area is newly specified on the basis of the OSD information, and the overlap of the OSD image which is the stopping target is stopped.

Furthermore, in the above description, the interpolation of the image of the television broadcasting program where the OSD image is overlapped. A description will be given below of an interpolation of an image where an image composed of at least one of input moving images and still images is synthesized.

FIG. 17 illustrates a configuration example of the reception apparatus to which an embodiment of the present invention is applied.

In the reception apparatus 311 of FIG. 17, the recording unit 40, the drive 41, an MPU 331, a tuner 332, the decode processing unit 333, a signal processing unit 334 to which the display unit 35 and the speaker 36 are connected, an input unit 335, and a communication unit 336 are mutually connected via the bus 37.

The reception apparatus 311 receives radio waves of digital signals of an image, audio, or the like in units of frames composed of at least one of the moving image and the still image of the television broadcasting program (hereinafter, referred to as television broadcasting signal), digital signals of an image, audio, or the like in units of frames composed of at least one of the moving image and the still image input from an external apparatus (not shown) connected via a cable or the like (hereinafter, referred to as external signal), and, digital signals of an image, audio, or the like in units of frames composed of at least one of the moving image and the still image provided via the internet (hereinafter, referred to as internet signal), and displays some of the images within a screen of the display unit 35. It should be noted that the same components as those in FIG. 1 are denoted by the same reference numerals, and the description thereof will be omitted to avoid the repetition.

The MPU 331 executes various processings, for example, by executing the program installed to the recording unit 40 in response to an instruction or the like input from the input unit 335.

For example, in response to an instruction for displaying a program of a channel of the television broadcasting desired by the user which is input from the input unit 335, the MPU 331 controls the tuner 332, the decode processing unit 333, and the signal processing unit 334 to display the image corresponding to the television broadcasting signal of the channel on the display unit 35. The MPU 331 outputs the audio corresponding to the television broadcasting signal from the speaker 36 as occasion demands.

Also, in response to an instruction for displaying an image corresponding to an external signal input from the input unit 335, the MPU 331 controls the decode processing unit 333 and the signal processing unit 334 to display the image of the external signal input from the communication unit 336 on the display unit 35. The MPU 331 outputs the audio corresponding to the external signal from the speaker 36 as occasion demands.

Furthermore, in response to an instruction for displaying an image corresponding to an internet signal desired by the user which is input from the input unit 335, the MPU 331 controls the communication unit 336, the decode processing unit 333, and the signal processing unit 334 to obtain the internet signal of the channel via the internet and display the image corresponding to the internet signal on the display unit 35. The MPU 331 outputs the audio corresponding to the internet signal from the speaker 36 as occasion demands.

Also, similarly to the MPU 31 of FIG. 1, the MPU 331 installs the program downloaded by the communication unit 336 or the program recorded on the removal media 42 mounted to the drive 41 into the recording unit 40 as occasion demands.

The tuner 332 receives the radio wave of the television broadcasting signal emitted from a broadcasting station (not shown) for demodulation under the control of the MPU 331 for demodulation. The tuner 332 supplies a television broadcasting signal obtained as the result of the demodulation to the decode processing unit 333.

The decode processing unit 333 decodes through a predetermined method such as MPEG2 under the control of the MPU 331, the television broadcasting signal supplied from the tuner 332, or the external signal or the internet signal input from the communication unit 336, and supplies the television broadcasting signal, the external signal, or the internet signal obtained as the result to the signal processing unit 334.

The signal processing unit 334 is composed of an image processing unit 351 and an audio processing unit 352. The image processing unit 351 performs a processing such as a synthesis of at least two image signals of the television broadcasting signal, the external signal, and the internet signal supplied from the decode processing unit 333, an interpolation of the synthesis signal at an intermediate time between the continuous synthesis signals obtained as the result, and the D/A conversion. Similarly to the image processing unit 51 of FIG. 1, the image processing unit 351 supplies the synthesis signal which is an analog signal obtained as the result to the display unit 35, and displays the synthesis image on the display unit 35.

The audio processing unit 352 performs the D/A conversion or the like on the audio signal among the television broadcasting signal, the external signal, and the internet signal supplied to the speaker 36 from the decode processing unit 333 to supply the audio signal which is an analog signal obtained as the result and output the audio to the outside.

Similarly to the input unit 38 of FIG. 1, for example, the input unit 335 is composed, for example, of a reception unit configured to receive an instruction sent from a remote controller (not shown), a button, a keyboard, a mouse, a switch, and the like and accepts an instruction from the user. The input unit 335 supplies the instruction from the user via the bus 37 to the MPU 331.

The communication unit 336 performs sending and reception of various pieces of data via a network such as the internet (not shown). For example, under the control from the MPU 331, the communication unit 336 requests an internet signal desired by the user to a server (not shown) via the internet and receives the internet signal. Then, the communication unit 336 supplies the internet signal to the decode processing unit 333.

Also, the communication unit 336 receives an external signal from an external apparatus such as a recording reproduction apparatus (not shown) through a communication vie the SCART terminal, the HDMI communication, or the like, and supplies the external signal to the decode processing unit 333. Furthermore, similarly to the communication unit 39 of FIG. 1, the communication unit 336 downloads a predetermined program from a server (not shown) via the network and supplies the program to the MPU 331.

Next, with reference to FIG. 18, the interpolation in the reception apparatus 311 of FIG. 17 will be described.

Figure 18:
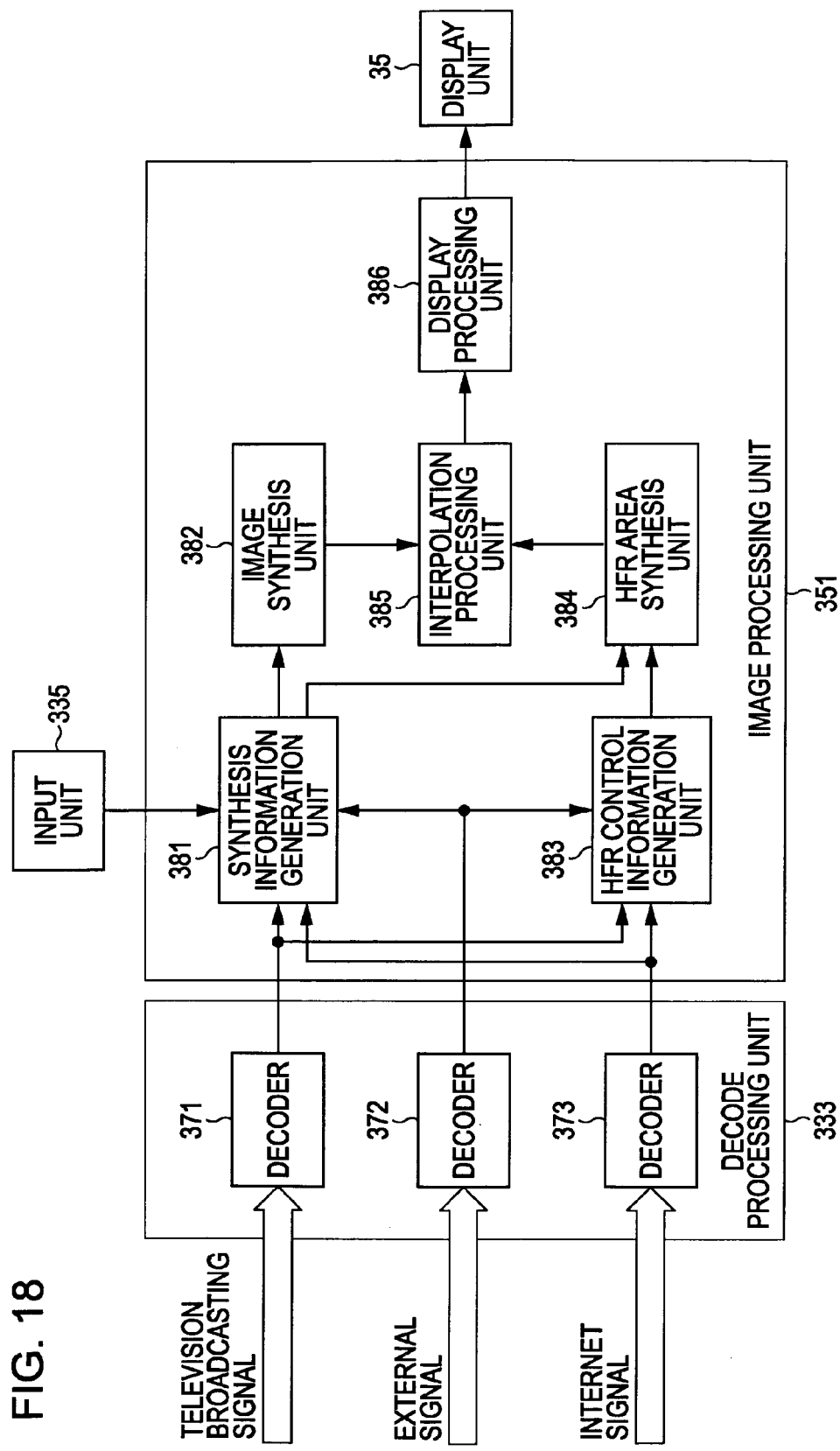
FIG. 18 is an explanatory diagram for describing an interpolation in the reception apparatus of FIG. 17.

As illustrated in FIG. 18, the decode processing unit 333 is composed of decoders 371 to 373. The decoder 371 decodes the television broadcasting signal input from the tuner 332, and supplies the decode signal obtained as the result to a synthesis information generation unit 381 and an HFR control information generation unit 383 of the image processing unit 351.

Also, the decoder 372 decodes the external signal supplied from the communication unit 336, and supplies the decode signal obtained as the result to the synthesis information generation unit 381 and the HFR control information generation unit 383. Furthermore, the decoder 373 decodes the internet signal supplied from the communication unit 336, and supplies the decode signal obtained as the result to the synthesis information generation unit 381 and the HFR control information generation unit 383 of the image processing unit 351.

The image processing unit 351 is composed of the synthesis information generation unit 381, an image synthesis unit 382, the HFR control information generation unit 383, an HFR area synthesis unit 384, an interpolation processing unit 385, and a display processing unit 386.

The synthesis information generation unit 381 generates synthesis information for controlling the synthesis in accordance with the instruction from the input unit 335, and supplies the synthesis information to the image synthesis unit 382 and the HFR area synthesis unit 384. Also, the synthesis information generation unit 381 extracts the image signal from the decode signal supplied from the decode processing unit 333, and supplies the image signal to the image synthesis unit 382.

The image synthesis unit 382 synthesizes the image signal supplied from the synthesis information generation unit 381 on the basis of the synthesis information supplied from the synthesis information generation unit 381, and supplies the image signal of the synthesis image obtained as the result to the interpolation processing unit 385 as the synthesis signal.

The HFR control information generation unit 383 decides, from the signal representing the content of the image signal corresponding to the image signal which is contained in the decode signal supplied from the decode processing unit 333, the area estimated as the still image among all the areas of the image corresponding to the image signal as an input HFR exclusion area which is an HFR exclusion area where the interpolation by the interpolation processing unit 385 in the image signal is not performed. Then, the HFR control information generation unit 383 generates the input HFR control information indicating the input HFR exclusion area. After that, the HFR control information generation unit 383 supplies the input HFR control information to the HFR area synthesis unit 384.

The HFR area synthesis unit 384 synthesizes the input HFR exclusion area indicated by the input HFR control information on the basis of the input HFR control information supplied from the HFR control information generation unit 383 and the synthesis information supplied from the synthesis information generation unit 381, and decides the area obtained as the result as a synthesis HFR exclusion area which is an HFR exclusion area in the synthesis signal. Then, the HFR area synthesis unit 384 supplies the synthesis HFR control information indicating the synthesis HFR exclusion area to the interpolation processing unit 385.

The interpolation processing unit 385 uses the synthesis signal supplied from the image synthesis unit 382 to perform the interpolation based on the motion vector in an area other than the synthesis HFR exclusion area indicated by the synthesis HFR control information which is supplied from the HFR area synthesis unit 384. The interpolation processing unit 385 supplies the synthesis signal after the interpolation to the display processing unit 386.

The display processing unit 386 performs the D/A conversion on the synthesis signal after the interpolation supplied from the interpolation processing unit 385 and supplies the synthesis signal which is an analog signal obtained as the result to the display unit 35 to display the synthesis image after the interpolation on the display unit 35.

As described above, in the image processing unit 351, the area assumed as the still image is decided as the input HFR exclusion area, and the input HFR exclusion area is synthesized on the basis of the synthesis image. Therefore, it is possible to set the configuration so as not to perform the interpolation based on the motion vector with respect to the area assumed as the still image in the synthesis image. Therefore, the interpolation is performed on the basis of the motion vector of the still image influenced by the motion of the moving image in, and it is possible to prevent the disturbance in the synthesis image after the interpolation. As a result, it is possible to improve the quality of the synthesis image after the interpolation.

Figure 19:
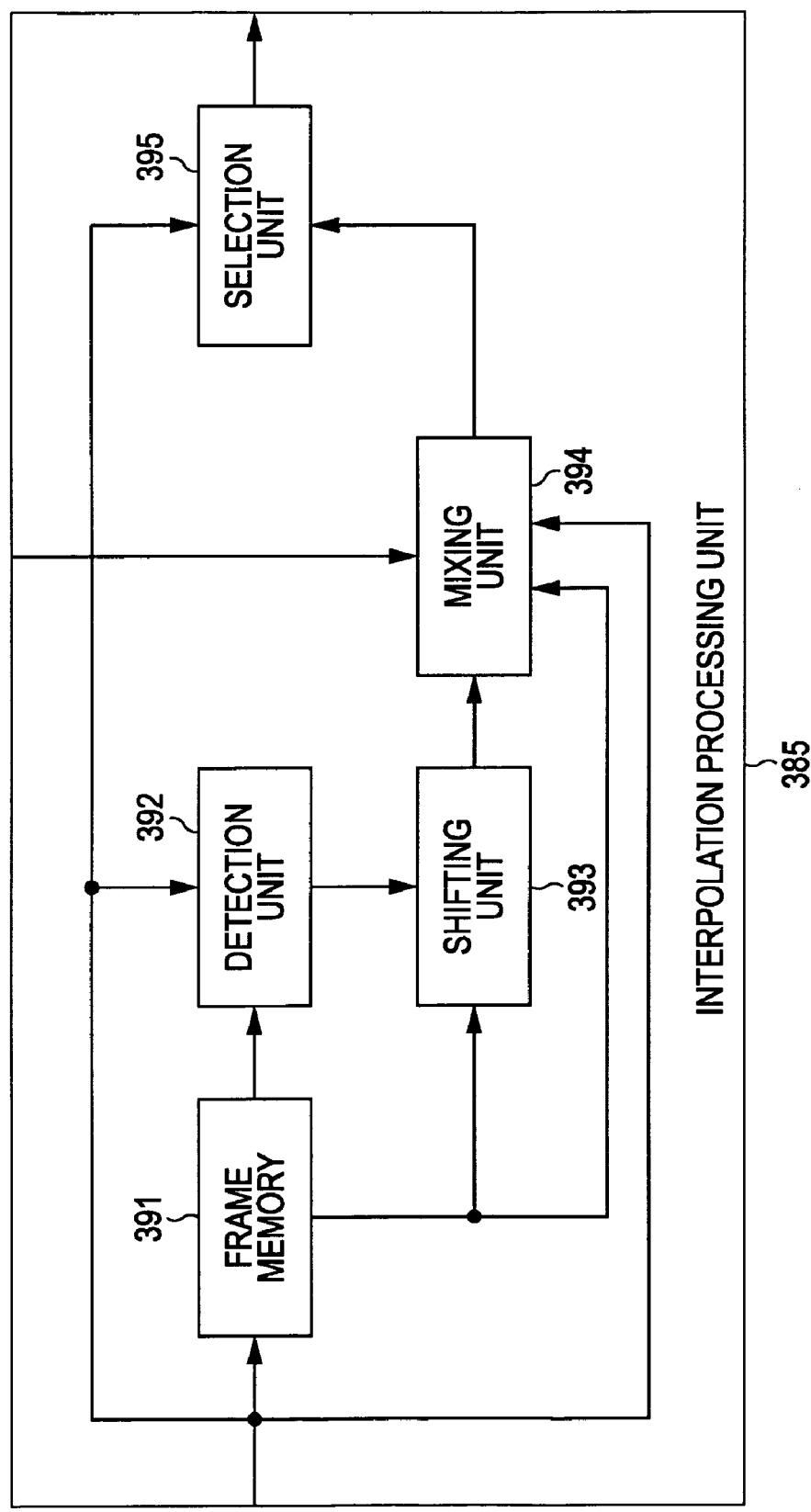
FIG. 19 is a block diagram showing a detailed configuration example of an interpolation processing unit of FIG. 18.

FIG. 19 illustrates a detailed configuration example of the interpolation processing unit 385 of FIG. 18.

In FIG. 19, the interpolation processing unit 385 is composed of a frame memory 391, a detection unit 392, a shifting unit 393, a mixing unit 394, and a selection unit 395.

In the interpolation processing unit 385, the frame memory 391 stores the synthesis image input from the image synthesis unit 382 in units of frames. The frame memory 391 reads out the synthesis image previously stored, that is, the synthesis image input from the image synthesis unit 382 in one frame before the synthesis image (hereinafter, referred to as previous synthesis image), and supplies the synthesis signal to the detection unit 392, the shifting unit 393, and the mixing unit 394.

The detection unit 392 sets the synthesis image input from the image synthesis unit 382 as the synthesis image of the detection target (hereinafter, referred to as target synthesis image), and detects the motion vector in units of blocks of the target synthesis image on the basis of the target synthesis image and the previous synthesis image supplied from the frame memory 391. Then, the detection unit 392 supplies the detected motion vector in units of blocks to the shifting unit 393.

The shifting unit 393 uses the motion vector in units of blocks supplied from the detection unit 392 to shift the previous synthesis signal supplied from the frame memory 391 in units of blocks, and supplies the synthesis signal after the shift to the mixing unit 394.

On the basis of the synthesis HFR control information supplied from the HFR area synthesis unit 384, the mixing unit 394 mixes the target synthesis image supplied from the image synthesis unit 382 with the previous synthesis image supplied from the shifting unit 393 to generate an interpolation signal for interpolating the synthesis image at an intermediate time between the target synthesis image and the previous synthesis image.

To be more specific, in an area other than the synthesis HFR exclusion area indicated by the synthesis HFR control information in the interpolation signal, the mixing unit 394 mixes the target synthesis image supplied from the image synthesis unit 382 with the previous synthesis image supplied from the shifting unit 393, and uses the previous synthesis image as it is in the synthesis HFR exclusion area to generate the interpolation signal. That is, in an area other than the synthesis HFR exclusion area, the mixing unit 394 performs the interpolation through the mixing of the target synthesis image and the previous synthesis image shifted by the shifting unit 393 by using the motion vector, and in the synthesis HFR exclusion area, the above-mentioned interpolation is not performed.

As a result, in an area other than the synthesis HFR exclusion area, the interpolation signal is the synthesis image in which the target synthesis image is mixed with the previous synthesis image. In the synthesis HFR exclusion area, the interpolation signal is the previous synthesis image itself. Then, the mixing unit 394 supplies the interpolation signal to the selection unit 395.

The selection unit 395 selects one of the target synthesis image input from the image synthesis unit 382 and the interpolation signal supplied from the mixing unit 394, and outputs the selected signal as the synthesis signal after the interpolation at a predetermined timing. To be more specific, the selection unit 395 outputs the interpolation signal generated between the target synthesis image and the next target synthesis image by using those images, as the synthesis signal after the interpolation. As a result, the frame rate of the synthesis signal after the interpolation output from the selection unit 395 is two times as large as the frame rate of the synthesis image.

Next, with reference to FIGS. 20 to 29, the synthesis and the interpolation in the reception apparatus 311 will be described.

Figure 20:
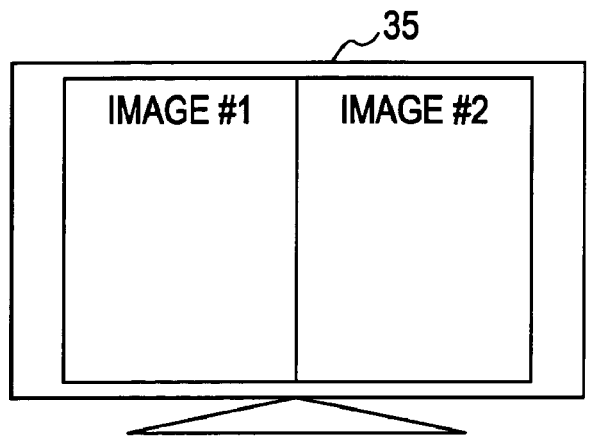
FIG. 20 illustrates a display example of a synthesis image.

First of all, in FIG. 20, on the basis of synthesis information composed of a two-dimensional position coordinate on the screen at apexes in the area of the left half of the screen of the display unit 35 functioning as information for identifying an area of an image #1 and a two-dimensional position coordinate on the screen at apexes in the area of the left half of the screen functioning as information for identifying an area of an image #2, the image signals of the image #1 and the image #2 are synthesized, and the image #1 and the image #2 are displayed in a so-called PAP (Picture And Picture) manner. It should be noted that the image #i represents an image whose image ID is i. The image ID is a unique ID to an image.

In this case, the areas of the image #1 and the image #2 are not overlapped with each other. The area where both the input HFR exclusion area indicated by the input HFR control information of the image #1 and the input HFR exclusion area indicated by the input HFR control information of the image #2 are synthesized is decided as the synthesis HFR exclusion area.

For example, in a case where the entire area of the image #1 is the moving image, the input HFR exclusion area of the image #1 does not exist, the entire area of the image #2 is the still image, and the input HFR exclusion area of the image #2 is the entire area of the image #2, the entire area of the image #2 is decided as the synthesis HFR exclusion area.

Figure 21:
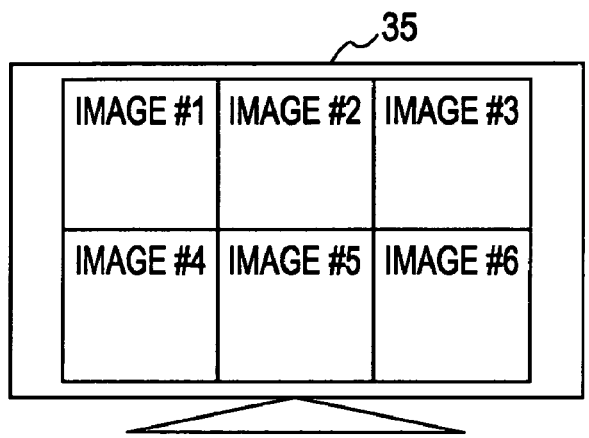
FIG. 21 illustrates a display example of a synthesis image.

Also, in FIG. 21, on the basis of synthesis information composed of a two-dimensional position coordinate on the screen at apexes in the area divided into six of the screen of the display unit 35 functioning as information for respectively identifying areas of the image #1 to an image #6, the image signals of the image #1 to the image #6 are synthesized. Then, the display unit 35 is instructed to function like a multi display to display the image #1 to the image #6.

In this case, as the areas of the image #1 to the image #6 are not overlapped with each other, similarly to the case of FIG. 20, an area where all the input HFR exclusion areas indicated by the respective pieces of the input HFR control information of the image #1 to the image #6 are synthesized is decided as the synthesis HFR exclusion area.

Figure 22:
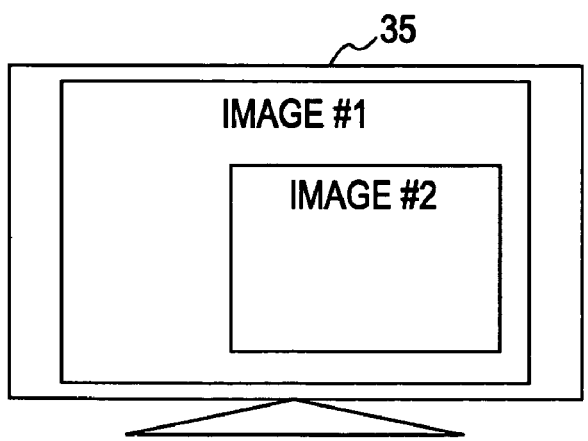
FIG. 22 illustrates a display example of a synthesis image.

On the other hand, in FIG. 22, on the basis of synthesis information composed of a two-dimensional position coordinate on the screen at apexes of all the areas on the screen of the display unit 35 which functions as the image for identifying the area of the image #1, a two-dimensional position coordinate on the screen at apexes of the lower right of the screen which functions as the information for identifying the area of the image #2, and a position coordinate in a depth direction (layer direction) perpendicular to the screen in the area of the image #1 and the area of the image #2, the image signals of the image #1 and the image #2 are synthesized, and the image #2 is displayed in the image #1, which is so-called PIP (Picture In Picture) display. In this case, as illustrated in FIG. 23, the synthesis HFR exclusion area is decided.

Figure 23:
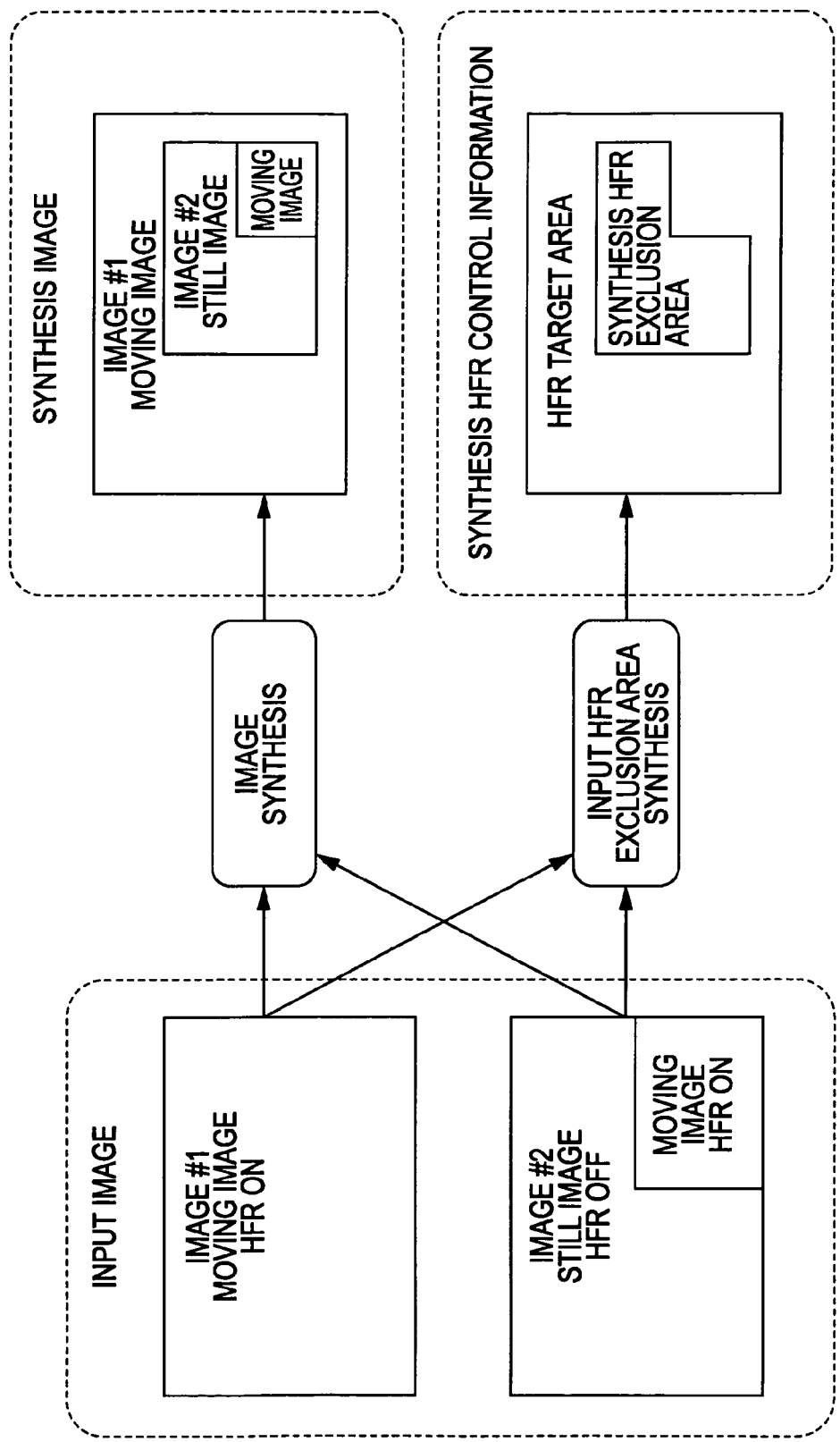
FIG. 23 is an explanatory diagram for describing a synthesis HFR exclusion area of the synthesis image of FIG. 22.

It should be noted that in the example of FIG. 23, the entire area of the image #1 is the moving image, and the input HFR exclusion area of the image #1 does not exist. That is, an HFR target area (HFR ON) which is an area where the interpolation is performed in the entire area of the image #1. Also, the area at the lower right edge of the image #2 is the moving image, and this area is the HFR target area (HFR ON). Furthermore, an area other than the area at the lower right edge of the image #2 is the still image, and this area is the input HFR exclusion area (HFR OFF).

Therefore, in the example of FIG. 23, the synthesis image of the image #1 and the image #2 is constructed by an area other than the lower right area where the image #2 of the image #1 is synthesized and an area where the area at the lower right edge of the image #2 is composed of the moving image and an area other than the area at the lower right edge of the image #2 is composed of the still image.

At this time, on the basis of the input HFR control information of the image #1 indicating that the input HFR exclusion area does not exist, the input HFR control information of the image #2 indicating an area other than the area at the lower right edge of the image #2 as the input HFR exclusion area, and the synthesis information, the HFR area synthesis unit 384 recognizes that the image #2 where the input HFR exclusion area exists is on the near side of the image #1. Then, as illustrated in FIG. 23, among the lower right area functioning as the area of the image #2 on the synthesis image, the HFR area synthesis unit 384 decides an area other than the lower right edge area corresponding to the input HFR exclusion area of the image #2 as the synthesis HFR exclusion area.

Figure 24:
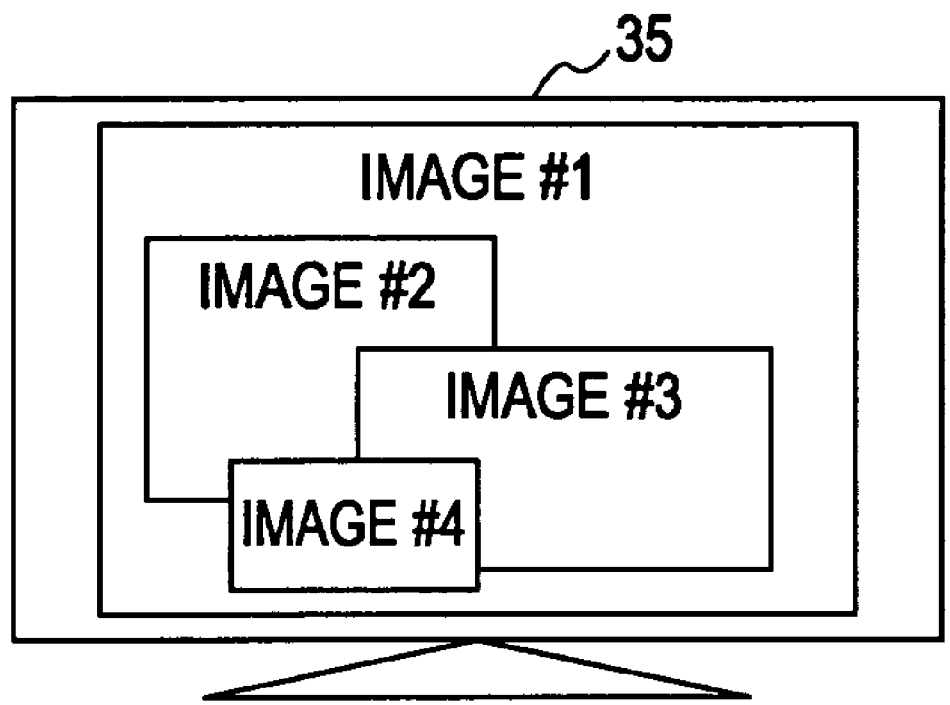
FIG. 24 illustrates a display example of a synthesis image.

In FIG. 24, on the basis of synthesis information composed of a two-dimensional position coordinate on the screen at apexes of all the areas on the screen of the display unit 35 which functions as the image for identifying the area of the image #1, a two-dimensional position coordinate on the screen at apexes of the center left of the area on the screen functions as information for identifying the area of the image #2, a two-dimensional position coordinate on the screen at apexes of the lower right of the area on the screen functions as information for identifying the area of an image #3, a two-dimensional position coordinate on the screen at apexes of the lower left of the area on the screen functions as information for identifying the area of an image #4, and a position coordinate in the depth direction of the areas of the image #1 to the image #4, image signals of the image #1 to the image #4 are synthesized. Then, the image #1 to the image #4 are displayed in a manner called overlay display so as to display the image #1, the image #2, the image #3, and the image #4 in the stated order from the behind. In this case, as illustrated in FIG. 25, the synthesis HFR exclusion area is decided.

Figure 25:
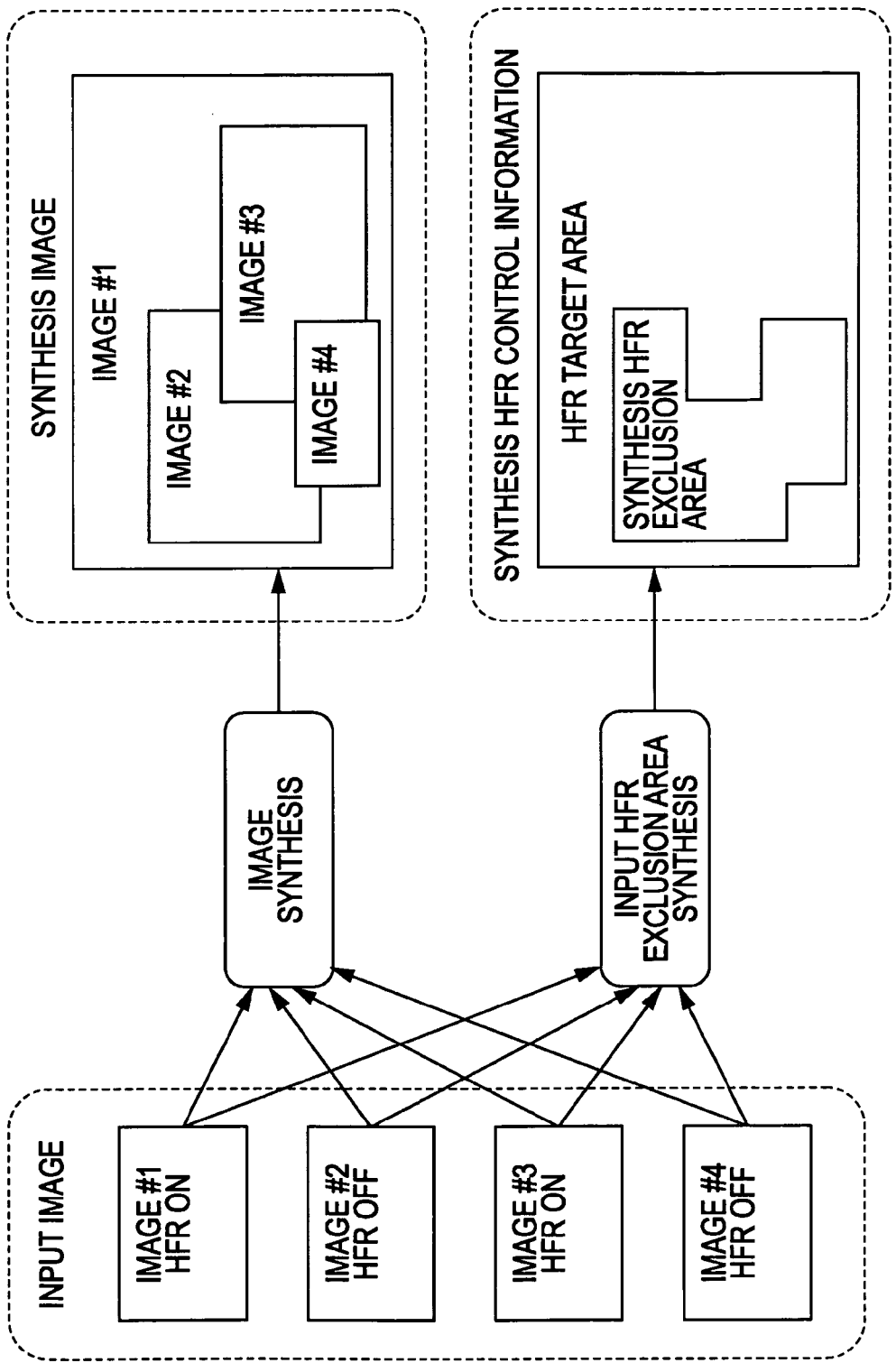
FIG. 25 is an explanatory diagram for describing a synthesis HFR exclusion area of the synthesis image of FIG. 24.

It should be noted that in the example of FIG. 25, all the areas of the image #1 and the image #3 are the HFR target areas (HFR ON), and the areas of the image #2 and the image #4 are the input HFR exclusion area (HFR OFF).

At this time, on the basis of the input HFR control information of the image #1 and the image #3 indicating no input HFR exclusion areas and the input HFR control information of the image #2 and the image #4 indicating all the areas as the input HFR exclusion areas, and the synthesis information, the HFR area synthesis unit 384 recognizes that the image #4 where the input HFR exclusion area exists is on the nearest side, and the image #2 where the input HFR exclusion area exists behind the image #3 and the image #4.

Then, as illustrated in FIG. 25, the HFR area synthesis unit 384 synthesizes the lower left area on the synthesis image corresponding to the input HFR exclusion area of the image #4 with an area other than the areas of the image #3 and the image #4 among the area at the center left part on the synthesis image corresponding to the input HFR exclusion area of the image #2 to be decided as the synthesis HFR exclusion area.

Figure 26:
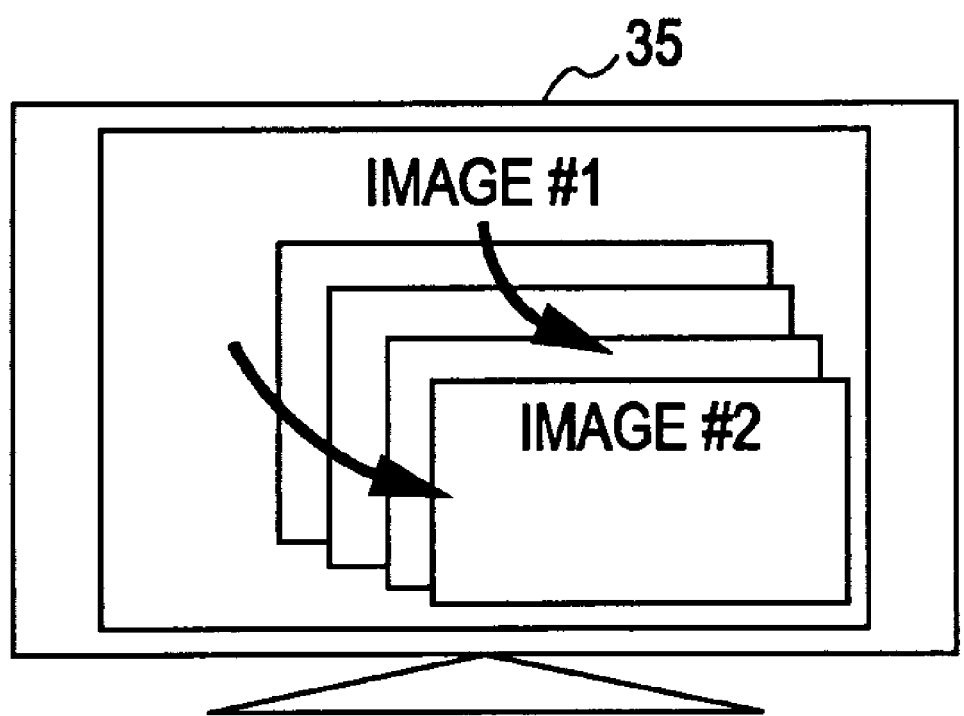
FIG. 26 illustrates a display example of a synthesis image.

In FIG. 26, on the basis of synthesis information composed of a two-dimensional position coordinate on the screen at apexes of all the areas on the screen of the display unit 35 which functions as the image for identifying the area of the image #1, a two-dimensional position coordinate on the screen at apexes in the area at the center of the screen which functions as information for identifying the first area of the image #2, a shifting vector of the area of the image #2, a shifting vector of the area of the image #2, and a position coordinate in the depth direction of the areas of the image #1 and the image #2, the image signals of the image #1 and the image #2 area synthesized by four times at a predetermined timing.

Then, at every predetermined period of time, the synthesis image where the image #2 is overlapped in a central area of the image #1, the synthesis image where the image #2 is overlapped in an area located at a slightly lower right position with respect to the center of the image #1, the synthesis image where the image #2 is overlapped in an area located at a still lower right position with respect to the center of the image #1, and the synthesis image where the image #2 is overlapped in an area located at a further lower right position with respect to the center of the image #1 are displayed in the stated order. That is, so called animation display is performed. In this case, as illustrated in FIG. 27, the synthesis HFR exclusion area is decided.

Figure 27:
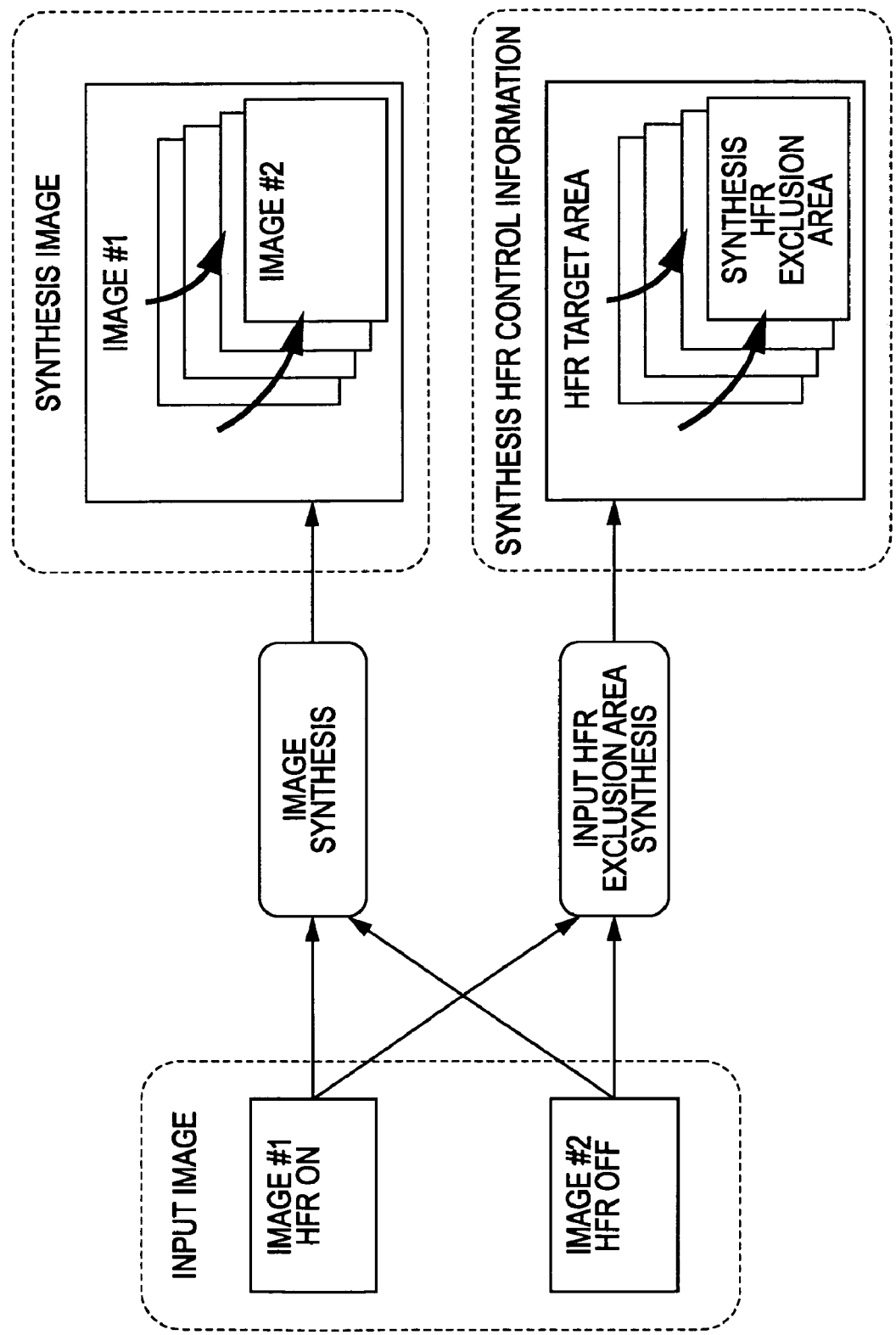
FIG. 27 is an explanatory diagram for describing a synthesis HFR exclusion area of the synthesis image of FIG. 26.

It should be noted that in the example of FIG. 27, the entire area of the image #1 is the HFR target area (HFR ON), and the entire areas of the image #2 is the input HFR exclusion area (HFR OFF).

At this time, on the basis of the input HFR control information of the image #1 indicating that the input HFR exclusion area does not exist, the input HFR control information of the image #2 indicating the entire area as the input HFR exclusion area, and the synthesis information, the HFR area synthesis unit 384 recognizes that the image #2 where the input HFR exclusion area exists is on the near side of the image #1. Then, as illustrated in FIG. 27, the HFR area synthesis unit 384 decides the entire area of the image #2 on the synthesis image corresponding to the input HFR exclusion area of the image #2 as the synthesis HFR exclusion area. Therefore, the synthesis HFR exclusion area is changed by four times at every predetermined period of time.

Figure 28:
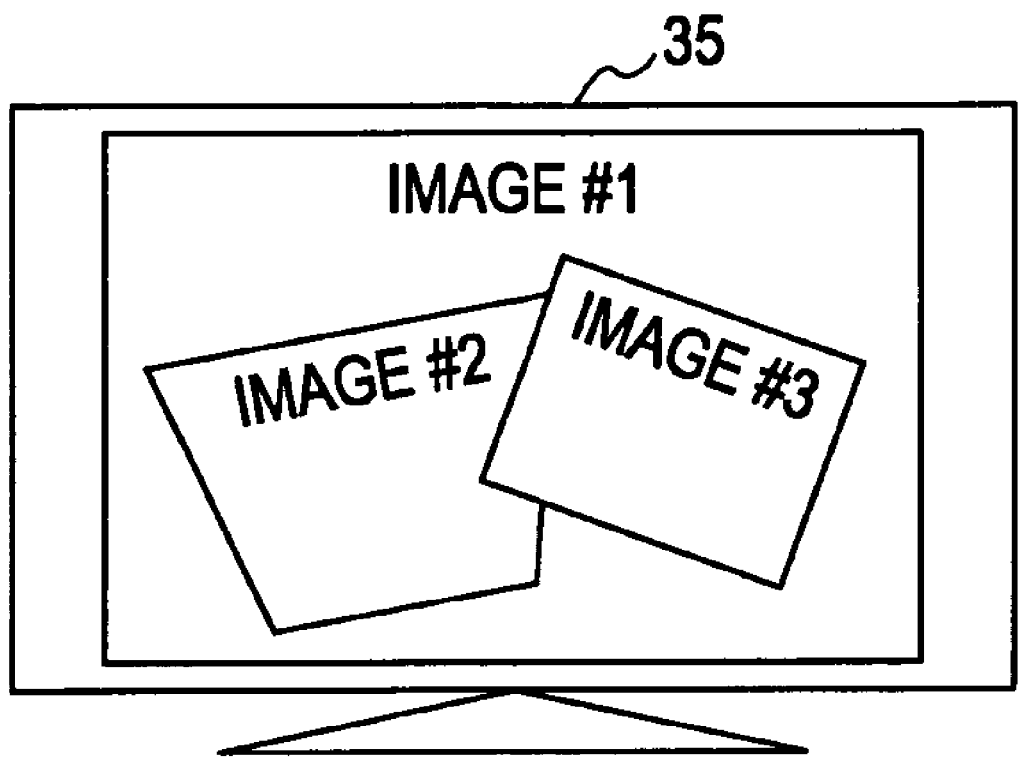
FIG. 28 illustrates a display example of a synthesis image.

In FIG. 28, on the basis of synthesis information composed of a two-dimensional position coordinate on the screen at apexes of all the areas on the screen of the display unit 35 which functions as the image for identifying the area of the image #1, a two-dimensional position coordinate on the screen at apexes of the lower left area on the screen which functions as information for identifying the area of the image #2, a two-dimensional position coordinate on the screen at apexes of the lower right area on the screen which functions as information for identifying the area of the image #3, conversion matrices representing deformation, rotation, affine transformation, or the like of the image #2 and the image #3, and a position coordination in the depth direction of the areas of the image #1 and the image #2, the image signals of the image #1 to the image #3 are synthesized. The image #1, the image #2 deformed into a trapezoid and rotated on the left side, and the image #3 on the right side are displayed on the stated order while being overlapped from the depth size. In this case, as illustrated in FIG. 29, the synthesis HFR exclusion area is decided.

Figure 29:
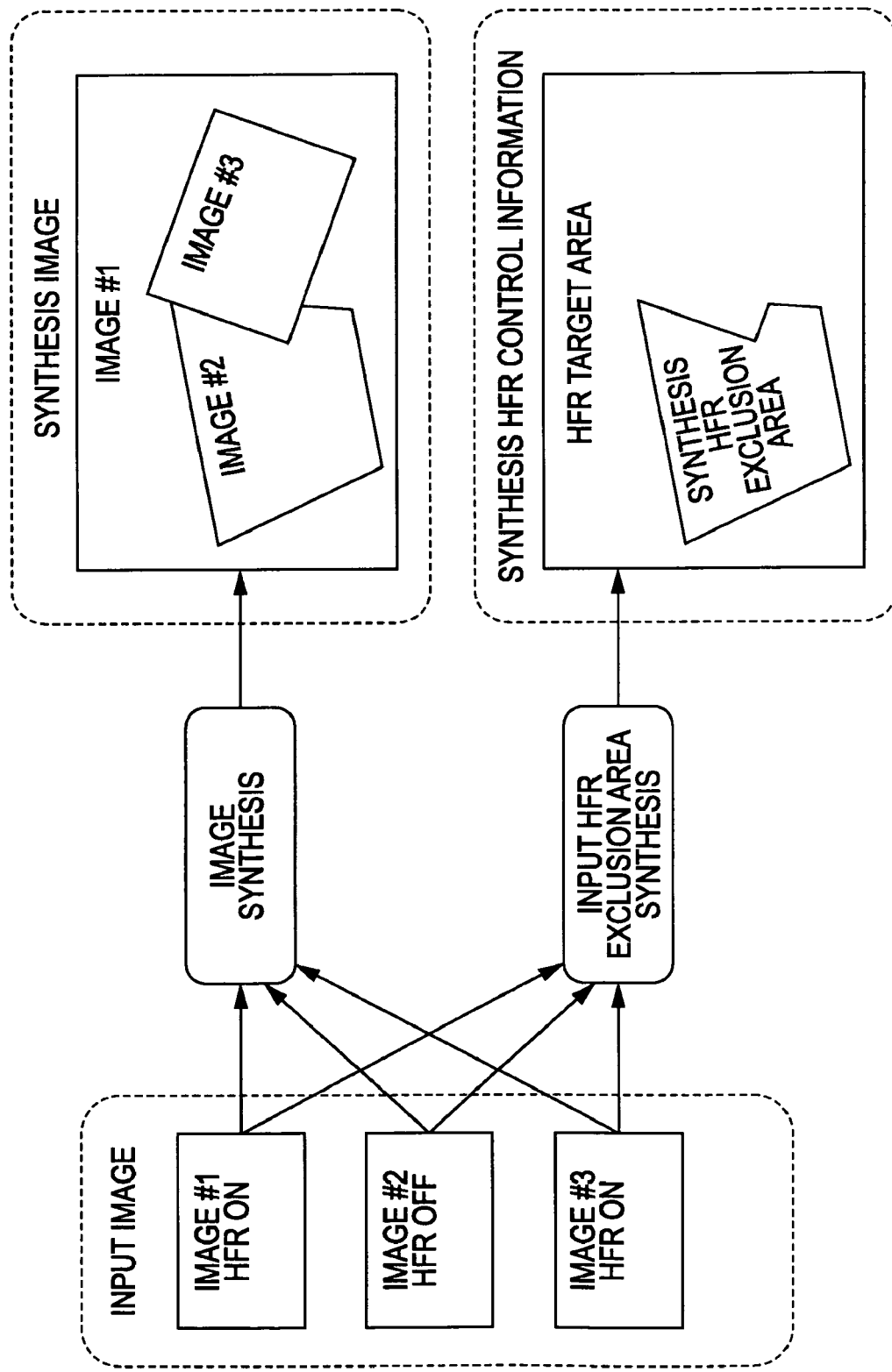
FIG. 29 is an explanatory diagram for describing a synthesis HFR exclusion area of the synthesis image of FIG. 28.

It should be noted that in the example of FIG. 29, the entire areas of the image #1 and the image #3 are the HFR target area (HFR ON), and the entire area of the image #2 is the input HFR exclusion area (HFR OFF).

At this time, on the basis of the input HFR control information of the image #1 and the image #3 indicating that the input HFR exclusion area does not exist, the input HFR control information of the image #2 indicating the entire area as the input HFR exclusion area, and the synthesis information, the HFR area synthesis unit 384 recognizes that the image #2 where the input HFR exclusion area exists is behind the image #3. Then, as illustrated in FIG. 29, the HFR area synthesis unit 384 decides an area other than the image #3 as the synthesis HFR exclusion area among the lower left area on the synthesis image corresponding to the input HFR exclusion area of the image #2.

Figure 30:
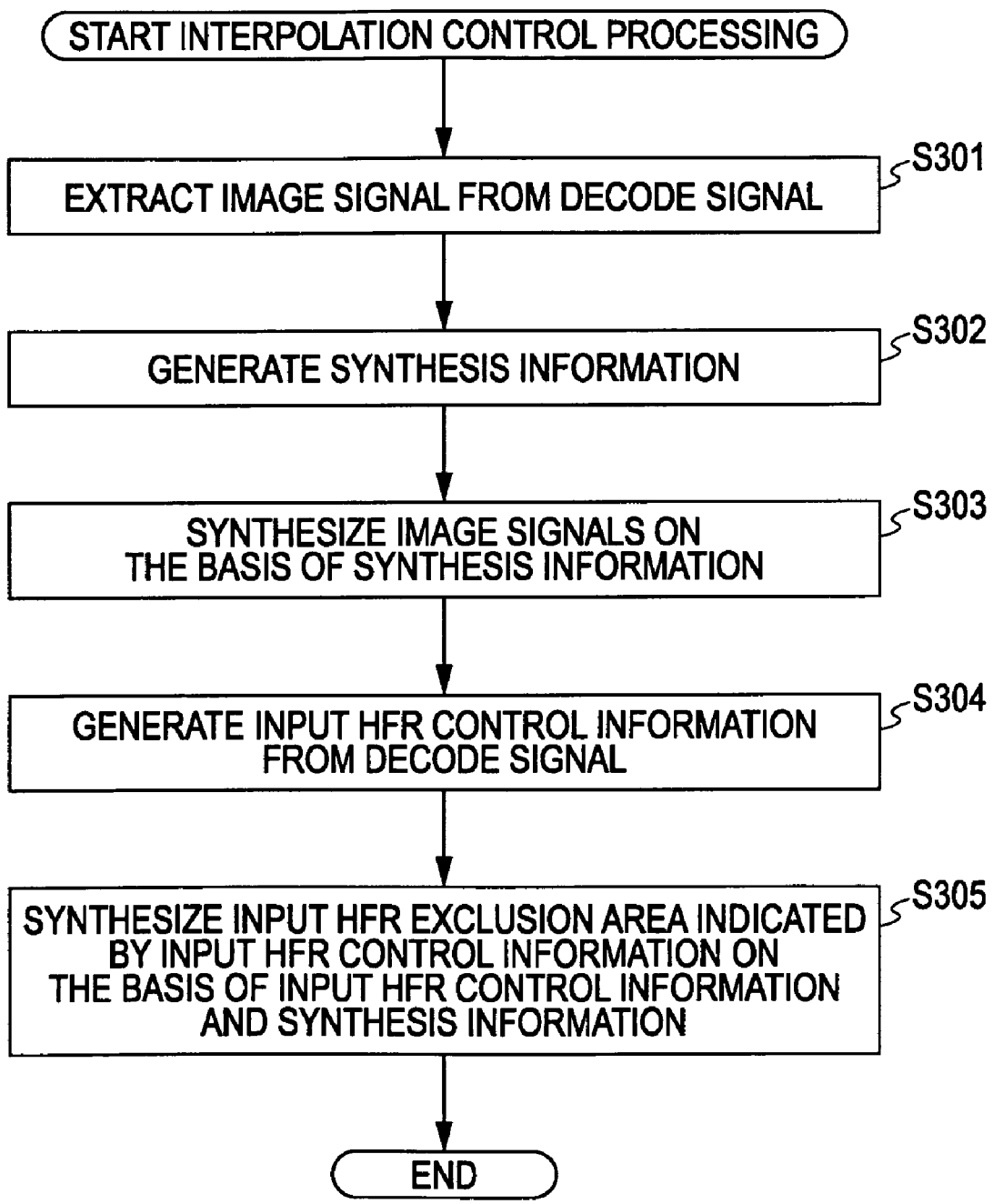
FIG. 30 is a flowchart for describing an interpolation control processing performed by the image processing unit of FIG. 18.

Next, with reference to FIG. 30, the interpolation control processing performed by the image processing unit 351 of FIG. 18 will be described. This interpolation control processing is started, for example, when the decode signal is input from the decode processing unit 333.

In step S301, the synthesis information generation unit 381 extracts an image signal from the decode signal input from the decode processing unit 333 and supplies the image signal to the image synthesis unit 382. In step S302, the synthesis information generation unit 381 generates synthesis information in accordance with the instruction from the input unit 335, and supplies the synthesis information to the image synthesis unit 382 and the HFR area synthesis unit 384.

In step S303, the image synthesis unit 382 synthesizes the image signal supplied from the synthesis information generation unit 381 on the basis of the synthesis information supplied from the synthesis information generation unit 381, and supplies the image signal obtained as the result to the interpolation processing unit 385 as the synthesis image.

In step S304, the HFR control information generation unit 383 decides the input HFR exclusion area from the signal representing the content of the image signal contained in the decode signal which is input from the decode processing unit 333, and generates the input HFR control information indicating the input HFR exclusion area.

To be more specific, the HFR control information generation unit 383 decides the input HFR exclusion area, for example, on the basis of a signal contained in the decode signal of the external signal representing information related to a display position and a display period of the OSD image in the image corresponding to the external signal, and generates the HFR control information. It should be noted that in a case where the user operates the input unit 335 and controls the external apparatus (not shown) to overlap, for example, a predetermined image signal with the OSD image signal, and the image signal obtained as the result is sent to the reception apparatus 311 as the external signal, the HFR control information generation unit 383 may decide the input HFR exclusion area in accordance with the instruction from the input unit 335.

Also, the HFR control information generation unit 383 analyzes a signal representing information written in BML (Broadcast Markup Language) or information conforming to the standard of MHP (Multimedia Home Platform), a Teletext signal, or the like which is, for example, contained in the decode signal of the television broadcasting signal to decide the input HFR exclusion area, and generates the HFR control information.

Furthermore, the HFR control information generation unit 383 analyzes a signal written in HTML (Hypertext Markup Language) or SMIL (Synchronized Multimedia Integration Language), a signal representing information conforming to Adobe Flash standard, or the like which is, for example, contained in the decode signal of the internet signal to decide the input HFR exclusion area, and generates the HFR control information. The HFR control information generation unit 383 supplies the input HFR control information to the HFR area synthesis unit 384.

In step S305, the HFR area synthesis unit 384 synthesizes the input HFR exclusion area indicated by the input HFR control information as descried with reference to FIGS. 20 to 29, on the basis of the input HFR control information supplied from the HFR control information generation unit 383 and the synthesis information supplied from the synthesis information generation unit 381, and decides the area obtained as the result as the synthesis HFR exclusion area. Then, the HFR area synthesis unit 384 supplies the synthesis HFR control information indicating the synthesis HFR exclusion area to the interpolation processing unit 385. Then, the processing is ended.

Figure 31:
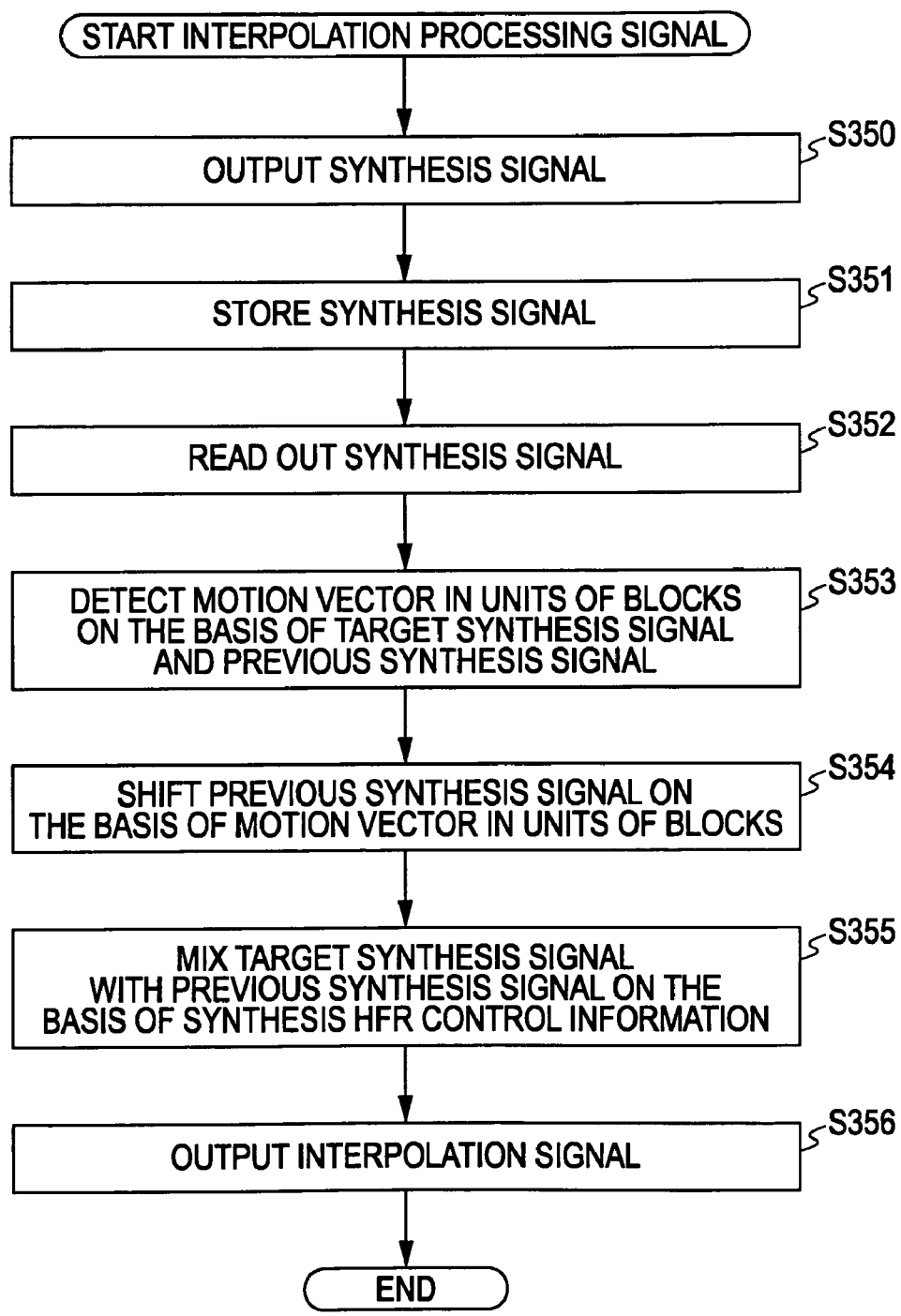
FIG. 31 is a flowchart for describing an interpolation processing in an image processing unit of FIG. 18.

Next, with reference to FIG. 31, the interpolation processing performed by the image processing unit 351 of FIG. 18 will be described. This interpolation processing is started, for example, when the synthesis image is input to the interpolation processing unit 385.

In step S350, the selection unit 395 of the interpolation processing unit 385 outputs the synthesis image supplied from the image synthesis unit 382 as the synthesis signal after the interpolation. In step S351, the frame memory 391 stores the synthesis image supplied from the image synthesis unit 382. In step S352, the frame memory 391 reads out the already stored previous synthesis image, and supplies the previous synthesis image to the detection unit 392, the shifting unit 393, and the mixing unit 394.

In step S353, the detection unit 392 detects the motion vector in units of blocks of the target synthesis image on the basis of the target synthesis image supplied from the image synthesis unit 382 and the previous synthesis image supplied from the frame memory 391.

In step S354, on the basis of the motion vector in units of blocks supplied from the detection unit 392, the shifting unit 393 shifts the previous synthesis signal supplied from the frame memory 391 in units of blocks to supply the synthesis signal after the shift to the mixing unit 394.

In step S355, on the basis of the synthesis HFR control information supplied from the HFR area synthesis unit 384, the mixing unit 394 mixes the target synthesis image supplied from the image synthesis unit 382 with the previous synthesis image after the shift which is supplied from the shifting unit 393 to generate the interpolation signal. Then, the mixing unit 394 supplies the interpolation signal to the selection unit 395. In step S356, the selection unit 395 outputs the interpolation signal supplied from the mixing unit 394 as the synthesis signal after the interpolation, and the processing is ended.

As described above, the reception apparatus 311 decides the input HFR exclusion area for not only the television broadcasting signal received by the tuner 332 but also the external signal input from the external apparatus (not shown) and the internet signal received via the internet, and it is possible to set the configuration so as not to perform the interpolation in the input HFR exclusion area.

Therefore, for example, in order to set a machine price of the television receiver lower, in a case where other than the television receiver only provided with the function of receiving the television broadcasting signal, a recording apparatus using an external HDD (Hard Disk Drive) for adding recording functions or the like is on the market, or where an external apparatus for adding digital broadcasting reception functions is separately sold because the development periods are varied, similarly to the television broadcasting signal received by the built-in functions, the interpolation processing is performed on the external signal input from the external apparatus. Therefore, the user can look at the image without noticing that the image is from the external apparatus.

Also, as the reception apparatus 311 decides the synthesis HFR exclusion area on the basis of the synthesis information and the input HFR control information, in a case where the synthesis image is interpolated, it is possible to set the configuration so as not to perform the interpolation in the area assumed as the still image in the synthesis image. As a result, it is possible to improve the quality of the synthesis image after the interpolation.

In recent years, cooperation among a plurality of apparatuses based on HDMI-CEC (High-Definition Multimedia Interface Consumer Electronics Control) such as AQUOS Familink or Viera Link draws increasing attention. Furthermore, the number of new sources functioning as sources for the image and audio including the internet broadcasting (for example, You Tube) is being increased. Thus, more opportunities are provided to view a plurality of input images at the same time (for example, a posted moving image viewed with a personal computer is displayed next to the program viewed with the television receiver). Therefore, the effect that the interpolation is performed on the synthesis image and the quality of the synthesis image after the interpolation can be improved is extremely important.

It should be noted that similarly to the case of the reception apparatus 11 (101, 201), the processing amount of the reception apparatus 311 has a limit due to restriction in terms of hardware. Thus, for example, in a case where the number of the synthesis HFR exclusion areas is large or where the shape of the synthesis HFR exclusion area is complex, it is difficult to set the configuration so as not to perform the interpolation in all the synthesis HFR exclusion area.

In view of the above, in such a case, the reception apparatus 311 selects predetermined input HFR exclusion areas from all the input HFR exclusion areas, and the interpolation may not be performed only in the synthesis HFR exclusion area obtained through the synthesis of the selected input HFR exclusion areas. The interpolation in the reception apparatus 311 in this case will be described with reference to FIG. 32.

Figure 32:
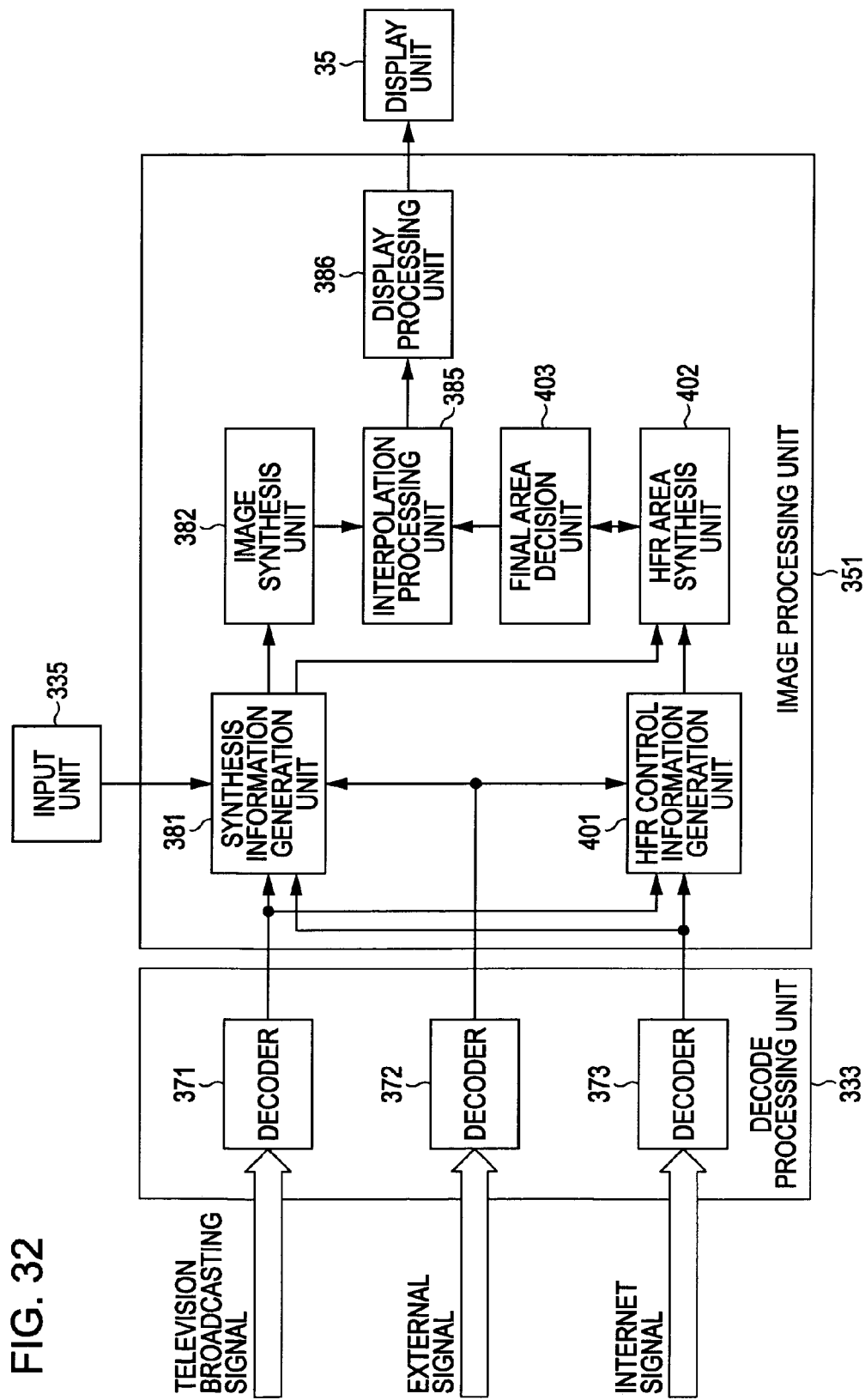
FIG. 32 is an explanatory diagram for describing another interpolation in the reception apparatus of FIG. 17.

In FIG. 32, the interpolation processing unit 385 is composed of the synthesis information generation unit 381, the image synthesis unit 382, the interpolation processing unit 385, the display processing unit 386, an HFR control information generation unit 401, an HFR area synthesis unit 402, and a final area decision unit 403. It should be noted that the same components as those in FIG. 18 are denoted by the same reference numerals, and the description thereof will be omitted to avoid the repetition.

The HFR control information generation unit 401 decides the input HFR exclusion area from the signal representing the content of the image signal contained in the decode signal supplied from the decode processing unit 333 similarly to the HFR control information generation unit 383 of FIG. 18, and generates the input HFR control information indicating the input HFR exclusion area. Also, the HFR control information generation unit 401 decides the priority with respect to the respective input HFR exclusion areas from the decode signal. Then, the HFR control information generation unit 401 supplies the priority which is associated with the input HFR control information with respect to the input HFR exclusion area indicated by the input HFR control information to the HFR area synthesis unit 402.

The HFR area synthesis unit 402 synthesizes the input HFR exclusion area indicated by the input HFR control information on the basis of the input HFR control information supplied from the HFR control information generation unit 401 and the synthesis information supplied from the synthesis information generation unit 381 similarly to the HFR area synthesis unit 384 of FIG. 18, and decides the synthesis HFR exclusion area.

Also, on the basis of an instruction for deciding the synthesis HFR exclusion area again from the final area decision unit 403 and the priority supplied from the HFR control information generation unit 401 while being associated with the input HFR control information, the HFR area synthesis unit 402 selects a predetermined input HFR exclusion area among the input HFR exclusion area indicated by the input HFR control information. Then, the HFR area synthesis unit 402 synthesizes the input HFR exclusion area on the basis of the input HFR control information indicating the selected input HFR exclusion area and the synthesis information, and decides the synthesis HFR exclusion area again. Furthermore, the HFR area synthesis unit 402 supplies the synthesis HFR control information indicating the decided synthesis HFR exclusion area to the final area decision unit 403.

The final area decision unit 403 instructs the HFR area synthesis unit 402 to decide the synthesis HFR exclusion area again in a case where the number of the synthesis HFR exclusion areas indicated by the synthesis HFR control information supplied from the HFR area synthesis unit 402 is larger than a predetermined number previously set or where the shape of the synthesis HFR exclusion area is a shape other than a previously set relatively simple shape such as a rectangle, a polygon, or an ellipse.

Also, in a case where the number of the synthesis HFR exclusion areas indicated by the synthesis HFR control information supplied from the HFR area synthesis unit 384 is equal to or smaller than the predetermined number previously set, and also the shape of the synthesis HFR exclusion area is the previously set relatively simple shape, the final area decision unit 403 supplies the synthesis HFR exclusion area to the interpolation processing unit 385.

Next, with reference to FIGS. 33A and 33B, the priority with respect to the input HFR exclusion area will be described.

As illustrated in FIG. 33A, in a case where the images before the synthesis in time series are moving images in units of fields of a soccer ball 421 which moves from the upper left to the lower right in the area of an OSD image 420 where the OSD image 420 is overlapped on which translucent characters "011" is displayed, in an image 411 and an image 412 in the area where the OSD image 420 of the moving image is overlapped, the still image and the moving image existing as the OSD image 420 are mixed with each other. However it is difficult to obtain the information on the position of the moving soccer ball 421 from the decode signal, and it is thus difficult to divide the area of the still image and the area of the moving image in the image 411 and the image 412.

Therefore, the HFR control information generation unit 401 may decide or may not decide the entire areas of the image 411 and the image 412 as the input HFR exclusion areas. For example, in a case where the entire areas of the image 411 and the image 412 are not decided as the input HFR exclusion areas, the image in the area where the OSD image 420 of the synthesis image in time series after the interpolation is, for example, as illustrated in FIG. 33B.

That is, the mixing unit 394 generates an image signal of an interpolation image containing an image 431 where the position of the soccer ball 421 is located at an intermediate position between the position in the image 411 and the position in the image 412 as the interpolation signal for interpolating at an intermediate time between the synthesis image of the synthesis image before the interpolation containing the image 411 and the synthesis image before the interpolation containing the image 412 on the basis of the motion vector of the synthesis image before the interpolation containing the image 412.

However, on the basis of the motion vector corresponding to the motion of the soccer ball 421, the OSD image 420 which is a still image is also interpolated. Thus, for example, as illustrated in FIG. 33B, such an interpolation error is generated that the characters "0" and "1" of the OSD image 420 are also displayed at position other than normal positions.

As described above, in the image where one of the moving image and the still image is synthesized in a translucent manner, the interpolation error tends to be generated. Therefore, in a case where the area of the image where one of the moving image and the still image is synthesized in a translucent manner is recognized among the image corresponding to the image signal contained in the decode signal from the decode signal, the HFR control information generation unit 383 decides the area as the input HFR exclusion area and increase the priority with respect to the input HFR exclusion area.

It should be noted that the HFR control information generation unit 401 may not select the input HFR exclusion area on the basis of the priority, but may select the input HFR exclusion area on the basis of the size in descending order.

Also, in the above description, the input HFR exclusion area is selected, but one area having a relatively simple shape previously set containing all the input HFR exclusion areas may be selected as the synthesis HFR exclusion area.

Furthermore, in a case where the sum of the areas of the synthesis HFR exclusion areas decided before the second decision is equal to or larger than the half of all the areas of the synthesis image, all the areas of the synthesis image may be set as the synthesis HFR exclusion area. In a case where the sum of the areas of the synthesis HFR exclusion areas decided before the second decision is smaller than the half of all the areas of the synthesis image, all the areas of the synthesis image may not be set as the synthesis HFR exclusion area. In this manner, in a case where all the areas of the synthesis image are not set as the synthesis HFR exclusion area, it is difficult to smoothly display the moving image in the synthesis image, but it is possible to prevent the disturbance in the image caused by the interpolation error.

Also, the input HFR control information and the synthesis HFR control information may represent not only the HFR exclusion area but also an HFR exclusion period during which the interpolation is not performed. In this case, only during a period based on the HFR exclusion period, it is possible to set the configuration so as not to perform the interpolation in the synthesis HFR exclusion area. Also, the input HFR control information and the synthesis HFR control information may not represent the HFR exclusion area and the HFR exclusion period, but may represent the HFR target area and the HFR target period.

Furthermore, in the above description, the synthesis information generation unit 381 generates the synthesis information in accordance with the instruction from the input unit 335, but the synthesis information may be generated from the decode signal supplied from the decode processing unit 333.

Also, in the above description, the interpolation is performed on the image signal or the synthesis image at the intermediate time between the continuous image signals or the synthesis image, but the interpolation may be performed on the image signal or the synthesis image, not only at the intermediate time, but also at an arbitrary time.

The embodiment of the present invention can be applied to not only the television receiver provided with the liquid crystal panel where the hold-type light emission is performed, but also a television receiver provided with the cathode-ray tube or the plasma display where the impulse-type light emission is performed, and the like.

In the present specification, the steps for describing the program stored in the program recording medium of course includes the processing executed in the stated order in a time series manner but also the processing executed in parallel or individually instead of being executed in the time series.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus arranged to perform an image processing on input image signals which are image signals of an image composed of at least one of a plurality of input moving images and still images, the image processing apparatus comprising:

synthesis means configured to synthesize a plurality of the input image signals to generate a synthesis signal on the basis of synthesis information indicating an area where a plurality of the input image signals are respectively synthesized;

detection means configured to detect a motion vector of the synthesis signal;

decision means configured to decide, on the basis of the synthesis information and interpolation control information indicating an input interpolation exclusion area where an interpolation in the respective input image signals is not performed, a synthesis interpolation exclusion area where the interpolation in the synthesis signal is not performed; and interpolation means configured to interpolate and output a synthesis signal in-between signal which is an image signal at an arbitrary time between the synthesis signal and a previous synthesis signal functioning as a synthesis signal preceding the synthesis signal by one on the basis of the motion vector in an area other than the synthesis interpolation exclusion area, wherein in a case where the number of the synthesis interpolation exclusion areas is larger than a predetermined number or where a shape of the synthesis interpolation exclusion area is a shape other than a predetermined shape, the decision means selects the input interpolation exclusion area and uses the selected input interpolation exclusion area to decide the synthesis interpolation exclusion area again, and wherein in a case where the number of the synthesis interpolation exclusion areas decided by the decision means is equal to or smaller than the predetermined number and also the shape of the synthesis interpolation exclusion area is the predetermined shape, on the basis of the synthesis interpolation exclusion area, the interpolation means interpolates and outputs the synthesis signal in-between signal in an area other than the synthesis interpolation exclusion area.

2. The image processing apparatus according to claim 1, further comprising:

generation means configured to the interpolation control information by using information which is input in response to the input image signal and which indicates a content of the input image signal.

3. An image processing apparatus arranged to perform an image processing on input image signals which are image signals of an image composed of at least one of a plurality of input moving images and still images, the image processing apparatus comprising:

synthesis means configured to synthesize a plurality of the input image signals to generate a synthesis signal on the basis of synthesis information indicating an area where a plurality of the input image signals are respectively synthesized;

detection means configured to detect a motion vector of the synthesis signal;

decision means configured to decide, on the basis of the synthesis information and interpolation control information indicating an input interpolation exclusion area where an interpolation in the respective input image signals is not performed, a synthesis interpolation exclusion area where the interpolation in the synthesis signal is not performed; and interpolation means configured to interpolate and output a synthesis signal in-between signal which is an image signal at an arbitrary time between the synthesis signal and a previous synthesis signal functioning as a synthesis signal preceding the synthesis signal by one on the basis of the motion vector in an area other than the synthesis interpolation exclusion area, wherein in a case where the number of the synthesis interpolation exclusion areas is larger than a predetermined number or where a shape of the synthesis interpolation exclusion area is a shape other than a predetermined shape, the decision means decides one area of the predetermined shape containing all the input interpolation exclusion areas as the synthesis interpolation exclusion area again, and wherein in a case where the number of the synthesis interpolation exclusion areas decided by the decision means is equal to or smaller than the predetermined number and also the shape of the synthesis interpolation exclusion area is the predetermined shape, on the basis of the synthesis interpolation exclusion area, the interpolation means interpolates and outputs the synthesis signal in-between signal in an area other than the synthesis interpolation exclusion area.

4. An image processing apparatus arranged to perform an image processing on input image signals which are image signals of an image composed of at least one of a plurality of input moving images and still images, the image processing apparatus comprising:

synthesis means configured to synthesize a plurality of the input image signals to generate a synthesis signal on the basis of synthesis information indicating an area where a plurality of the input image signals are respectively synthesized;

detection means configured to detect a motion vector of the synthesis signal;

decision means configured to decide, on the basis of the synthesis information and interpolation control information indicating an input interpolation exclusion area where an interpolation in the respective input image signals is not performed, a synthesis interpolation exclusion area where the interpolation in the synthesis signal is not performed; and interpolation means configured to interpolate and output a synthesis signal in-between signal which is an image signal at an arbitrary time between the synthesis signal and a previous synthesis signal functioning as a synthesis signal preceding the synthesis signal by one on the basis of the motion vector in an area other than the synthesis interpolation exclusion area, wherein in a case where the number of the synthesis interpolation exclusion areas is larger than a predetermined number or where a shape of the synthesis interpolation exclusion area is a shape other than a predetermined shape, the decision means decides all areas of the synthesis signal as the synthesis interpolation exclusion area again, and wherein in a case where the number of the synthesis interpolation exclusion areas decided by the decision means is equal to or smaller than the predetermined number and also the shape of the synthesis interpolation exclusion area is the predetermined shape, on the basis of the synthesis interpolation exclusion area, the interpolation means interpolates and outputs the synthesis signal in-between signal in an area other than the synthesis interpolation exclusion area.

5. An image processing method for an image processing apparatus arranged to perform an image processing on input image signals which are image signals of an image composed of at least one of a plurality of input moving images and still images, the image processing method comprising the steps of:

synthesizing a plurality of the input image signals to generate a synthesis signal on the basis of synthesis information indicating an area where a plurality of the input image signals are respectively synthesized;

detecting a motion vector of the synthesis signal;

deciding, on the basis of the synthesis information and interpolation control information indicating an input interpolation exclusion area where an interpolation in the respective input image signals is not performed, a synthesis interpolation exclusion area where the interpolation in the synthesis signal is not performed; and interpolating and outputting a synthesis signal in-between signal which is an image signal at an arbitrary time between the synthesis signal and a previous synthesis signal functioning as a synthesis signal preceding the synthesis signal by one on the basis of the motion vector in an area other than the synthesis interpolation exclusion area, wherein in a case where the number of the synthesis interpolation exclusion areas is larger than a predetermined number or where a shape of the synthesis interpolation exclusion area is a shape other than a predetermined shape, the deciding step selects the input interpolation exclusion area and uses the selected input interpolation exclusion area to decide the synthesis interpolation exclusion area again, and wherein in a case where the number of the synthesis interpolation exclusion areas decided by the deciding step is equal to or smaller than the predetermined number and also the shape of the synthesis interpolation exclusion area is the predetermined shape, on the basis of the synthesis interpolation exclusion area, the interpolating and outputting step interpolates and outputs the synthesis signal in-between signal in an area other than the synthesis interpolation exclusion area.

6. A non-transitory computer readable recording medium having stored thereon a program for instructing a computer to perform an image processing on input image signals which are image signals of an image composed of at least one of a plurality of input moving images and still images, the image processing including the steps of:

synthesizing a plurality of the input image signals to generate a synthesis signal on the basis of synthesis information indicating an area where a plurality of the input image signals are respectively synthesized;

detecting a motion vector of the synthesis signal;

deciding, on the basis of the synthesis information and interpolation control information indicating an input interpolation exclusion area where an interpolation in the respective input image signals is not performed, a synthesis interpolation exclusion area where the interpolation in the synthesis signal is not performed; and interpolating and outputting a synthesis signal in-between signal which is an image signal at an arbitrary time between the synthesis signal and a previous synthesis signal functioning as a synthesis signal preceding the synthesis signal by one on the basis of the motion vector in an area other than the synthesis interpolation exclusion area, wherein in a case where the number of the synthesis interpolation exclusion areas is larger than a predetermined number or where a shape of the synthesis interpolation exclusion area is a shape other than a predetermined shape, the deciding step selects the input interpolation exclusion area and uses the selected input interpolation exclusion area to decide the synthesis interpolation exclusion area again, and wherein in a case where the number of the synthesis interpolation exclusion areas decided by the deciding step is equal to or smaller than the predetermined number and also the shape of the synthesis interpolation exclusion area is the predetermined shape, on the basis of the synthesis interpolation exclusion area, the interpolating and outputting step interpolates and outputs the synthesis signal in-between signal in an area other than the synthesis interpolation exclusion area.

7. An image processing apparatus arranged to perform an image processing on input image signals which are image signals of an image composed of at least one of a plurality of input moving images and still images, the image processing apparatus comprising:

a synthesis unit configured to synthesize a plurality of the input image signals to generate a synthesis signal on the basis of synthesis information indicating an area where a plurality of the input image signals are respectively synthesized;

a detection unit configured to detect a motion vector of the synthesis signal;

a decision unit configured to decide, on the basis of the synthesis information and interpolation control information indicating an input interpolation exclusion area where an interpolation in the respective input image signals is not performed, a synthesis interpolation exclusion area where the interpolation in the synthesis signal is not performed; and an interpolation unit configured to interpolate and output a synthesis signal in-between signal which is an image signal at an arbitrary time between the synthesis signal and a previous synthesis signal functioning as a synthesis signal preceding the synthesis signal by one on the basis of the motion vector in an area other than the synthesis interpolation exclusion area, wherein in a case where the number of the synthesis interpolation exclusion areas is larger than a predetermined number or where a shape of the synthesis interpolation exclusion area is a shape other than a predetermined shape, the decision unit selects the input interpolation exclusion area and uses the selected input interpolation exclusion area to decide the synthesis interpolation exclusion area again, and wherein in a case where the number of the synthesis interpolation exclusion areas decided by the decision means is equal to or smaller than the predetermined number and also the shape of the synthesis interpolation exclusion area is the predetermined shape, on the basis of the synthesis interpolation exclusion area, the interpolation unit interpolates and outputs the synthesis signal in-between signal in an area other than the synthesis interpolation exclusion area.

* * * * *